April 7, 1959  F. R. WERNER ET AL  2,880,930
INTERSPERSED TOTALIZER SELECTING AND ENGAGING MEANS
Filed March 11, 1953  20 Sheets-Sheet 1

INVENTORS
FRANK R. WERNER
KENNETH C. FLINT &
WALTER G. STERZER
BY Carl Beust
Richard Van Busum
THEIR ATTORNEYS April 7, 1959  F. R. WERNER ET AL  2,880,930
INTERSPERSED TOTALIZER SELECTING AND ENGAGING MEANS
Filed March 11, 1953  20 Sheets-Sheet 2
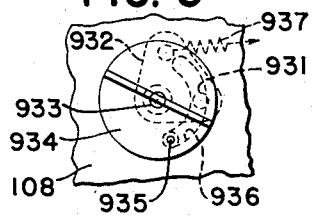
FIG. 3
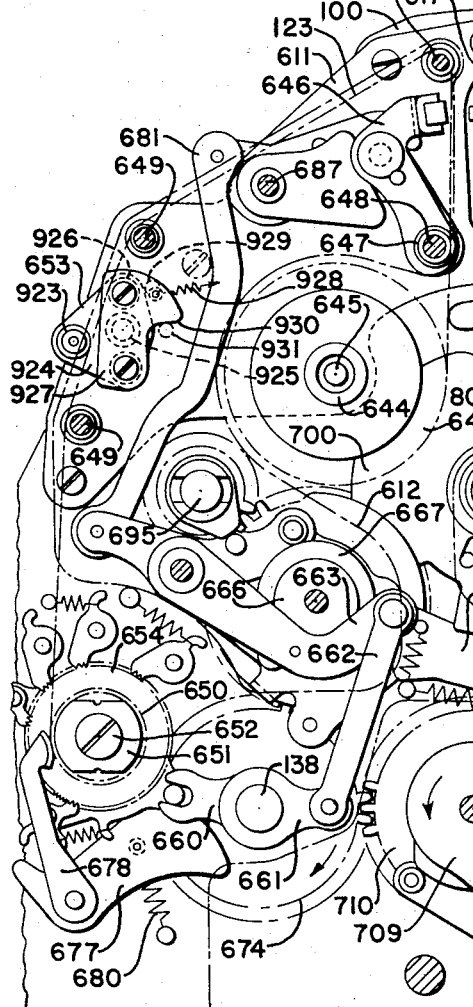
FIG. 2
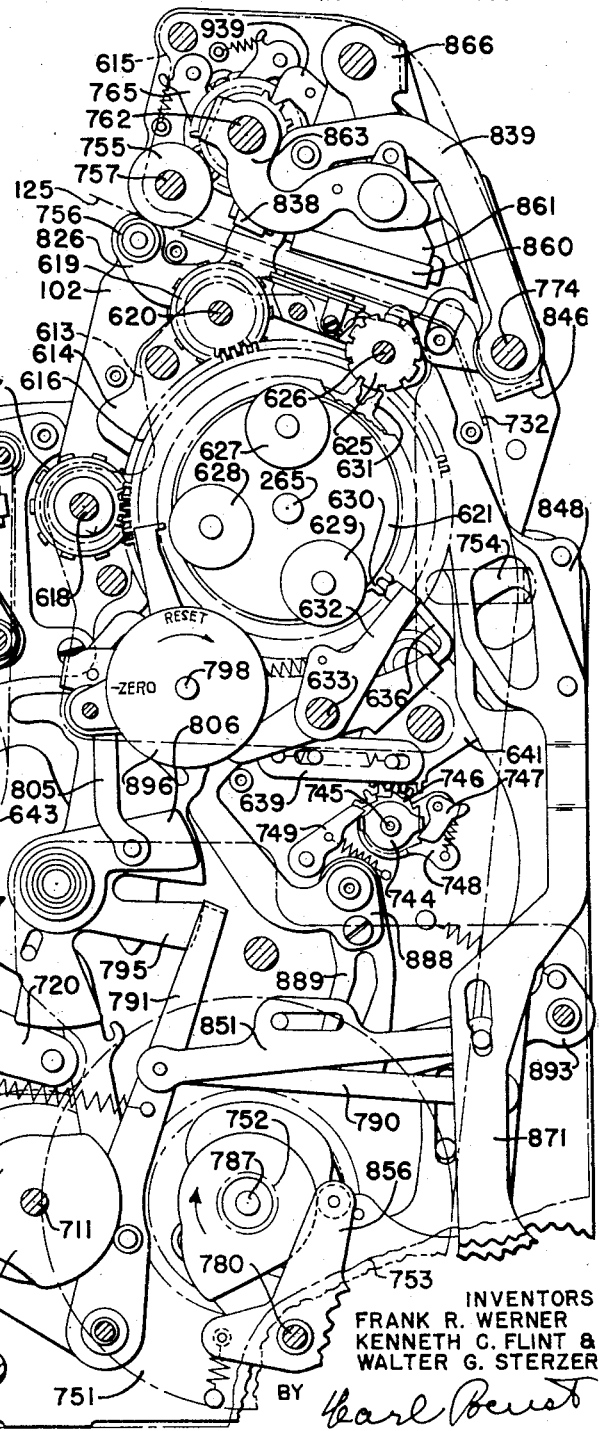
INVENTORS
FRANK R. WERNER
KENNETH C. FLINT &
WALTER G. STERZER
BY
THEIR ATTORNEYS

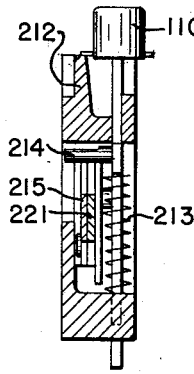
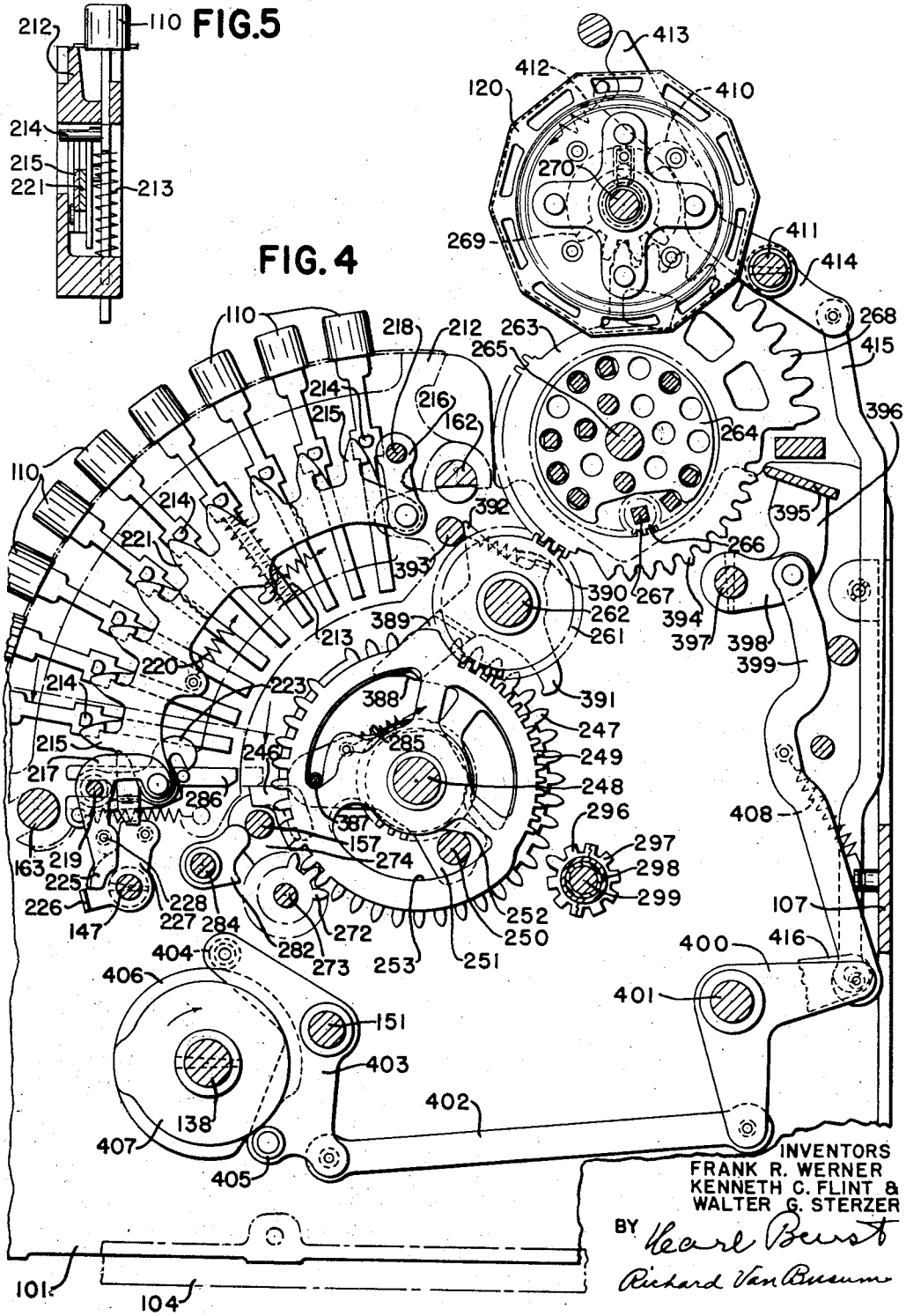

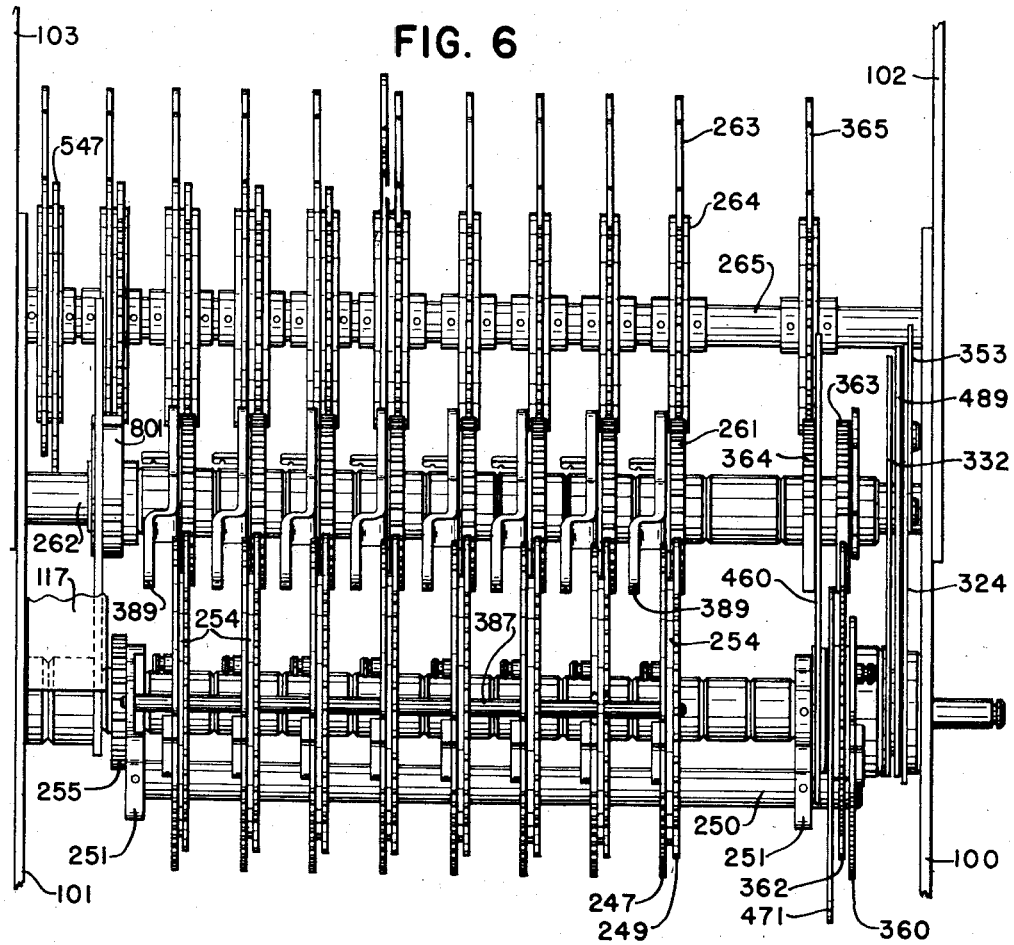

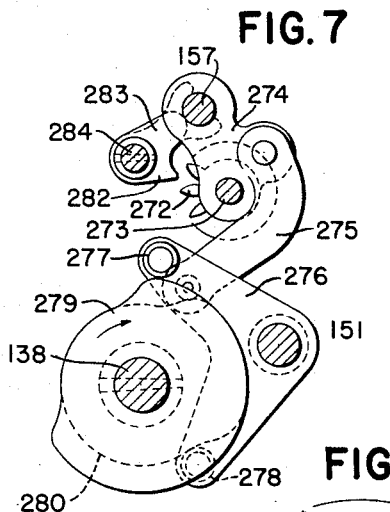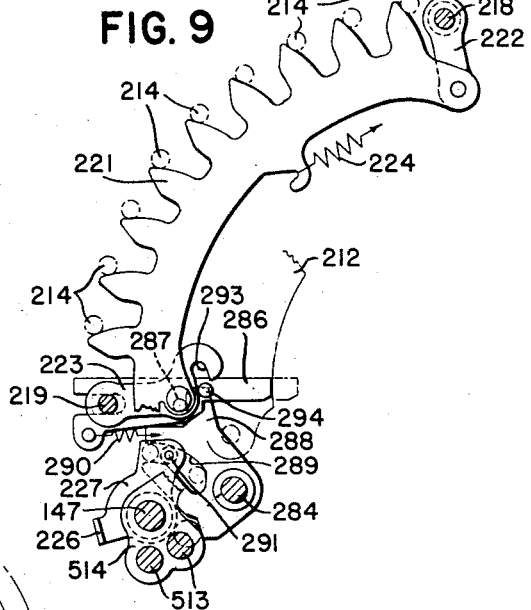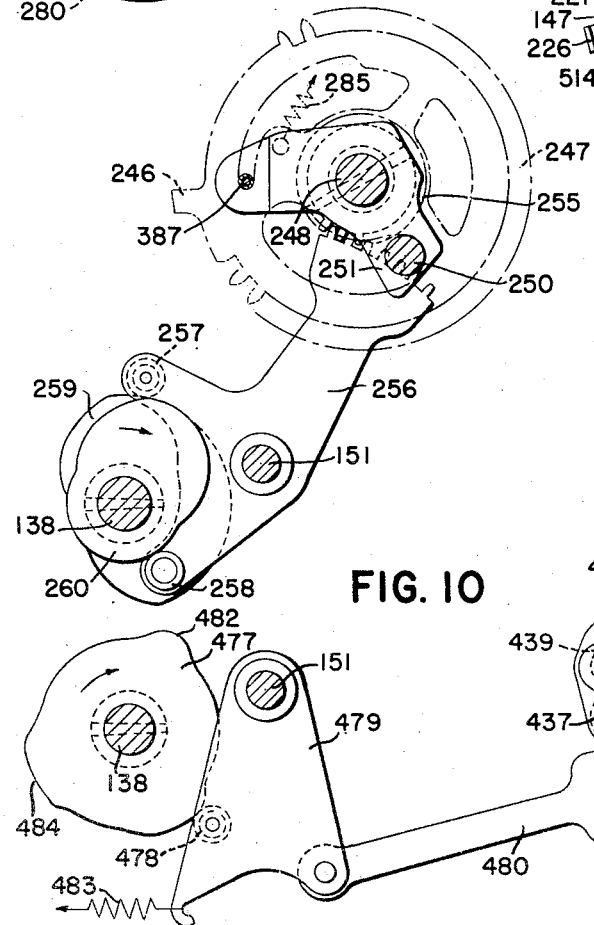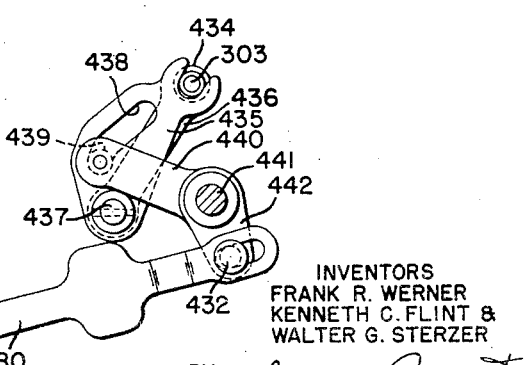

April 7, 1959 — F. R. WERNER ET AL — 2,880,930
INTERSPERSED TOTALIZER SELECTING AND ENGAGING MEANS
Filed March 11, 1953 — 20 Sheets-Sheet 7
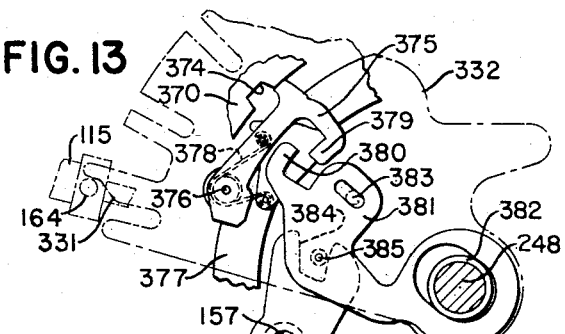
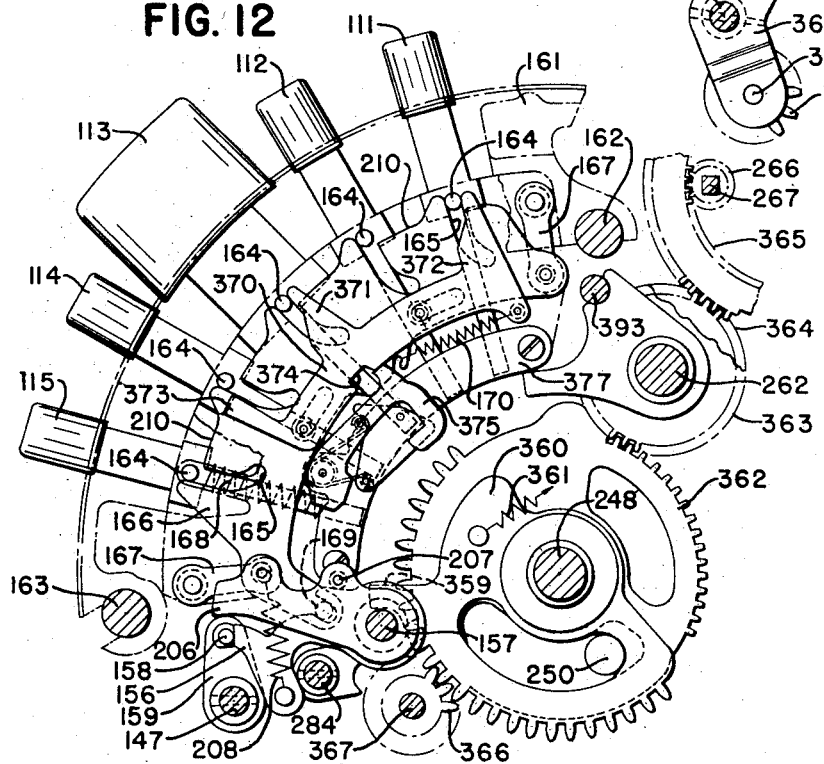
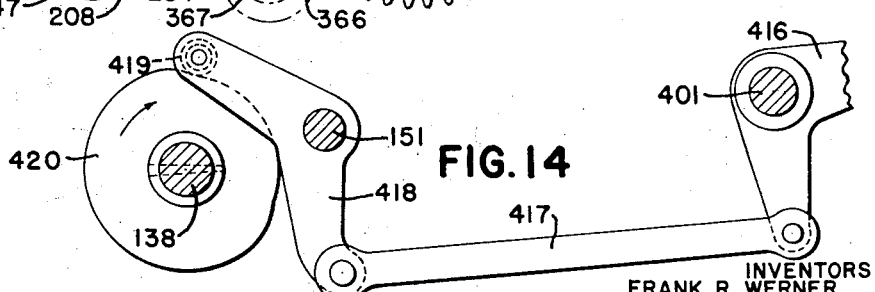
INVENTORS
FRANK R. WERNER
KENNETH C. FLINT &
WALTER G. STERZER
BY
THEIR ATTORNEYS

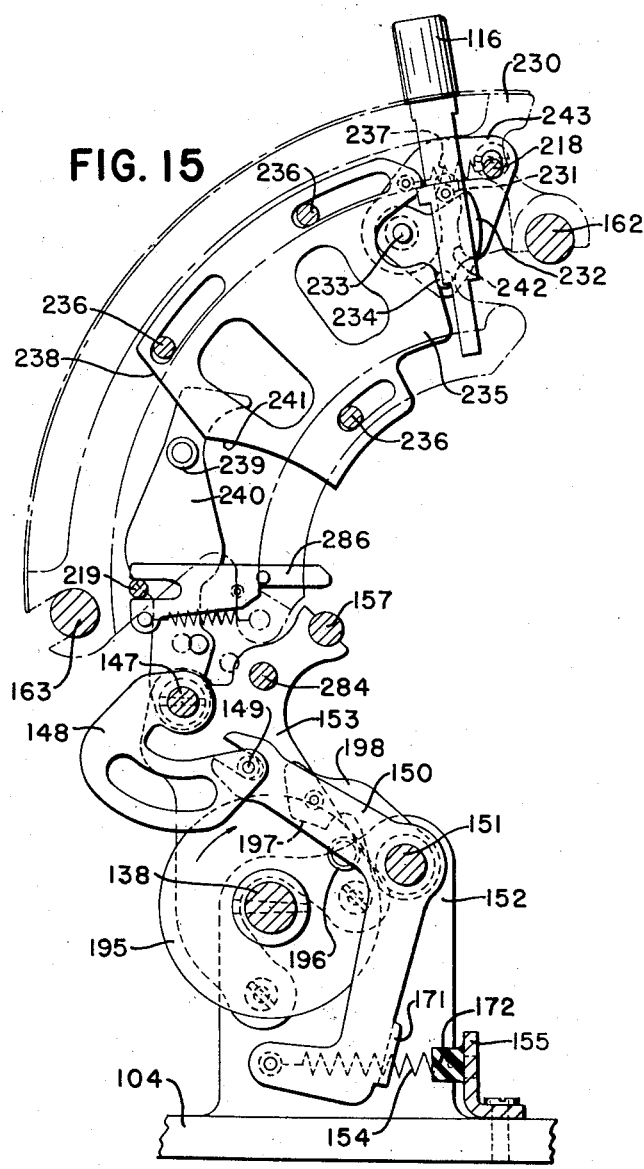

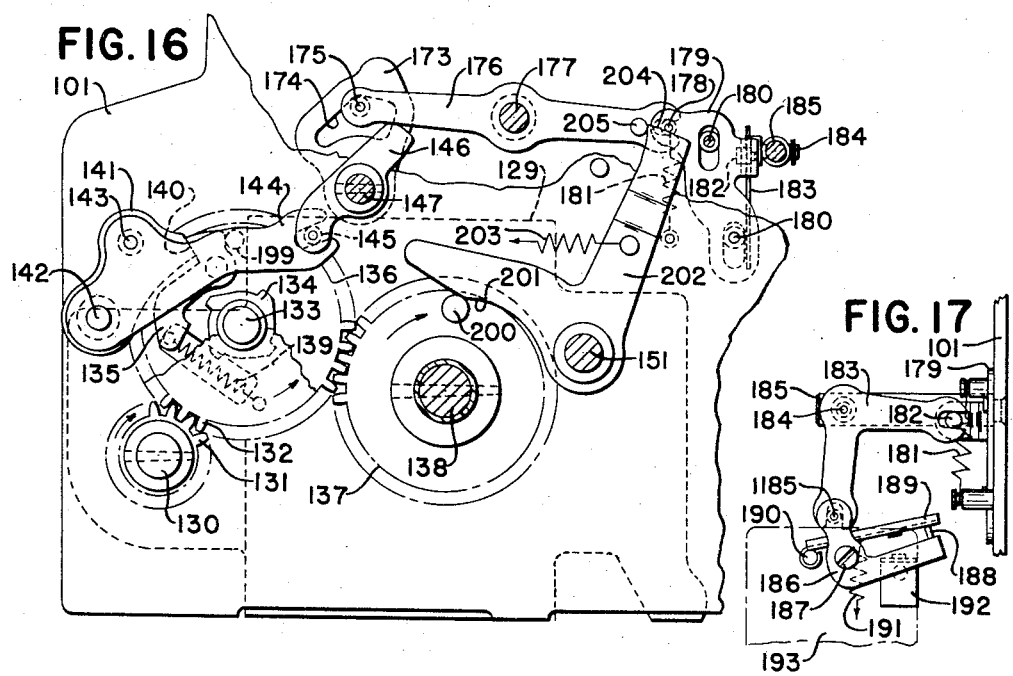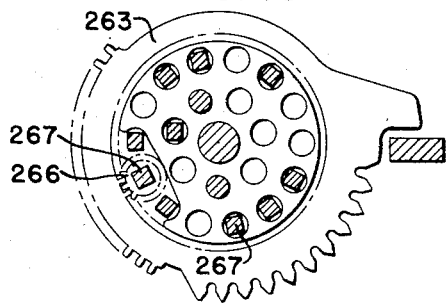

April 7, 1959   F. R. WERNER ET AL   2,880,930
INTERSPERSED TOTALIZER SELECTING AND ENGAGING MEANS
Filed March 11, 1953   20 Sheets-Sheet 10

INVENTORS
FRANK R. WERNER
KENNETH C. FLINT &
WALTER G. STERZER
BY
THEIR ATTORNEYS

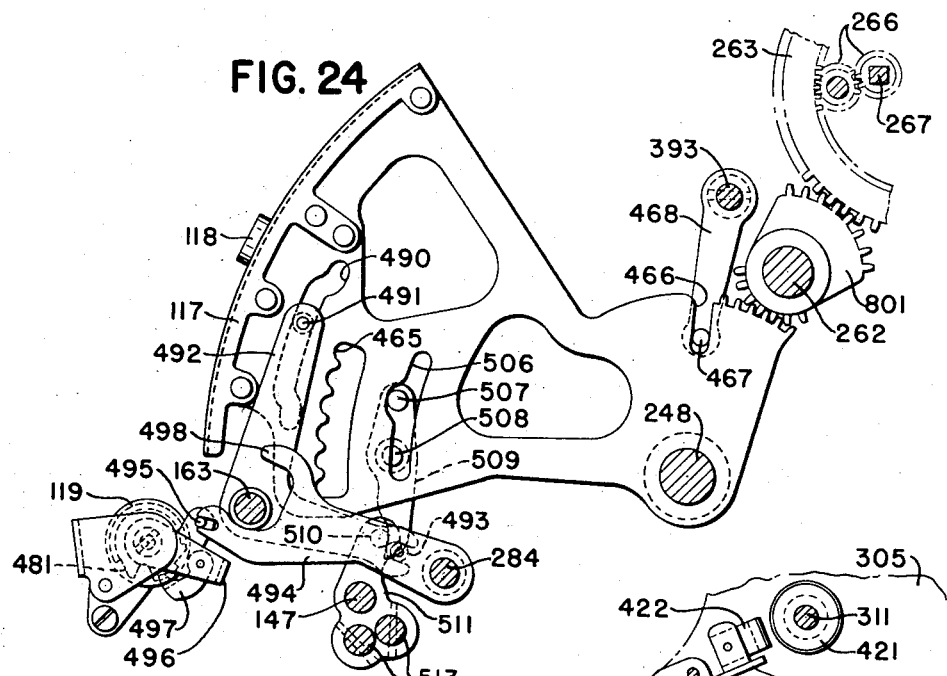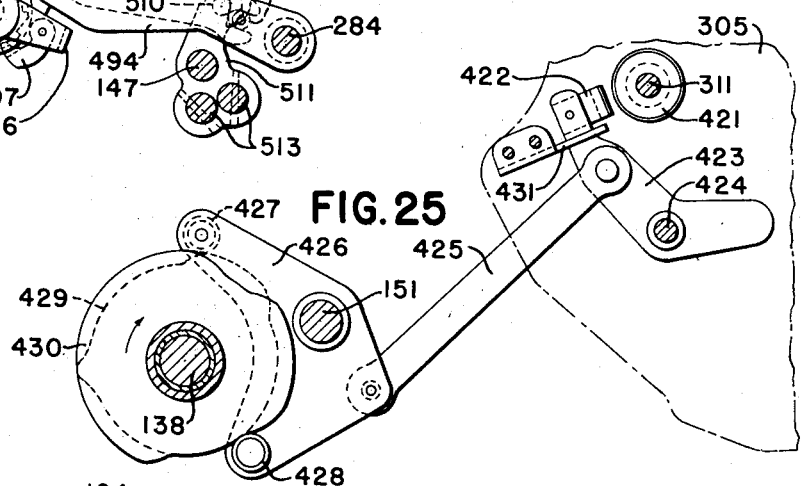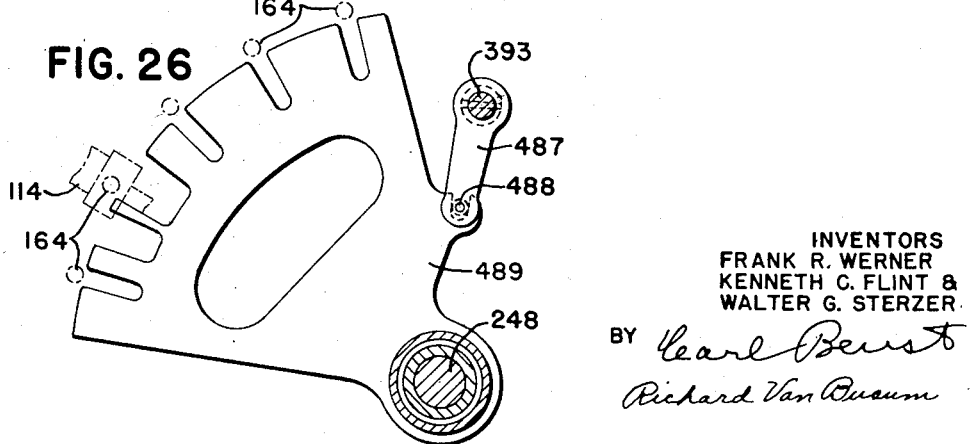

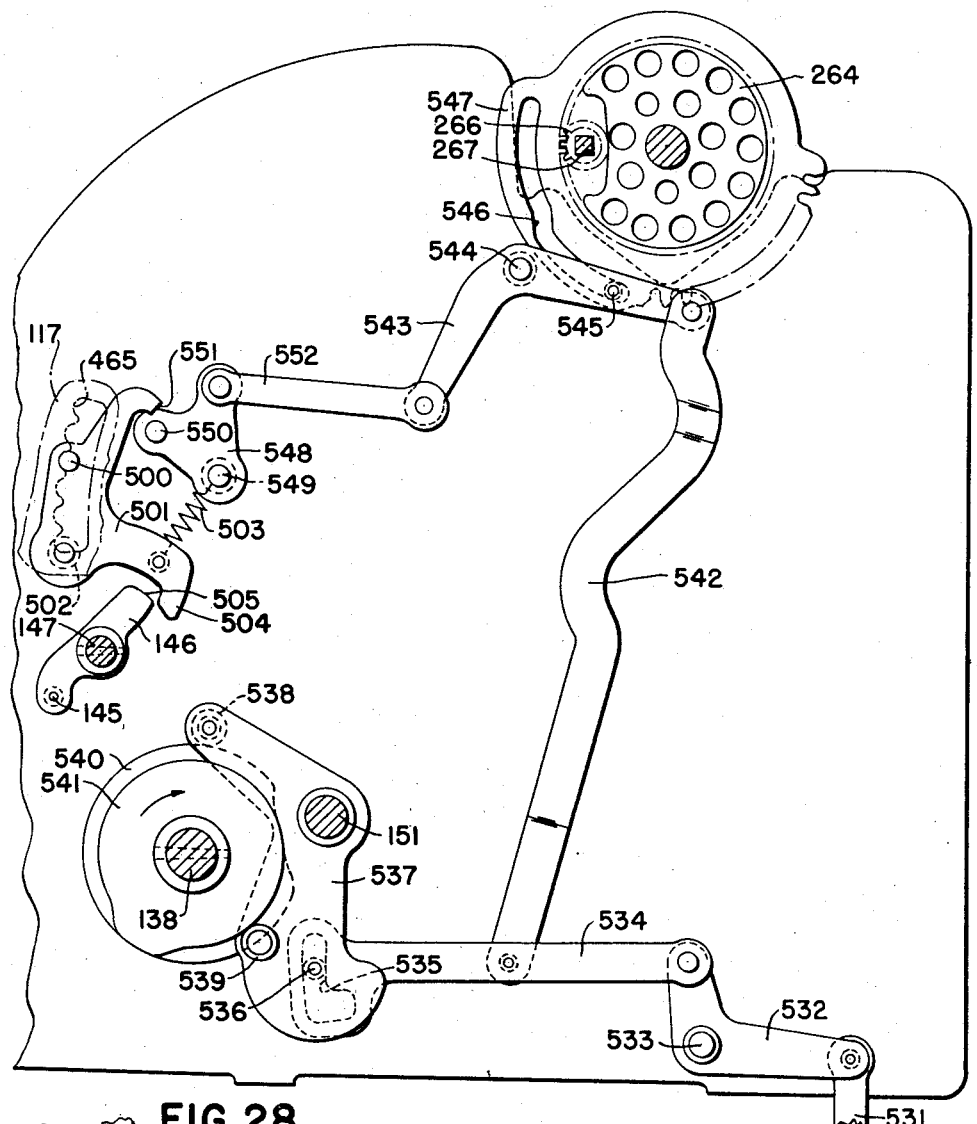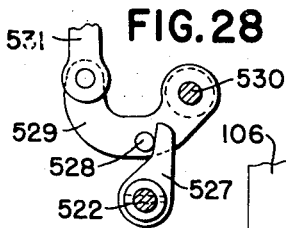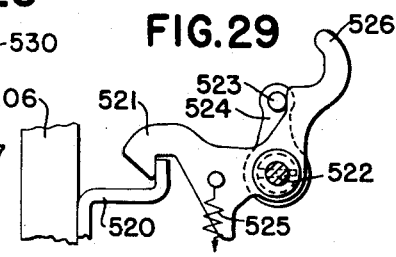

April 7, 1959 F. R. WERNER ET AL 2,880,930
INTERSPERSED TOTALIZER SELECTING AND ENGAGING MEANS
Filed March 11, 1953 20 Sheets-Sheet 13

INVENTORS
FRANK R. WERNER
KENNETH C. FLINT &
WALTER G. STERZER
BY
THEIR ATTORNEYS

April 7, 1959     F. R. WERNER ET AL     2,880,930
INTERSPERSED TOTALIZER SELECTING AND ENGAGING MEANS
Filed March 11, 1953     20 Sheets-Sheet 14
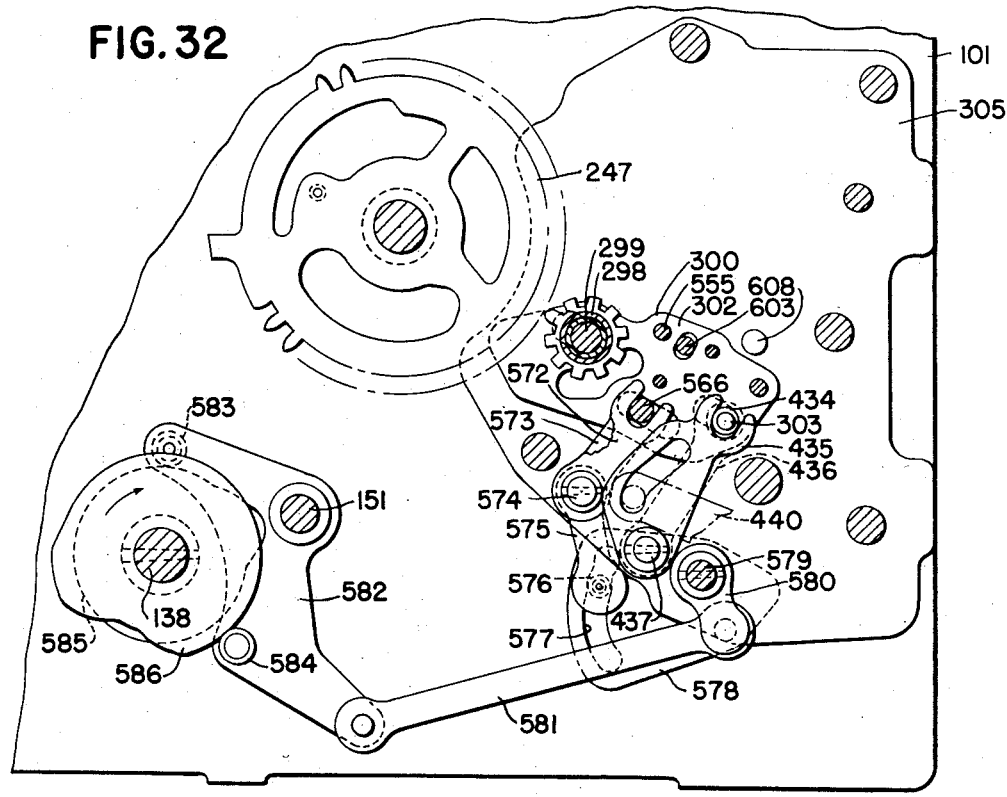
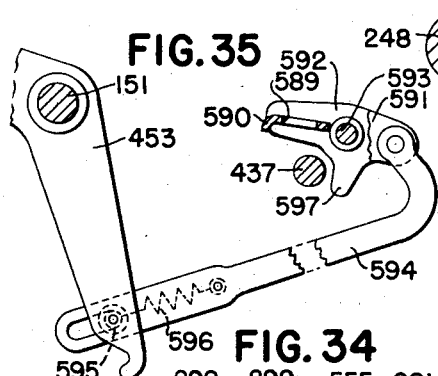
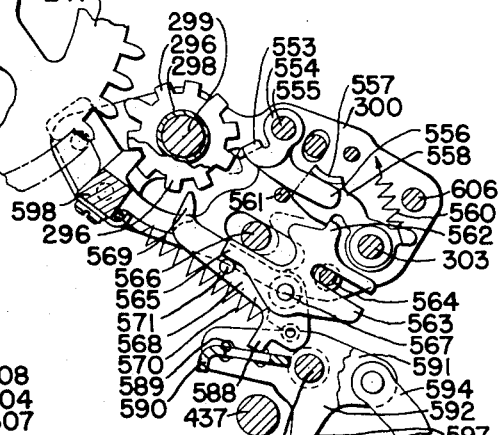
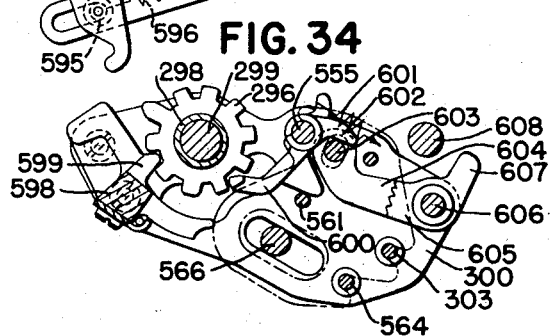
INVENTORS
FRANK R. WERNER
KENNETH C. FLINT &
WALTER G. STERZER
BY
THEIR ATTORNEYS April 7, 1959  F. R. WERNER ET AL  2,880,930
INTERSPERSED TOTALIZER SELECTING AND ENGAGING MEANS
Filed March 11, 1953   20 Sheets-Sheet 15
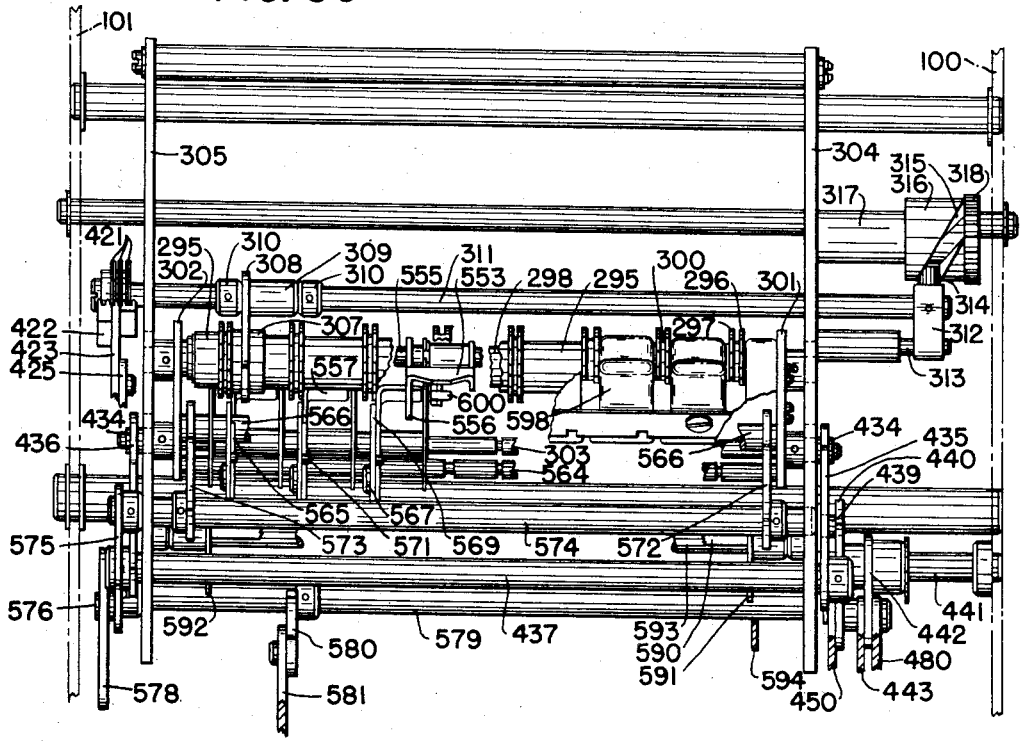
FIG. 36
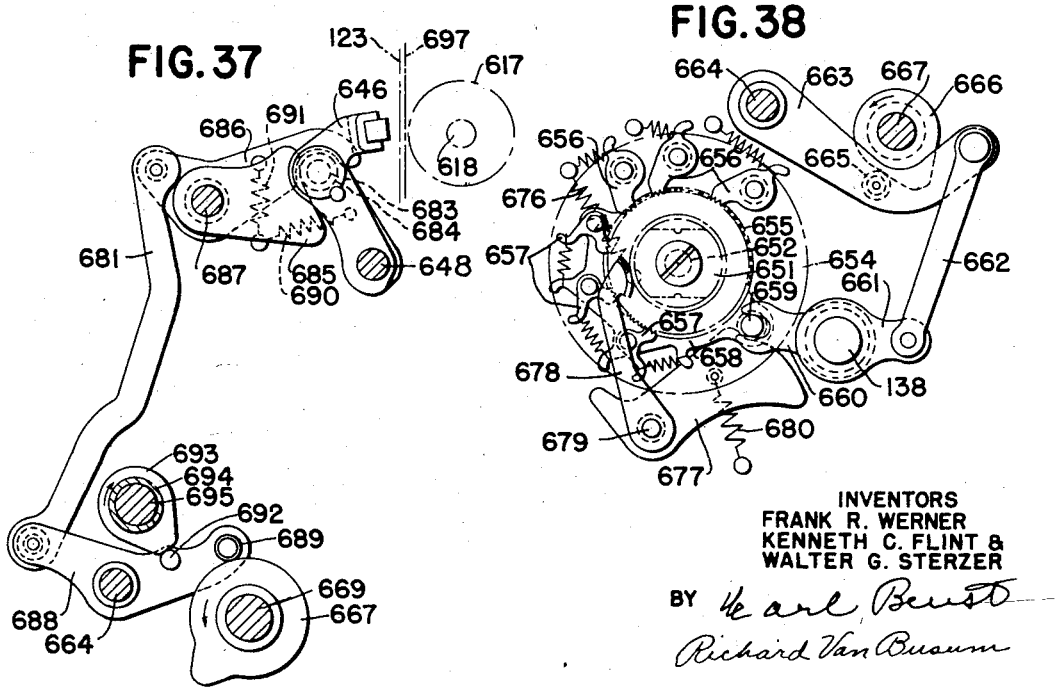
FIG. 37
FIG. 38
INVENTORS
FRANK R. WERNER
KENNETH C. FLINT &
WALTER G. STERZER
BY
THEIR ATTORNEYS

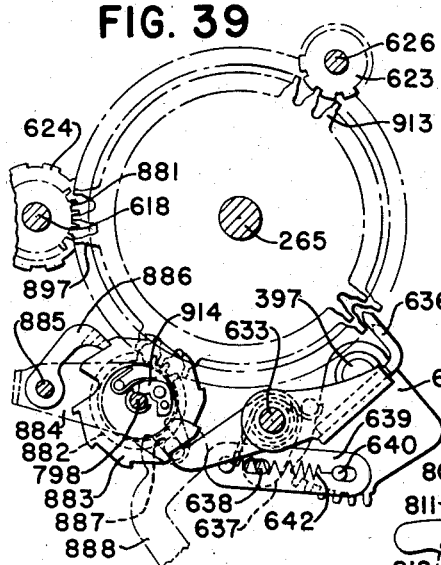
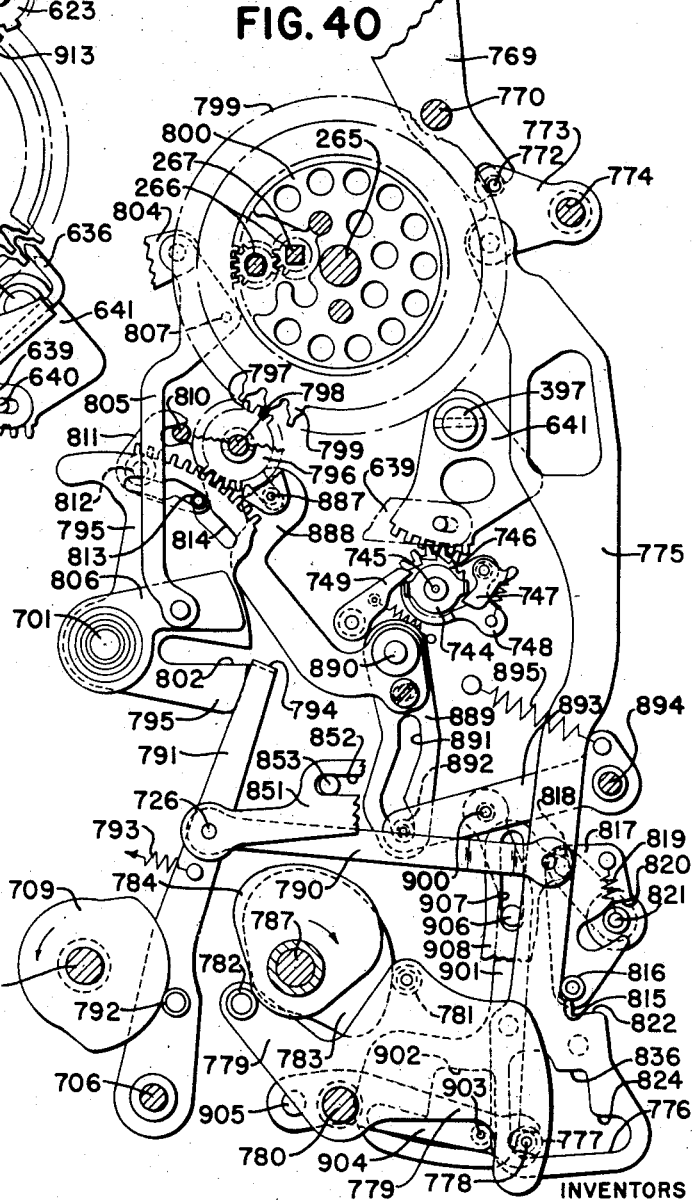
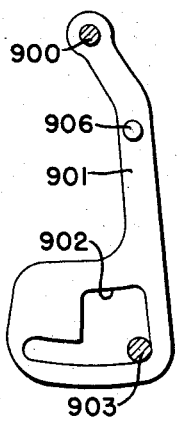

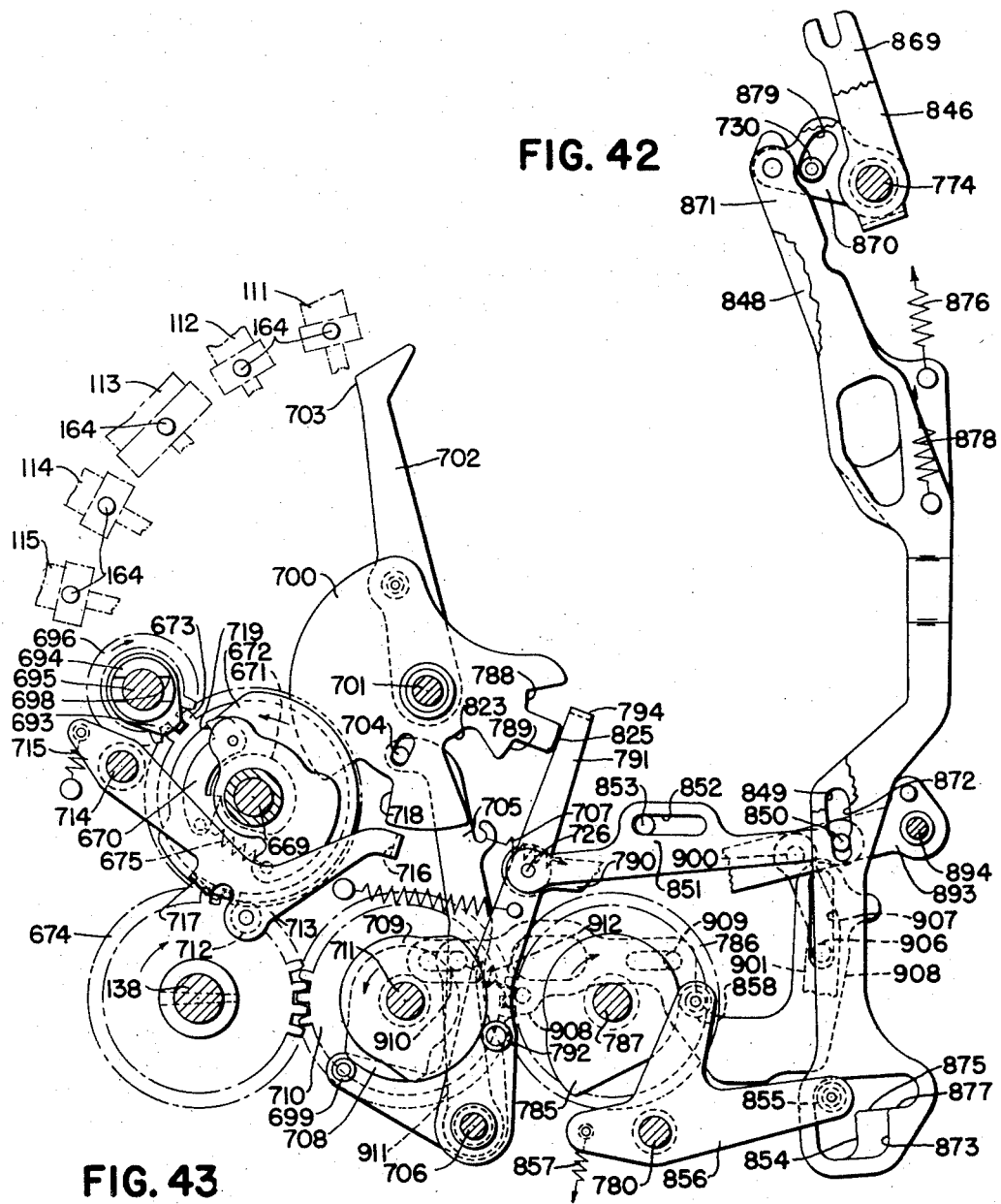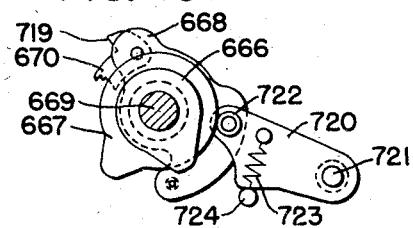

April 7, 1959 F. R. WERNER ET AL 2,880,930
INTERSPERSED TOTALIZER SELECTING AND ENGAGING MEANS
Filed March 11, 1953 20 Sheets-Sheet 18

INVENTORS
FRANK R. WERNER
KENNETH C. FLINT &
WALTER G. STERZER
BY
THEIR ATTORNEYS

April 7, 1959     F. R. WERNER ET AL     2,880,930
INTERSPERSED TOTALIZER SELECTING AND ENGAGING MEANS
Filed March 11, 1953     20 Sheets-Sheet 19

INVENTORS
FRANK R. WERNER
KENNETH C. FLINT &
WALTER G. STERZER

BY *Carl Berst*
*Richard Van Busum*

THEIR ATTORNEYS

April 7, 1959

F. R. WERNER ET AL 2,880,930

INTERSPERSED TOTALIZER SELECTING AND ENGAGING MEANS

Filed March 11, 1953

INVENTORS
FRANK R. WERNER
KENNETH C. FLINT &
WALTER G. STERZER

THEIR ATTORNEYS

United States Patent Office 2,880,930
Patented Apr. 7, 1959

2,880,930

INTERSPERSED TOTALIZER SELECTING AND ENGAGING MEANS

Frank R. Werner, Kenneth C. Flint, and Walter G. Sterzer, Dayton, Ohio, assignors to The National Cash Register Company, Dayton, Ohio, a corporation of Maryland Application March 11, 1953, Serial No. 341,633

9 Claims. (Cl. 235—6)

This invention relates to accounting machines and cash registers and is particularly directed to the registering and recording equipment of such machines.

It is a general object of this invention to provide a compact and efficient cash register of economical construction having many of the appointments and features of larger and more costly machines.

Another object is the provision of an economically-constructed cash register having a plurality of sets of selectable totalizers.

Still another object is to provide an economically-constructed cash register having an itemizing feature comprising a plurality of sets of totalizers for accumulating items and item totals.

A further object of this invention is to provide improved means for selecting and conditioning the totalizers for coaction with the totalizer differential actuators.

Another object is to furnish improved means for controlling the operation of the recording mechanism in different types of operations.

A further object is to provide a step-by-step counter for keeping an accurate count of the total number of reset or clearing operations performed.

Another object is the provision of improved means for controlling the operation of the receipt-feeding means and the receipt hammer operating means.

Another object is to provide improved means for controlling the engagement and disengagement of the selected totalizer and the differential actuators in proper timing for the type of operation being performed.

A further object is the provision of improved means for effecting a transfer of totals between two totalizers mounted on a common axial support, in a single cycle of machine operation.

A further object is the provision of improved means for effecting a transfer of totals between two totalizers mounted on a common axial support, in a single cycle of machine operation.

With these and incidental objects in view, the invention includes certain novel features of construction and combinations of parts, a preferred form or embodiment of which is hereinafter described with reference to the drawings which accompany and form a part of this specification.

In the drawings:

Fig. 2 is a right side elevation of the machine taken just inside the cabinet, showing in particular the mechanism for printing records on a detail strip, which is retained in the machine, and an issuing receipt, which is issued at the end of each item transaction.

Fig. 3 is a detail view showing a part of the mechanism for advancing the detail strip so that the last entries thereon are visible through the sight aperture provided therefor in the front of the cabinet.

Fig. 4 is a right side elevation taken just to the right of one of the amount banks, showing said bank and the differential mechanism associated therewith for transmitting the data set up on the keys to the printing mechanism and to the indicating mechanism.

Fig. 5 is a detail cross-sectional view of the amount bank shown in Fig. 4, showing the relative side-spacing arrangement of parts therein.

Fig. 6 is a side-spacing view as observed from above the machine, showing in particular the amount differential mechanism.

Fig. 7 is a detail view of the mechanism for operating the clutch pinions used for clutching the primary and secondary differential members together for concert movement.

Fig. 8 is a detail view of the mechanism for operating the universal or leading bar for the differential mechanism.

Fig. 9 is a detail view of a portion of one of the amount banks, showing in particular the zero stop mechanism associated therewith.

Fig. 10 is a detail view of the mechanism for insuring that the totalizer line is restored to disengaged position.

Fig. 12 is a right side elevation of the control or transaction bank and the differential mechanism associated therewith.

Fig. 13 is a detail view of the mechanism for locking the Single-Item key against depression during a Multiple-Item transaction.

Fig. 14 is a detail view of the mechanism for operating the indicator aliner.

Fig. 15 is a detail view of the mechanism for manually releasing any depressed amount or transaction keys.

Fig. 16 is a detail view showing the electric motor for operating the machine, and the clutch mechanism for connecting said motor to the machine-operating mechanism.

Fig. 17 is a detail view of the switch mechanism for controlling the flow of electrical current to the operating motor.

Fig. 18 is a detail view of the transmission segment and associated transmission line for transmitting the positioning of the highest order or overflow totalizer wheels to the printing mechanism, in total-taking operations.

Fig. 19 is a facsimile of a fragmentary portion of the detail strip prepared in the machine of this invention.

Fig. 20 is a facsimile of a multiple-item receipt prepared on the machine of this invention.

Fig. 21 is a facsimile of a single-item receipt prepared on the machine of this invention.

Fig. 24 is a detail view of the total control lever, sometimes referred to as the "unit lock lever," for controlling the various functions of the machine.

Fig. 25 is a detail view of the mechanism for operating the aliner which alines the shiftable totalizer assembly against lateral displacement during machine operations.

Fig. 26 is a detail view of the total control segment, which is positioned under control of the total control lever, for locking the control keys against depression when said lever is in certain positions.

Fig. 27 is a right side elevation showing the mechanism which operates under control of the control or transaction keys for controlling operation of the cash drawer releasing mechanism and operation of the total control lever.

Figs. 28 and 29 are detail views of the drawer latch mechanism which operates under control of the mechanism shown in Fig. 27 for releasing the drawer for opening.

Fig. 32 is a right side elevation showing the transfer restoring mechanism.

Fig. 33 is a detail view of the mechanism for transferring tens digits from lower to higher denominations.

Fig. 34 is a detail view of the mechanism for retaining the totalizer wheels against displacement during engaging and disengaging movement thereof.

Fig. 35 is a detail view of the mechanism for insuring that the transfer pawls do not trip during totalizing operations.

Fig. 36 is a plan view of the totalizer mechanism, showing in particular the mechanism for shifting the totalizer assembly laterally to aline the different sets of wheels thereon with the amount actuators.

Fig. 37 is a right side elevation showing the hammer and its operating mechanism for printing records on the detail audit strip.

Fig. 38 is a right side elevation showing the mechanism for feeding or advancing the detail audit strip in relation to the printing mechanism.

Fig. 39 is a detail view of a part of the mechanism for advancing the consecutive number type wheels.

Fig. 40 is a right side elevation showing the consecutive number advancing mechanism and the mechanism for operating and controlling the operating of the receipt feeding mechanism.

Fig. 41 is a detail view of the pitman for controlling the operation of the consecutive number advancing mechanism.

Fig. 42 is a right side elevation of the operating and control mechanisms for the receipt printing hammers.

Fig. 43 is a detail view of the cams for operating the detail strip feeding mechanism and for operating the detail impression hammer.

Figure 1:
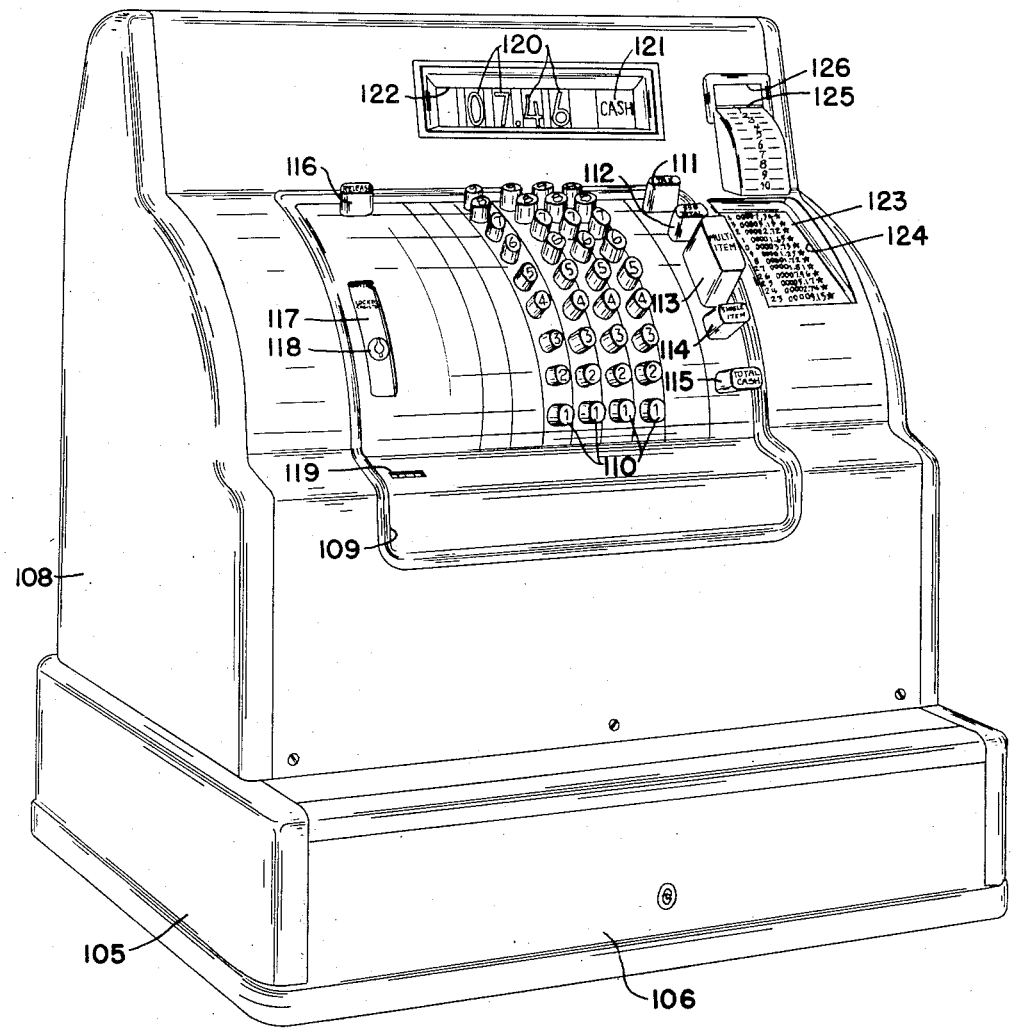
Fig. 1 is a perspective view of a machine embodying the various features of the present invention.
Figure 11:
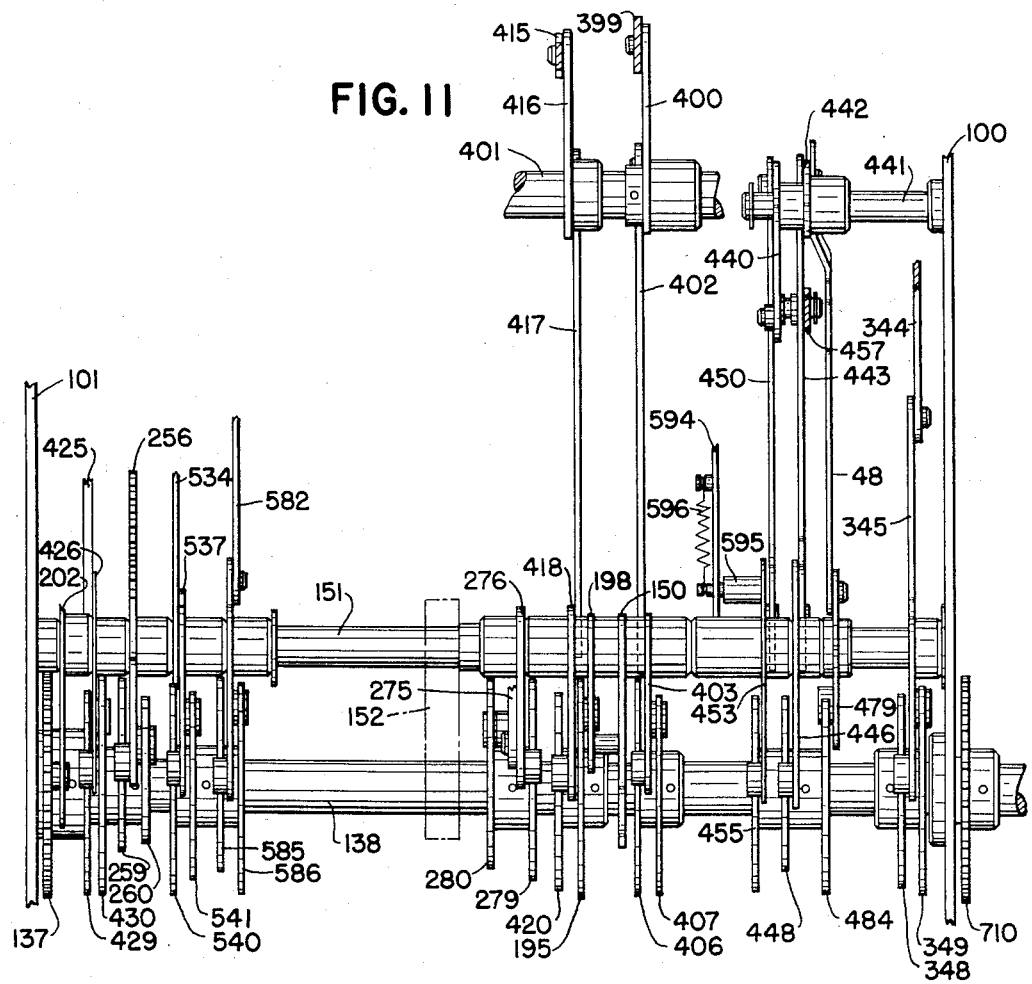
Fig. 11 is a side-spacing plan view of the main cam line and certain mechanisms operated thereby.

The machine chosen to illustrate the present invention has many basic principles and features which are similar in many respects to those of a well-known type of cash register, which is fully disclosed in the following United States patents: No. 1,816,263, issued July 28, 1931; No. 1,929,652, issued October 10, 1933; No. 2,048,200, issued July 21, 1936; and No. 2,056,485, issued October 6, 1936, all to William H. Robertson.

Reference may be had to the above patents for a history of the development of the pioneer machines of this type and for a full disclosure of mechanisms used in the present machine, similar to those of the pioneer or basic machines, which for that reason will be described only in general terms in the present application.

MACHINE IN GENERAL AND ITS SUPPORTING FRAMEWORK

The mechanism of the machine is supported primarily by right and left side frames 100 and 101 (Figs. 1, 2, 4, and 6) and their corresponding auxiliary frames 102 and 103, secured to the upper ends thereof, said right and left frames being in turn secured at their lower ends to a base plate 104. The base plate 104 is secured in a shallow pan (not shown) in turn secured to the top of a drawer cabinet 105, which has mounted therein a cash drawer 106, which opens automatically at the end of certain machine operations, as will be explained later. The side frames 100 and 101 are maintained in proper spaced relationship to each other by the base plate 104 and by a back plate 107 (Fig. 4) secured therebetween and by various cross bars, plates, rods, and shafts, which will be explained in their logical order as the description progresses.

The mechanism of the machine is enclosed in a suitable case or cabinet 108 (Fig. 1), made of sheet metal or other suitable material, secured to the machine base 104, and said cabinet has a large opening 109 in its front to provide proper clearance for the keyboard mechanism.

The keyboard of the machine comprises four rows of amount keys 110 (Fig. 1), a row of control keys 111 to 115 inclusive, a release key 116 for manually releasing any of the depressed amount keys 110 and certain of the control keys, and a total control lever 117, sometimes referred to as a "Unit Lock Lever," which is movable to various positions to control the functions of the machine. The keyboard of the machine likewise includes a special step-by-step counter 119, which accumulates "one" for each time the total control lever 117 is moved to a reset position to select and condition the group totalizer for a reset or clearing operation.

Each of the rows of amount keys 110 has associated therewith a corresponding amount differential mechanism, which causes the amount set up on said keys to be entered in the selected totalizer and in turn positions corresponding front and back indicators 120 (Figs. 1 and 4), only the front indicators being shown here. Likewise, the control keys 111 to 115 have associated therewith a corresponding transaction differential mechanism for positioning corresponding front and back transaction indicators 121 according to the depressed control key, for the purpose of visibly indicating the type of transaction being performed. The front and back indicators 120 and 121 (Fig. 1) are visible through corresponding openings 122 in the case 108, only the front opening being shown here. In addition to positioning the indicators, the amount differential mechanisms and the transaction differential mechanisms position corresponding type wheels for printing values corresponding to the depressed amount keys and for printing symbols corresponding to the effective control keys upon a detail audit strip 123, a portion of which is visible through a corresponding opening 124 in the case 108, and upon an issuing receipt 125, which is fed through a corresponding opening 126 in the upper portion of the case 108, said opening 126 being provided with a fine-toothed tearing blade for separating the finished receipt from its web.

The present machine is provided with two sets of totalizer wheels, mounted side by side upon a common axle. One of said sets of totalizer wheels will be referred to henceforth as an item totalizer and the other as a group or storage totalizer for the accumulation of amounts cleared from the item totalizer. The wheels of the totalizers are shiftable laterally for selective alinement with the amount actuators under influence of the control keys 111 to 115, which keys also condition the totalizers for the type of operation corresponding to said keys.

The item totalizer is always cleared at the end of multiple-item operations, and the amount cleared therefrom is simultaneously entered additively in the wheels of the storage totalizer. The storage totalizer may be selected and conditioned for reading and resetting, or sub-total and total, operations, these terms being used interchangeably, by moving the total control lever 117 (Fig. 1) to Read or Reset position, respectively. Normally the total control lever 117 is located in Register position, as shown here, which causes the machine to function in a normal manner under control of the control keys 111 to 115. When it is desired to render the machine inoperative for any reason, the total control lever 117 may be moved to Locked Register position, said total control lever being provided with a lock 118, which permits it to be locked in either Locked Register position or Register position. It is therefore impossible for those not having keys to the lock 118 to move the total control lever 117 from one position to another. The total control lever 117 is also normally locked against movement into the Reset position, a special reset key for the lock 118 being required for unlocking the lever so that it may be moved to this position, and it is therefore impossible for those not having a reset key to move the total control lever to Reset position to reset or clear the amount from the storage totalizer. As previously explained, each time the total control lever 117 is moved to Reset position, "one" is added in the reset counter 119 to provide an accurate record of the number of times the group totalizer is reset.

Mechanism pertinent to the present invention will be described in deail in the ensuing pages. Reference may be had to the patents referred to at the beginning of this specification for a full disclosure of other mechanism of the machine.

DETAILED DESCRIPTION

Operating mechanism

Under normal conditions, the machine is operated by an electric motor 129 (Fig. 16). However, a hand crank (not shown) is provided for operating the machine in case it is desirable or necessary, due to unusual conditions, such as the failure of the electric current. The motor 129 is secured to the machine base and through a reduction gearing drives a shaft 130, mounted in the motor framework and having secured on its outer end a pinion 131, which meshes with a gear 132, free on a stud 133, secured in the left frame 101. The gear 132 has integral therewith a four-tooth driving ratchet 134, the teeth of which cooperate with a shoulder formed on a clutch pawl 135 pivotally mounted on a gear 136 free on the stud 133, said gear being similar in size to its companion gear 132. The gear 136 meshes with a similar gear 137 secured on a main cam shaft 138 journaled in the machine framework and arranged to be driven one clockwise revolution each machine operation by the motor 129, as will be explained presently. A spring 139 (Fig. 16) urges the clutch pawl 135 counter-clockwise to normally maintain a shoulder 140 thereon in engagement with the nose of an arm 141 pivotally mounted on a stud 142 secured in the left frame 101. A stud 143 fixedly connects the arm 141 to a companion arm 144 free on the stud 142. The arm 144 is slotted to receive a stud 145 in the lower end of an arm 146 secured on a key lock and release shaft 147 journaled in the machine framework.

Secured on the shaft 147 (Fig. 15) near its center is an arm 148 carrying a stud 149 engaged by the slotted outer end of a bell crank 150 free on a shaft 151 journaled in the right and left frames 100 and 101 of the machine, and also supported near its center by an upright 152 extending from the base 104, said upright also supporting the main cam shaft 138 near its center. Secured to the upright 152 is a supporting plate 153, which freely engages the key lock shaft 147 near its center to provide increased rigidity and support for said shaft. A spring 154 (Fig. 15), tensioned between the downward arm of the bell crank 150 and an upward extension of a bracket 155 secured to the base 104, urges said bell crank counter-clockwise, which, through the arm 148, urges the key lock and release shaft 147 in a clockwise or releasing direction. The shaft 147 is normaly restrained against such clockwise movement by a machine release or trip pawl 156 (Fig. 12) free on a shaft 157 journaled in the frames 100 and 101 and the upright 152, said pawl having a forward extension which is normally in the path of and yieldingly engaged by a stud 158 in a crank 159 secured on the right-hand end of said shaft 147.

The trip pawl 156 is arranged to be rocked downwardly out of engagement with the stud 158 by depression of any one of the control keys 111 to 115 inclusive, said keys being depressibly mounted in a control key frame 161, removably supported in the machine by cross rods 162 and 163 supported by the main frames, said rod 162 having a flat surface cut thereon which permits the key frame 161 to be removed from the machine when said rod is turned counter-clockwise substantially 90 degrees from the position shown in Fig. 12. Each of control keys 111 to 115 carries a stud 164 arranged to coact with a corresponding curved slot 165 in a machine release plate 166 freely mounted for rocking movement on the inner ends of similar links 167 pivoted at their outer ends on studs carried by the frame 161. Associated with each of the keys 111 to 115 is a compressible spring 168, which urges said keys outwardly to normally maintain them in their undepressed positions, as shown here.

Depression of any one of the keys 111 to 115 (Fig. 12) against the action of the spring 168 causes the stud 164, in cooperation with the slot 165, to shift the plate 166 downwardly or counter-clockwise against the action of a spring 170, causing a stud 169, fast in an inward extension of said control plate 166, in cooperation with a slot in the pawl 156, to rock said pawl downwardly or counter-clockwise. Downward movement of the pawl 156 moves its forward end beneath and out of the path of the stud 158 to free the shaft 147 to the action of the spring 154 (Fig. 15), which immediately rocks said shaft clockwise until a bent-over ear 171 on the bell crank 150 contacts a block 172 of cushioning material, such as synthetic rubber, bonded to the forward face of the upward extension of the bracket 155. Clockwise releasing movement of the shaft 147 (Fig. 12) moves the stud 158 above the release pawl 156 to obstruct clockwise movement of said pawl and, through the stud 169, the control plate 166. This causes the curved slot 165, in cooperation with the stud 164, to retain the control key 111 to 115 depressed until the shaft 147 is restored counter-clockwise, as will be explained later. Clockwise movement of the shaft 147 and the arm 146 (Fig. 16) rocks the arms 144 and 141 counter-clockwise to disengage the nose of said arm 141 from the shoulder 140, to free the clutch pawl 135 to the action of the spring 139, which immediately rocks said pawl counter-clockwise into the path of the teeth of the ratchet 134. Simultaneously, clockwise movement of the shaft 147 operates a switch mechanism for the motor 129, to cause the circuit to said motor to be closed, whereupon said motor becomes effective to drive the machine mechanism.

Secured on the left-hand end of the shaft 147 (Fig. 16) is a segment 173 having a cam slot 174, which coacts with a stud 175 in the forward end of a lever 176 free on a stud 177 secured in the left frame 101. The rearward extension of the lever 176 is slotted to receive a stud 178 in a slide 179 shiftably mounted by means of two vertical slots therein, in cooperation with rollers mounted on studs 180 secured in the left frame 101. A comparatively strong spring 181 urges the slide 179 downwardly and the lever 176 clockwise, to maintain the roller in yielding engagement with the upper edge of the slot 174. A right-angled ear of the slide 179 (Figs. 16 and 17) carries a stud 182, which engages a slot in one arm of a bell crank 183 carrying a stud 184 journaled in a bore in a post 185 extending outwardly from the frame 101. A downward arm of the bell crank 183 is slotted to embrace a stud 1185 in an upward extension of a bell crank 186 free on a screw stud 187 threaded in an insulating block 193 secured to the framework of the motor 129. The bell crank 186 has secured to the inner face of a right-angled ear thereof an insulating strip 188, which coacts with a switch arm 189 pivoted on a stud 190 carried by the insulating block 193, said switch arm being connected to the electrical supply source. A comparatively weak spring 191 (Fig. 17) urges the switch arm 189 clockwise to normally maintain said arm in yielding engagement with the insulating strip 188. When the key lock shaft 147 is in normal or unreleased position, as shown in Fig. 16, the strong spring 181, acting through the slide 179 and the bell cranks 183 and 186, overcomes the weak spring 191 and holds the switch arm 189 in open position, as shown here, in which a contact point carried thereby is separated from a stationary contact point 192 mounted on the insulating block 193, said fixed contact 192 being in turn connected to the operating motor 129.

Clockwise releasing movement of the shaft 147 and the segment 173, as explained before, causes the cam slot 174 to rock the lever 176 counter-clockwise (Fig. 16) to shift the slide 179 upwardly against the action of the spring 181. Upward movement of the slide 179 (Fig. 17) rocks the bell crank 183 counter-clockwise and the bell crank 186 clockwise, to free the switch arm 189 to the action of the spring 191, which carries said switch arm clockwise in unison with the bell crank 186 until the contact point on said arm engages the fixed contact 192 to close the circuit to the motor 129, which then drives the shaft 130 (Fig. 16) clockwise. Clockwise movement of the shaft 130 and the pinion 131 drives the gear 132 and the ratchet 134 counter-clockwise until the tooth of said ratchet engages the tooth of the clutch pawl 135, whereupon said pawl and the gear 136 rotate in unison with said gear 132 and, through the gear 137, drive the main cam shaft 138 clockwise to effect operation of the machine.

When the main cam shaft 138 nears the end of one clockwise revolution, a roller 196 (Fig. 15), carried by a disk 195 secured on said shaft, engages a camming nose 197 on an arm 198 fixed to the bell crank 150 and restores said arm and the bell crank clockwise against the action of the spring 154. This restoring movement of the bell crank 150 restores the arm 148, the shaft 147, and the arm 146 (Fig. 16) counter-clockwise, causing said arm 146 to restore the arms 144 and 141 clockwise to move the stop surface on said arm into the path of the shoulder 140 of the clutch pawl 135. Engagement of the shoulder 140 with the arm 141 rocks the pawl 135 clockwise out of engagement with the teeth of the ratchet 134 to disconnect the gear 136 from the gear 132 and thus terminate machine operation, after the main cam shaft 138 has completed one clockwise revolution. Restoring movement counter-clockwise of the shaft 147 and the crank 159 (Fig. 12) moves the stud 158 in said crank beyond the outer end of the release pawl 156, whereupon the spring 170 acts to restore said pawl into the path of said stud 158 to retain the key lock and release shaft 147 in restored position, as shown here. The time of the releasing and restoring movements of the key lock shaft 147 is given in space 14, Fig. 51.

Mechanism is provided to retain the motor switch closed after the key lock shaft 147 is restored, to insure that the motor continues to operate a sufficient length of time to fully disconnect the clutch pawl 135 and that said pawl and its connected parts are properly located in their home positions, as shown in Fig. 16, which position is determined by a shoulder on said clutch pawl 135 contacting a stop stud 199, secured in the gear 136. This mechanism comprises a stud 200 (Fig. 16) secured in the gear 137, which coacts with a camming surface 201 on one arm of a lever 202 free on the shaft 151, said arm being urged counter-clockwise by a spring 203, which yieldingly maintains said camming surface in contact with said stud 200.

Near the beginning of clockwise rotation of the gear 137, the stud 200 moves beyond the highest point of the camming surface 201, thus permitting the spring 203 to rock the lever 202 counter-clockwise to move an arcuate blocking surface 204, on an upward arm of said lever, into the path of a stud 205 in the lever 176, which, as previously explained, has been rocked counter-clockwise by the cam slot 174 to close the motor switch 189 (Fig. 17). Clearance in the slot 174 permits the lever 176 to be retained in its counter-clockwise position by the lever 202, when the segment 173 and the shaft 147 are restored counter-clockwise near the end of machine operation, as explained above. Therefore the motor continues to operate until the stud 200, in cooperation with the camming surface 201, restores the lever 202 clockwise against the action of the spring 203, to move the surface 204 out of the path of the stud 205, whereupon the spring 181 immediately restores the lever 176 counter-clockwise to open the switch 189 and thus terminate operation of the motor 129. It will likewise be noted, by referring to Fig. 16, that an angular portion of the camming surface 201, in cooperation with the stud 200, and under influence of the comparatively strong spring 203, yieldingly retains the gears 137 and 136 and the clutch pawl 135 in their normal or home positions, as shown here. Thus the lever 202 performs the dual functions of delaying the opening of the motor switch and of operating as a homing device, to insure that the clutch pawl 135 is fully disengaged and maintained disengaged, and that the main cam shaft 138 is held in home position.

*Non-repeat mechanism*

A rather simple and effective non-repeat mechanism is provided for preventing repeat operations of the machine, in case any one of the keys 111 to 115 is inadvertently retained depressed at the end of machine operation.

Referring to Fig. 12, free on the shaft 157 is a non-repeat pawl 206 carrying a stud 207, which is maintained in yielding engagement with a shoulder on the release pawl 156 by a spring 208, tensioned between said release pawl and said non-repeat pawl. Downward or counter-clockwise movement of the control plate 166 (Fig. 12) upon depression of one of the control keys 111 to 115, as previously explained, disengages the release pawl 156 to initiate operation and causes the outer end of the non-repeat pawl 206 to come to rest on top of the stud 158, this being possible because of the flexible connection between said pawls afforded by the spring 208. Depression of one of the control keys 111 to 115 inclusive to initiate operation of the machine shifts the control plate 166 downwardly or counter-clockwise, and said control plate carries the release pawl 156 downwardly in unison therewith, to disengage its forward end from the stud 158 to free the key lock shaft 147 for releasing movement, as previously explained. The spring 208 carries the non-repeat pawl 206 downwardly in unison with the release pawl 156 until the outer end of said pawl contacts the stud 158 to terminate such movement and cause the spring 208 to be stretched.

If, after machine operation has been initiated, pressure is removed from the depressed control key 111 to 115, the spring 170 is free to restore the control plate 166 clockwise, upon counter-clockwise restoring movement of the shaft 147 and the crank 159, which restoring movement moves the stud 158 beyond the outer end of the release pawl, to free said pawl and the control plate 166 for clockwise restoring movement under influence of said spring 170. This restoration of the plate 166 frees the depressed control key 111 to 115 to the action of its spring 168, which immediately restores said key to undepressed position.

In case the control key 111 to 115 is held in depressed position at the end of machine operation, clockwise return movement of the control plate 166 and the release pawl 156, as explained above, is obstructed. However, in this case, repeat operation of the machine is prevented by the non-repeat pawl 206, which snaps downwardly under influence of the spring 208 when the stud 158 moves beyond its outer end, upon restoring movement of the shaft 147, and into the path of said stud to obstruct clockwise releasing movement of said shaft 147. When pressure is released from the depressed key 111 to 115, the corresponding spring 168 (Fig. 12) immediately restores said key upwardly, causing the stud 164, in co-operation with the curved slot 165, to assist the spring 170 in restoring the plate 166 and the pawls 206 and 156 upwardly or clockwise to normal position. This restoring movement of the pawls 206 and 156 disengages the outer end of said non-repeat pawl 206 from the stud 158 and moves the outer end of the release pawl 156 into the path of said stud, to locate the release shaft 147 in home position and to condition the machine-starting or -releasing mechanism for subsequent operation. Counter-clockwise releasing movement of the control plate 166, upon depression of any one of the control keys 111 to 115, moves a blocking surface 210 (Fig. 12) on said plate into the path of the corresponding stud 164 in the undepressed control keys to lock or retain said keys in undepressed position throughout machine operations.

*Amount keys and differential mechanisms therefor*

As explained previously in connection with Fig. 1, the present machine is provided with four rows of amount keys 110, and each row of amount keys is provided with a corresponding differential mechanism for transferring the value of the depressed key to the indicating and printing mechanism and for setting the wheels of the selected totalizer according to the value of said depressed amount key. Inasmuch as these amount banks are similar in construction, it is believed that a description of the amount bank illustrated in Fig. 4, as representative of all the amount banks, will be sufficient.

The amount keys 110 (Figs. 1 and 4) are slidably supported in corresponding slots in a key frame 212 removably attached to the machine by means of rounded notches therein which engage the rods 162 and 163 in exactly the same manner as explained for the control key frame 161. The key frame 212 may be readily removed from the machine by turning the upper rod 162 approximately 90 degrees, which moves a flat portion thereof into position to provide clearance for the inner edge of the notch in said frame, thus permitting said frame 212 to be rocked forwardly or counter-clockwise out of engagement with said rod, and then to be lifted off of the lower rod 163. Each key 110 is urged upwardly to undepressed position by a corresponding compressible spring 213, which encircles the lower end of the stem of said key. Each of the amount keys 110 carries a stud 214, which coacts with a corresponding hook on a locking detent 215 mounted for swinging movement on inner ends of parallel links 216 and 217, in turn pivoted on studs 218 and 219, secured in the frame 212. A spring 220 urges the locking detent 215 inwardly or toward the right (Fig. 4) to normally maintain the angular camming noses on the hooks of said detent in yielding engagement with their corresponding studs 214 in the keys 110.

Depression of any one of the amount keys 110 causes the stud 214 therein, in cooperation with the angular nose on the corresponding hook, to shift the locking detent 215 downwardly or counter-clockwise (Fig. 4), which movement rocks the link 217 clockwise to move a lower surface on a downward extension 225 thereof into the path of an ear 226 on an arm 227 secured on the key lock and release shaft 147 to block releasing movement of said arm and said shaft 147 in a clockwise direction when an amount key 110 is partially depressed. Full depression of an amount key moves a flat upper surface on the stud 214 beyond the shoulder on the corresponding hook to free the detent 215 to the action of the spring 220, which immediately returns said detent upwardly or clockwise to latch the shoulder over the flat surface to retain the key in depressed position against the action of the spring 213 and to restore the link 217 counter-clockwise to move the extension 225 out of the path of the ear 226. Clockwise movement of the shaft 147 and the arm 227, upon subsequent release of the machine for operation, causes the ear 226 to move into the path of an arcuate surface on the extension 225 (Fig. 4) to obstruct downward or counter-clockwise movement of the locking detent 215, and thus lock the depressed amount key 110 in depressed position and simultaneously lock the undepressed amount keys against depression during machine operation. Counter-clockwise restoring movement of the shaft 147 and the arm 227, near the end of machine operation, as explained previously, causes the outer surface of said arm 227 to engage a stud 228 in the link 217 and rock said link clockwise to shift the detent 215 downwardly, against the action of the spring 220, to disengage the shoulder on the hook of said detent from the flat surface on the stud 214 of the depressed amount key 110 to free said key to the action of its spring 213, which immediately restores said key upwardly to undepressed position.

If desired, the depressed amount key 110 may be released, prior to machine operation, by the manual operation of the release key 116 (Figs. 1 and 15). The key 116 is mounted in a frame 230 supported by the rods 162 and 163 in the same manner as explained in connection with the amount key frame 212 (Fig. 4). Depression of the release key 116 (Fig. 15) causes a stud 231 carried thereby, in cooperation with an upward surface of a segment 232 free on a stud 233 in the left frame 101, to rock said segment clockwise. Clockwise movement of the segment 232 causes a stud 234 therein, in cooperation with a flat inner surface on a slide 235, shiftably mounted on the key frame 230, by means of three slots therein in cooperation with three studs 236 secured in said frame, to shift said slide downwardly or counter-clockwise against the action of a spring 237 tensioned between said slide and the key frame 230. Downward movement of the slide 235 causes a camming surface 238 thereon, in cooperation with a roller 239 mounted on the upper end of an arm 240 secured on the shaft 147, to rock said arm and said shaft counter-clockwise from normal position to a position corresponding to the fully-restored position of said shaft 147, as explained earlier herein in connection with the machine-releasing mechanism. Counter-clockwise movement of the shaft 147 (Fig. 4) and of the arm 227 causes said arm to engage the stud 228 to rock the link 217 clockwise. Clockwise movement of the link 217 shifts the locking detent 215 downwardly against the action of its spring 220 to disengage the hook on said detent from the stud 214 of the depressed amount key 110 to free said key to the action of the spring 213, which immediately restores said key upwardly to undepressed position. Likewise, restoring movement of the shaft 147, near the end of machine operation, as explained before, causes the arm 227 to engage the stud 228 and shift the detent 215 downwardly to release the depressed amount key near the end of machine operation.

Clockwise movement of the shaft 147 (Fig. 15) and the arm 240, to release the machine for operation, causes the roller 239 to move beneath an arcuate surface 241 on the outer edge of the slide 235 to secure said slide in its inward position and thus lock the release key 116 against operation at this time. The stud 231 in the release key 116 engages a slot 242 in a plate 243, secured to the left frame 101, and prevents twisting of said key, as it is being depressed, and consequent increased frictional drag, which would cause hard operation of said key.

The lower ends of the stems of the amount keys 110 (Fig. 4) are arranged to cooperate with a projection 246 of a corresponding primary differential member 247 free on a shaft 248 journaled in the main frames of the machine. Associated with the primary differential member 247 is a secondary differential member 249, also free on the shaft 248. The primary and secondary differential members are actuated by a universal rod or bail 250 supported between two similar arms 251 (see also Fig. 6) secured on the shaft 248, said rod passing through and coacting with a slot 252 in the primary member 247, and with a corresponding slot 253 in the secondary member 249. The primary and secondary differential members 247 and 249 are spaced apart by a large washer or spacing plate 254 (Fig. 6) free on the shaft 248 having a boring which fits freely on the rod 250, so that said plate 254 moves in unison with said rod as it oscillates back and forth to position the differential members, as will be explained presently. Secured on the shaft 248 adjacent the left-hand arm 251 (Figs. 6 and 8) is a gear 255, the teeth of which mesh with teeth in an upward extension of a segment 256 free on the shaft 151 and having rollers 257 and 258, which coact with the peripheries of companion plate cams 259 and 260 secured on the main cam shaft 138. Revolution of the main cam shaft 138 and the cams 259 and 260 causes the segment 256 to oscillate the shaft 248 and the leading rod 250 first clockwise (Fig. 8) and then back to normal position through an angle of approximately 90 degrees each machine operation, according to the time given in space 7, Fig. 51. The secondary differential member 249 (Fig. 4) has, in its periphery, teeth which mesh with teeth in a gear 261 free on a shaft 262 supported by the main frames 100 and 101. The gear 261 meshes with teeth in the periphery of a segmental gear 263, having internal teeth which bear on the periphery of a disk 264 supported by a shaft 265 in turn supported by the main frames 100 and 101. The internal teeth of the segment 263 (Fig. 4) mesh with and drive a pinion 266, said pinion in turn driving a corresponding square shaft 267 supported by disks similar to the disk 264. Other pinions on the shaft 267 mesh with and drive segments similar to the segment 263 (Fig. 4), said segments in turn driving corresponding type wheels for printing records on the issuing receipt material and upon the audit or detail strip.

The transmission gearing, comprising the internal-external segments 263, the pinions 266, the shafts 267, and corresponding segments driven by said shaft, constitutes the Kreider type of transmission mechanism, which is well known in the art.

Teeth 268 in the upper periphery of the segment 263 mesh with a corresponding pinion 269 integral with a corresponding front indicator 120 free on a shaft 270 supported by the auxiliary frames 102 and 103 (Fig. 6). The front indicator 120 is visible through the aperture 122 in the front of the cabinet 108 (Fig. 1), while a companion back indicator (not shown), which is visible through an aperture in the back of said cabinet, is positioned in unison with the front indicator by means of the pinions 266 on the shaft 267 and corresponding segments, similar to the segment 263, in the well-known and usual manner.

After the primary differential member 247 (Fig. 4) has been positioned under influence of the depressed amount key 110, and after the secondary member 249 has been restored to zero position, as will be explained presently, the two members are clutched together by a clutch pinion 272 (Figs. 4 and 7) free on a rod 273 supported by three parallel arms 274 secured on the shaft 157, which clutch pinion remains engaged at the end of machine operation. The central arm 274 (Fig. 7) has pivotally connected thereto the upper end of a link 275, the lower end of which is pivotally connected to a cam lever 276 free on the shaft 151 and carrying rollers 277 and 278, which cooperate with the peripheries of companion plate cams 279 and 280, secured on the main cam shaft 138.

Depression of one of the amount keys 110 (Fig. 4) moves the lower end of its stem into the path of the projection 246 of the primary differential member 247, after which the machine may be released for operation by depression of one of the control keys 111 to 115 (Fig. 12) in the manner explained previously. At the beginning of machine operations, the cams 279 and 280, operating according to the time given in space 5 of the time chart (Fig. 51), cause the cam lever 276 and the link 275 to rock the arm 274, the shaft 157, and the rod 273 clockwise to disengage the teeth of the clutch pinion 272 from the corresponding teeth of the primary and secondary differential members 247 and 249. Coincidentally with the disengagement of the pinion 272 from the differential members, the teeth of said pinion are engaged with an alining tooth 282 (Figs. 4 and 7) on an arm 283 secured on a shaft 284 supported by the machine framework, to maintain the teeth of said pinion in alinement with the corresponding teeth of the differential members to eliminate any danger of the teeth clashing or stumbling on each other upon engaging movement of said pinions with said differential members. Immediately after the clutch pinion 272 has been disengaged, the rod 250 (Figs. 4 and 8), operating under influence of the cams 259 and 260, and according to the time given in space 7 of the time chart (Fig. 51), starts its initial movement in a clockwise direction. A comparatively strong spring 285 (Fig. 4), tensioned between the primary differential member 247 and a stationary rod supported in the machine framework, urges said primary member clockwise to maintain the rear end of the slot 252 therein in yielding engagement with the rod 250, and consequently said primary member is led clockwise by the rod 250 until the projection 246 strikes the end of the depressed amount key 110 to position the primary member in accordance with the value of said key. The rod 250 continues its clockwise movement, during the course of which it engages the forward end of the slot 253 in the secondary differential member 249 and carries said member and the mechanism connected thereto, including the corresponding indicator 120 and type wheels, from their preset position to a normal or home position.

After the primary differential member has been positioned by the depressed amount key 110, and after the secondary differential member and the mechanism connected thereto have been restored to normal or home position, as explained above, the clutch pinion 272 (Fig. 4) is reengaged with the teeth in said primary and said secondary members to couple said members together for unitary movement. Counter-clockwise return movement of the rod 250 (Figs. 4 and 8) causes said rod to engage the rear end of the slot 252 in the primary differential member 247 and carry said member and, through the clutch pinion 272, the secondary differential member 249 counter-clockwise in unison therewith to return said primary member to normal or zero position, as shown in Fig. 4, and to position the secondary member 249 and the mechanism connected thereto in accordance with the value of the depressed amount key 110.

When the machine is operated with no amount key 110 depressed in the amount bank being described, a zero stop bar 286 (Figs. 4 and 9) is automatically moved into the path of the projection 246 at the beginning of machine operation and retains the primary differential member 247 in zero position, and said primary member in turn positions the secondary differential member 249 and the corresponding indicator and type wheels in zero position. Depression of an amount key 110 causes the zero stop bar 286 to be latched in ineffective position, so that it will not be moved into the path of the projection 246.

The lower end of the stop bar 286 (Figs. 4 and 9) is guided in a slot in the frame 212, while its upper end is slotted to embrace the stud 219 in the frame 212. A spring 290 urges the bar 286 inwardly to normally maintain a stud 287, carried thereby, in yielding contact with an upward extension of a zero bar control arm 288 free on the shaft 284 and having a slot 289, which engages a stud 291 in the arm 227. Clockwise releasing movement of the arm 227 causes the stud 291 to move down into a clearance portion of the slot 289 to free the arm 288 and the zero stop bar 286 to the action of the spring 290, which immediately shifts said bar inwardly, to the dot-and-dash-line position (Fig. 9), into the path of the projection 246 (Figs. 4 and 9) to retain the primary differential member 247 in zero position when no amount key 110 is depressed.

Depression of an amount key 110 (Figs. 4 and 9) causes the stud 214 therein, in cooperation with a corresponding camming lug on a control plate 221, rockably supported by links 222 and 223, pivoted on the studs 218 and 219, to shift said plate 221 downwardly or counter-clockwise against the action of the spring 224. Downward movement of the plate 221 shifts the link 223 also downwardly or clockwise to latch a curved slot 293, in a hook-shaped rearward extension thereof, over a stud 294 in the zero stop bar 286 to retain said bar in its ineffective position. Counter-clockwise restoring movement of the arm 227, through the stud 291 coacting with the slot 289, causes the arm 288 to restore the zero stop bar 286 outwardly against the action of the spring 290 to normal position, as shown here in full lines.

In totalizing operations, often referred to herein as reading and resetting operations, mechanism under control of the total control lever 117 (Fig. 1), and to be described later, is provided for retaining all the zero stop bars 286 in their outward or ineffective positions, so that the primary differential members 247 are free to be positioned under influence of the corresponding wheels of the selected totalizer as said wheels are reversely rotated to zero position by said primary differential members.

Totalizers in general

The present machine is provided with two sets of totalizer wheels, one set constituting an item totalizer for accumulating the total amount of the several items of a multiple-item transaction, and the other a storage or group totalizer for receiving amounts cleared from the item totalizer at the end of multiple-item transactions and for receiving directly the amounts of the items in single-item transactions.

The item totalizer comprises a set of denominational wheels 296 (Figs. 4 and 32 to 36), spaced so as to be engageable with the primary members 247, and the storage totalizer comprises a set of denominational wheels 297, spaced a slight distance from the corresponding item totalizer wheels and so arranged as to be engageable with the corresponding primary differential members, said two sets of wheels being rotatably supported on a sleeve 298, the wheels 296 and 297 of different denominations being spaced apart by spacing collars 295 and a shifting collar 307, free on said sleeve 298, so as to match the spacing of the primary differential members. The sleeve 298 is slidably mounted on a shaft 299, mounted in a shiftable totalizer framework 300, comprising similar end plates 301 and 302, maintained in spaced relationship to each other by the shaft 299 and a shaft 303. The shiftable totalizer frame 300 is supported for shifting movement by the shafts 299 and 303, which extend through parallel slots in right and left totalizer support frames 304 and 305 (Fig. 36) in turn secured, respectively, to the right main frame 100 and the left main frame 101.

Totalizer shifting mechanism

Mechanism is provided for shifting the sleeve 298 (Figs. 4, 22, 23, and 36) laterally on the shaft 299, to aline either of the two sets of totalizer wheels 296 and 297 with the primary differential members, so that they may be engaged and disengaged with and from said members in proper timing for the type of machine operation being performed.

Figure 22:
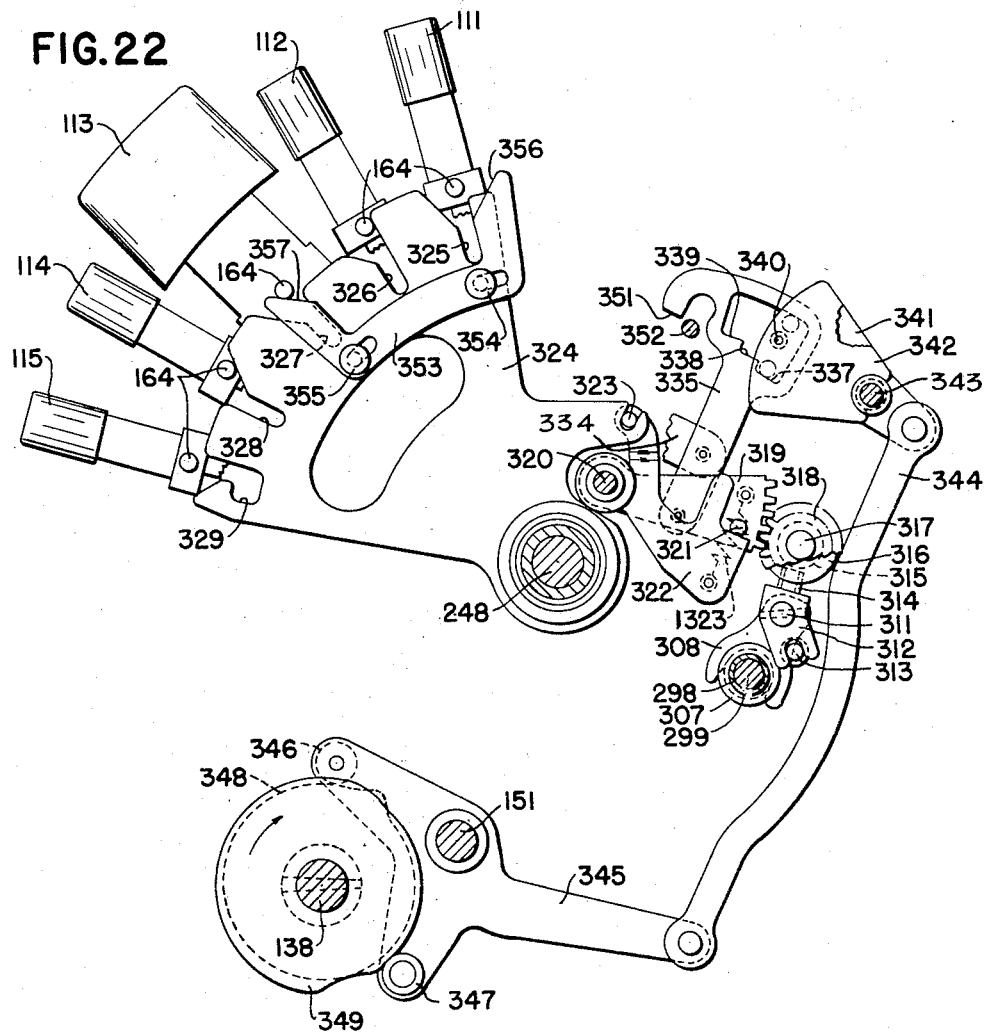
Fig. 22 is a right side elevation showing the control keys and the manner in which these keys operate to control the selection of the cash or item totalizer and the group totalizers.

The shifting collar 307 (Figs. 22 and 36) has an annular groove, engaged by the two prongs of a totalizer-shifting fork 308 secured to a hub 309 free on a rod 311 shiftably supported in the frames 304 and 305, said hub 309 and said fork 308 fitting snugly between collars 310 secured on said rod 311, so that they will move laterally in unison with said rod. Secured on the right-hand end of the rod 311 is a shifting block 312, having a downward extension with a slot which freely engages a reduced portion of a stud 313 secured in the frame 304 (Fig. 36) to hold said block and the rod 311 against rotation. The block 312 has, mounted on a flat upper surface thereof, a roller 314, which engages a helical shifting groove 315 in a drum cam 316 free on a stud 317 secured in the frame 304. Integral with the cam 316 is a gear 318, which meshes with a segment 319 (Fig. 22) free on a stud 320 fast in the frame 100. The segment 319 carries a stud 321, which is maintained in yielding contact with a shoulder on a totalizer-shifting arm 322, free on the stud 320, by a spring 1323 tensioned between said segment 319 and said arm 322. An upward extension of the arm 322 carries a stud 323 engaged by a slot in a rearward extension of a totalizer-shifting segment 324 integral with a hub free on the shaft 248. Formed in the periphery of the segment 324 are shifting notches 325 to 329 inclusive, which cooperate with the studs 164 in the control keys 111 to 115, respectively, to shift the two totalizers into alinement with the primary differential members. The studs 164 in the keys 111, 112, and 113, coacting with the notches 325, 326, and 327, position the segment 324 as shown in Fig. 22, which, through the arm 322 and the segment 319, position the drum cam 316 accordingly, causing the groove 315 in said cam, in cooperation with the roller 314, to shift the block 312 (Fig. 36), the shaft 311, and the shifting fork 308 toward the left, as viewed here, to aline the wheels 296 of the item totalizer with the primary differential members 247 for actuation thereby.

Depression of the Single Item key 114 (Fig. 22) causes its stud 164, in cooperation with the shifting notch 328, to shift the segment 324 clockwise, which, through the arm 322 and the segment 319, rotates the drum cam 316, causing the groove therein, in cooperation with the roller 314, to shift the block 312, the rod 311, the fork 308, and the sleeve 298 toward the right, as viewed in Fig. 36, to aline the wheels 297 of the storage totalizer with the primary differential members for actuation thereby. Depression of the Total Cash key 115 (Fig. 22) causes its stud 164, in cooperation with the camming notch 329, to first position the segment 324 to aline the wheels 296 of the item totalizer with the primary differential members for actuation thereby. However, the key 115 likewise controls mechanism, which functions automatically during machine operation, to aline the wheels 297 of the storage totalizer with the primary differential members near the end of machine operation, so that amounts cleared from the item totalizer during the first part of total cash operations will be added in the storage totalizer during the latter part of said operation. The stud 164 in the key 115 (Fig. 23) coacts with a camming notch 331 in a segment 332 free on the shaft 248 and urged counter-clockwise by a spring 333 to normally maintain a camming finger adjacent the notch 331 in yielding contact with said stud 164. A rearward extension of the segment 332 is pivotally connected by a link 334 to a shifting arm 335 pivoted near its lower end on a stud 336 in the segment 319. An opening near the upper end of the arm 335 has steps 337, 338, and 339, which cooperate with a stud 340, which extends between spaced-apart segmental portions of similar outline of an arm 341 and a plate 342 connected to a hub which is in turn rotatably supported on a stud 343 in the right frame 100. The segmental portion of the arm 341 and the plate 342 snugly embrace the upper end of the arm 335 to prevent lateral displacement of said arm and thus insure that the steps 337, 338, and 339 are always within coacting relationship with the stud 340. A rearward extension of the arm 341 (Fig. 22) has pivotally connected thereto the upper end of a link 344, the lower end of which is pivotally connected to a rearward extension of a cam lever 345 free on the shaft 151 and having rollers 346 and 347, which cooperate, respectively, with the peripheries of companion plate cams 348 and 349 secured on the main cam shaft 138 and operating according to the time given in space 6 of the time chart (Fig. 51) to oscillate the arm 341 to aline the two sets of totalizer wheels with the primary differential members, as will be explained presently.

In Total Cash operations, which are initiated by depression of the Total Cash key 115 (Figs. 1 and 22), it is desirable that the item totalizer first be cleared of the amount of the items previously entered therein under influence of the Multiple-Item key 113 and that the total of these items be entered into the storage totalizer. To effect this type of operation, depression of the Total Cash key 115 causes the stud 164, in cooperation with the camming notch 329, to shift the segment 324 downwardly or counterclockwise, which movement carries the totalizer-shifting arm 322 and the segment 319 counter-clockwise in unison therewith to aline the wheels 296 (Fig. 36) of the item totalizer with the primary differential members 247 (see also Fig. 4), so that initial movement of said primary members will rotate said wheels in a reverse direction to zero, to position said primary differential members in accordance with the amount standing on said item totalizer wheels.

Depression of the Total Cash key 115 (Fig. 23) also causes the stud 164, in cooperation with the camming notch 331, to shift the segment 332 clockwise, which, through the link 334, carries the arm 335 in unison therewith to move the step 338 into operative alinement with the stud 340. However, inasmuch as the stud 340 remains in its central or neutral position, as shown here, during the first part of a Total Cash operation (compare spaces 2 and 6, Fig. 51), the positioning of the arm 335 does not interfere with the selection of the item totalizer for actuation in the manner explained above. After the item totalizer wheels have been zeroized, and prior to return movement of the primary differential members 247, the stud 340 (Figs. 22 and 23) is rocked downwardly under influence of the cams 348 and 349, from its neutral position to its lower position, as shown here in dot-and-dash lines. During its downward movement, the stud 340 engages the step 338 and shifts the arm 335 and the segment 319 downwardly or clockwise to aline the wheels 297 (Figs. 4 and 36) of the storage totalizer with the primary differential members 247 prior to return movement of said primary differential members, which movement rotates the wheels of the storage totalizer to add therein the amount cleared from the item totalizer during the first part of machine operation.

The enlarged lower portion of the notch 329 in the segment 324 (Fig. 22) permits said segment to shift clockwise in the latter part of machine operation under influence of the stud 340, as explained above, to aline the wheels of the storage totalizer with the primary differential members, while the Total Cash key 115 remains depressed. Near the end of a Total Cash operation, clockwise return movement of the arm 341 and the stud 340 causes said stud to engage the upper portion of the opening in the arm 335 and restore said arm, the segment 319, the arm 322, and the segment 324 counter-clockwise to normal position, in which the wheels of the item totalizer are again in alinement with the primary differential members, and the open portion of the notch 329 is in alinement with the stud 164 in the Total Cash key 115, so that, when said key is automatically released near the end of Total Cash operations, it will be spring-restored upwardly to undepressed position. After the arm 335 and the segment 324 have been restored, the cams 348 and 349 return the arm 341 and the stud 340 to neutral or normal position (space 6, Fig. 51), as shown here, where said stud will not interfere with selecting movement of said arm 335 upon depression of one of the control keys 111 to 115 inclusive. Restoration of the Total Cash key 115 to undepressed position (Fig. 23) releases the segment 332 to the action of the spring 333, which restores said segment and the arm 335 counter-clockwise to normal position, to move the item total step 337 in the opening of said arm 335 into operative alinement with the shifting stud 340.

The flexible connection effected between the segment 319 and the arm 322 (Fig. 22) by the spring 1323 permits the arm 335 and said segment 319 to be restored upwardly or counter-clockwise near the end of machine operation by the stud 340, as explained above, even though the segment 324 and the arm 322 may be retained in their clockwise position by the inadvertent retention of the Single Item control key 114 in depressed position at the end of machine operation, without any danger of damaging the totalizer-selecting mechanism.

The third step 339 (Fig. 22) in the opening of the arm 335 is not used in the present adaptation of the machine but is provided for anticipated future expansion of the machine to include a third set of wheels on the totalizer line for selection under control of one of the control keys 111 to 115. In the expanded form of machine, the third set of totalizer wheels may be arranged to be selected, in the manner explained above, by a control key corresponding to the Tax control key 111, which may be termed a Paid-Out key and used to select the third totalizer to accumulate a total of the paid-out items.

A forward hook-shaped extension of the arm 335 (Figs. 22 and 23) has thereon a control surface 351, which coacts with a stud 352 secured in the right frame 100 to provide a fixed stop for said arm 335 when it is shifted downwardly under influence of the stud 340 in cooperation with either of the steps 338 and 339, as explained above.

Means is provided for preventing depression of both of the keys 111 and 113 (Fig. 22) at the same time, said means comprising a curved slide 353 shiftably mounted on the segment 324 by means of two concentric slots therein, in cooperation with studs 354 and 355, secured in said segment 324. Upward extensions of the slide 353 have control surfaces 356 and 357, which cooperate, respectively, with the studs 164 in the Tax key 111 and the Multiple Item key 113, so that, when either one of these keys is depressed, said slide is shifted into a position where the control surface, coacting with the stud 164, blocks depression of the other key.

*Transaction differential mechanism*

The transaction keys 111 to 115 inclusive (Figs. 1 and 12) are provided with a differential mechanism similar in every respect to the amount differential mechanism shown in Fig. 4 and described above, said differential mechanism acting to position corresponding indicators and type wheels in accordance with the depressed transaction key for the purpose of indicating and recording media for use in identifying the type of transactions performed.

Depression of one of the control keys 111 to 115 (Fig. 12) moves the lower end of its stem into the path of a projection 359 on a transaction primary differential member free on the shaft 248 and urged clockwise by a spring 361 into yielding engagement with the leading or universal rod 250. Rotatably mounted on the shaft 248, adjacent to the primary differential member 360, is a corresponding secondary differential member 362, having gear teeth which mesh with and drive gear 363, free on the shaft 262 and integral with a companion gear 364 (see also Fig. 6), which meshes with and drives a segmental transmission gear 365, similar to the segment 263 (Fig. 4) for the amount bank and connected by similar gearing to the transaction indicator 121 (Fig. 1) and to corresponding transaction type wheels, for positioning said indicator and said type wheels in accordance with the depressed transaction key.

Clockwise initial movement of the rod 250 (Fig. 12 and space 7, Fig. 51) permits the spring 361 to lead the primary differential member 360 in unison therewith until the projection 359 contacts the stem of the depressed transaction key 111 to 115, to position said primary member in accordance with said key. Continued movement of the rod 250 restores the secondary differential member 362 and the indicator and type wheels connected thereto to normal or zero position, in the manner explained in connection with the amount bank (Fig. 4). Prior to counter-clockwise return movement of the rod 250, a transaction clutch pinion 366, similar to the amount clutch pinions 272 (Fig. 7), is engaged with corresponding teeth in the peripheries of the primary differential member 360 and the secondary differential member 362, to lock said members together for unitary movement, in the manner explained previously. The pinion 366 is rotatably supported on a stud 367 (Fig. 13) fast in an arm 368 secured on the shaft 157 for unitary movement with the amount clutch pinions 272 (Fig. 7) under influence of the cams 279 and 280 (space 5, Fig. 51), as explained in connection with the amount differential mechanism. After the clutch pinion 366 has been engaged, as explained above (Fig. 12), return movement of the rod 250 picks up the primary transaction differential member 360 from its preset position and returns it to its home position, and, in so doing, positions the secondary member in accordance therewith, said secondary member in turn positioning the corresponding indicator and type wheels so that media will be indicated and recorded, to identify the type of transaction being performed.

As explained in connection with the amount differential mechanism, the clutch pinion 366 (Fig. 12) remains in engagement with the teeth of the members 360 and 362 at the end of machine operation and is disengaged therefrom at the very beginning of the immediately succeeding operation, so that said members are free to be positioned under control of the depressed transaction key, in the manner explained above.

Referring to Figs. 1 and 12, in multiple-item and tax transactions, it is required to lock the Single Item key 114 against depression until a total cash operation is performed under control of the Total Cash key 115, to clear the amount of the transaction from the item totalizer and to add it in the storage totalizer.

Slidably mounted on the control plate 166 for the transaction bank (Figs. 12 and 13) is a plate 370, having camming projections 371 and 372, which cooperate, respectively, with the studs 164 in the Multiple-Item key 113 and the Tax key 111, said camming projections being maintained in yielding engagement with said studs 164 by the spring 170, which is tensioned between the control plate 166 and said plate 370. Depression of either of the keys 111 or 113 causes its stud 164, coacting with the corresponding camming projection, to shift the plate 370 rearwardly or clockwise, against the action of the spring 170, to move a finger 373 on said plate beneath the stud 164 in the Single-Item key 114, to obstruct depression of said key. Clockwise movement of the plate 370 moves a notch in its lower surface opposite a tooth on a retaining pawl 375 free on a stud 376 fast in an arcuate plate 377 secured to the transaction key frame 161. A torsion spring 378 immediately urges the pawl 375 counter-clockwise to move the tooth into engagement with the notch 374, to retain the plate 370 in its clockwise or locking position, until the release of said pawl is effected by depression of the Total Cash key 115 in a total cash operation.

The pawl 375 has a hook-shaped extension 379, which cooperates with a similar extension 380 on a slide 381, having in its lower end a slot which freely engages a bushing 382 on the shaft 248, and having another slot which freely engages a stud 383 in the segment 332. Depression of the Total Cash key at the end of an itemizing transaction causes its stud 164 (Fig. 13), in cooperation with the camming notch 331, to rock the segment 332 clockwise, which, by means of the stud 383, carries the slide 381 in unison therewith to move the extension 380 over the extension 379 of the pawl 375. At the beginning of a Total Cash operation, clockwise disengaging movement of the arm 368 and the transaction clutch pinion 366 (space 5, Fig. 51) causes a notch 384 in an upward extension of said arm, coacting with a stud 385 in the slide 381, to shift said slide inwardly. This causes the extension 380 to engage the extension 379 and carry the pawl 375 in unison with the slide 381, to disengage the tooth of said pawl from the notch 374 to free the plate 370 to the action of the spring 170 (Fig. 12), which immediately restores said plate counter-clockwise to normal position, as shown here.

From the foregoing description it should be understood that depression of the Tax key 111 (Fig. 12) or the Multiple-Item key 113, through the medium of the plate 370, locks the Single-Item key 114 against depression until a total cash operation is performed, under influence of the Total Cash key 115, to enforce the completion of a multiple-item transaction under control of the keys 111 and 113.

*Aliners for differential and indicator mechanisms*

Directing attention to Figs. 4 and 12, aliner mechanisms are provided for the primary differential members 247 and 360, for the corresponding segments 263 and 365, and for the corresponding indicators 120 and 121, to aline said parts in set positions, after they have been positioned under influence of the corresponding keys in adding operations, or under influence of the corresponding totalizer wheels in totalizing operations.

The differential leading rod or bail 250 (Figs. 4, 6, and 8) extends through close-fitting holes in the spacing plates 254 for the primary and secondary differential members and, as a result, carries said plates back and forth in unison therewith. Also supported by corresponding alined holes in the spacing plates 254 and by the left arm 251 is a rod 387, which moves in unison with said rod 250 and the spacing plates 254. When the rod 387 nears the terminus of its movement in an initial or clockwise direction, it engages an arcuate surface 388 on a retaining pawl 389 for each amount primary differential member 247 (Fig. 6), free on the shaft 262, and rocks said pawls clockwise against the action of springs 390, to engage a tooth 391 on each of said pawls with a corresponding tooth space in the primary differential members 247.

The above-described engagement of the teeth of the pawls 389 with the primary differential members 247 is to hold said members against the action of their springs 285 in totalizing operations, in which said segments are positioned under influence of the corresponding wheels of the selected totalizer (Fig. 4) to overcome the possibility of said primary differential members moving slightly out of position when the corresponding totalizer wheels are disengaged therefrom just prior to operation of the aliner mechanism for the segments 263. Counter-clockwise return movement of the rod 387 withdraws it from the surfaces 388 to free the pawls 389 to the action of the springs 390, which restore said pawls counter-clockwise until a stop finger 392 on each of said pawls is moved into yielding contact with a shaft 393 supported by the machine framework, to disengage the teeth 391 from the teeth of the primary differential members 247.

The transmission segments 263 for the amount differential mechanism shown in Fig. 4, and used here as representative of all the amount differentials, have aliner teeth 394 arranged to be engaged by an aliner bar 395, supported on three similar arms 396 secured on a shaft 397 journaled in the machine framework. Also secured on the shaft 397 is a crank 398 pivotally connected by a link 399 to one arm of a bell crank 400 free on a rod 401 supported by the machine framework. The other arm of the bell crank 400 is pivotally connected by a link 402 to a downward arm of a lever 403 free on the shaft 151 and carrying rollers 404 and 405, which coact, respectively, with the peripheries of companion plate cams 406 and 407, secured on the main cam shaft 138.

Operation of the cams 406 and 407 according to the time given in space 8 of the time chart (Fig. 51) engages the aliner bar 395 with the teeth 394 of the segment 263, after said segment has been positioned under influence of the differential mechanism and prior to operation of the printing mechanism, to insure that said parts are held in set positions. After the printing mechanism has operated, and after the selected set of totalizer wheels has been disengaged from the primary differential members 247, the aliner bar 395 is disengaged from the teeth 394, said bar being assisted in such disengagement by a spring 408, tensioned between the link 399 and a stud in the back plate 107, which spring yieldingly maintains said bar in disengaged position at the end of machine operation.

The pinion 269 for the indicator 120 for the amount differential mechanism shown in Fig. 4 and described here as representative of all the amount differentials is normally engaged by the tooth of an indicator alining pawl 410 secured on a shaft 411, said shaft being urged counter-clockwise by a spring 412, tensioned between a stationary stud (not shown) and an arm 413, secured on said shaft 411. Also secured on the shaft 411 is a crank 414 pivotally connected by a link 415 to a rearward arm of a bell crank 416 (Figs. 4 and 14) free on the rod 401. A downward arm of the bell crank 416 is pivotally connected by a link 417 to a lever 418 free on the shaft 151, said lever carrying a roller 419, which coacts with the periphery of a plate cam 420, secured on the main cam shaft 138. During operation of the machine, the cam 420 causes the aliner pawl 410 to operate according to the time given in space 12 of the time chart, Fig. 51, to first rock said pawl clockwise against the action of the spring 412, out of engagement with the pinion 269, at the beginning of machine operation, so that the indicator 120 will be free to be positioned under influence of the differential mechanism in the manner explained previously. After the indicator 120 has been properly positioned, the cam 420 permits the spring 412 (Fig. 4) to reengage the tooth of the pawl 410 with the pinion 269 to aline and retain the indicator 120 in set position during the remainder of machine operation.

*Totalizer shifting aliner*

Mechanism is provided for alining the selected set of totalizer wheels with the amount primary differential members 247 (Fig. 4) during machine operation, and this mechanism comprises three similar alining disks 421 (Figs. 22, 25, and 36) secured in equally-spaced relationship to each other on the shifting rod 311, which, it will be recalled, is utilized for shifting the totalizer line laterally to selectively aline the two sets of totalizer wheels 296 and 297 thereon with the primary differential members 247. Coacting with the alining disks 421 is a series of equally-spaced alining teeth on a block 422 (Fig. 25) secured to the upper end of an arm 423 free on a stud 424 secured in the frame 305. The arm 423 is pivotally connected by a link 425 to a lever 426, free on the shaft 151 and carrying rollers 427 and 428, which cooperate, respectively, with the peripheries of companion plate cams 429 and 430, secured on the main cam shaft 138.

When the machine is at rest, the teeth of the aliner block 422 are disengaged from the alining disks 421, as shown in Fig. 25. However, during machine operation, the cams 429 and 430 operate according to the time given in space 11, Fig. 51, to engage the alining teeth of the block 422 with the disks 421, at the beginning of machine operation, to aline the initially-selected set of totalizer wheels with the primary differential members. After sufficient time has elapsed to provide for the zeroizing of the initially-selected totalizer wheels, usually the item totalizer wheels 296, the aliner 422 is disengaged, to permit automatic shifting of the totalizer line, as explained earlier herein in connection with Fig. 22 and space 6, Fig. 51, to aline the wheels 297 of the storage totalizer with the primary differential members, so that the amount cleared from the item totalizer may be transferred thereto during the latter part of machine operation. After the totalizer line has been shifted, the aliner 422 (Fig. 25) is again engaged with the disks 421 to aline the wheels 297 of the storage totalizer with the primary differential members, and said aliner remains thus engaged until near the end of machine operation, at which time it is again disengaged (see space 11, Fig. 51). The upper end of the arm 423 (Fig. 25) snugly engages a guide slot in a bracket 431 secured to the frame 305, to prevent lateral displacement of said arm and thus maintain accurate alinement of the selected set of totalizer wheels with the primary differential members.

*Totalizer engaging mechanism*

Mechanism operating under control of the control keys 111 to 115 inclusive (Fig. 1) and under control of the total control lever 117 is provided for shifting the totalizer framework 300 (Figs. 32, 33, and 36) in and out for engaging and disengaging the selected set of totalizer wheels with and from the primary differential members in proper timing for the type of operation, adding or totalizing, being performed.

As previously explained, the framework 300 for the totalizers is shiftably supported between the frames 304 and 305 (Figs. 32 and 36) by means of alined parallel slots in each of said frames, which are engaged by opposite ends of the totalizer shaft 299 and opposite ends of the shaft 303, said shafts in turn being supported by the end plates 301 and 302 of the totalizer framework. Opposite ends of the shaft 303 support rollers 434 (Figs. 30 and 36) engaged, respectively, by the slotted upper ends of arms 435 and 436 secured on a shaft 437 supported in the frames 304 and 305. The arm 435 has a cam slot 438 engaged by a roller 439 carried by an arm 440 free on a stud 441 supported between the frames 100 and 304. A stud 432, supported between an extension of the arm 440 and a crank 442 secured on the stud 441, pivotally supports the rear end of a shifting pitman 443 (Figs. 31 and 36). The enlarged forward end of the pitman 443 (Fig. 31) has an opening 444 with graduated control surfaces which coact with a stud 445 in a cam lever 446 free on the shaft 151 and carrying a roller 447, which coacts with the periphery of an add plate cam 448 secured on the main cam shaft 138. A spring 449 urges the lever 446 counter-clockwise to normally maintain the roller 447 in yielding engagement with the periphery of the cam 448. Fixed in proper spaced relationship to the pitman 443 (Fig. 30) and movable in unison therewith is a reset pitman 450, having an enlarged forward end with an opening 451, having control surfaces which coact with a stud 452 in a downward extension of a lever 453 free on the shaft 151, and carrying a roller 454, which coacts with the periphery of a reset cam 455, secured on the main cam shaft 138. A spring 456 urges the lever 453 counter-clockwise to normally maintain the roller 454 in yielding contact with the periphery of the reset cam 455.

The control surfaces in the openings in the forward ends of the pitmans 443 and 450 (Figs. 30 and 31) are positioned in relation to their corresponding operating studs 452 and 445 through the medium of a link 457, the lower end of which is pivotally connected to said pitmans and the upper end of which has a slot 458, which engages a stud 459 in a rearward extension of a segment 460 free on the shaft 248 and having camming lugs 461 and 462, which cooperate, respectively, with the studs 164 in the Sub-Total key 112 and the Total Cash key 115 (Figs. 1 and 12), said camming lugs being maintained in yielding contact with said studs 164 by a spring 463, tensioned between the lower end of the link 457 and a stationary stud.

In addition to being positionable under control of the Sub-Total and Total Cash keys, the pitmans 443 and 450 (Figs. 30 and 31) are also positionable under influence of the total control lever 117 (Figs. 1 and 24) to control the engaging and disengaging movement of the totalizer frame in accordance with the position of said total control lever.

As previously explained, the total control lever 117 is freely supported on the shaft 248 and is positionable to four positions, which, beginning with its uppermost position, are "Lock Register," "Register," "Read 1," and "Reset 1," said lever being yieldingly retained in any of its four positions by means of properly spaced retaining notches 465 (Figs. 24 and 27) in an opening therein, in cooperation with a stud 500 in a retaining arm 501 free on a stud 502 in the frame 101. The arm 501 is urged counterclockwise by a spring 503 to cause the stud 500 to yieldingly engage the notches 465 and to ride in and out of said notches as the lever 117 is moved from one position to another. The total control lever 117 has a slot 466 (Fig. 24), which engages a stud 467 in the lower end of a crank 468 secured on the shaft 393. Also secured on the shaft 393 (Fig. 30) is a crank 469 carrying a stud 470, which engages a slot in an upward extension of a segment 471 free on the shaft 248 and having a cam slot 472, engaged by a stud 473 in a lever 474 free on a stud 475 secured in the frame 100. A rearward extension of the lever 474 has a slot which engages a stud 464 in the link 457 (see also Fig. 31).

Figure 30:
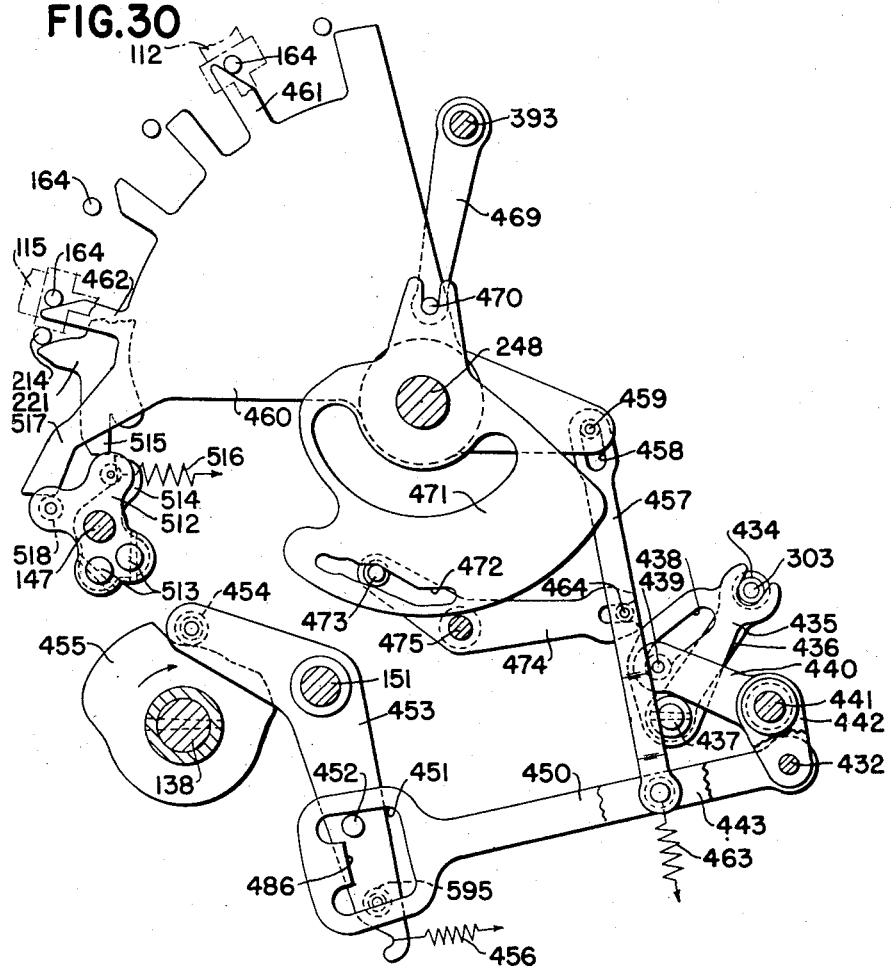
Fig. 30 is a right side elevation showing in detail the mechanism for controlling the engaging and disengaging movements of the totalizer assembly in totalizing operations.
Figure 31:
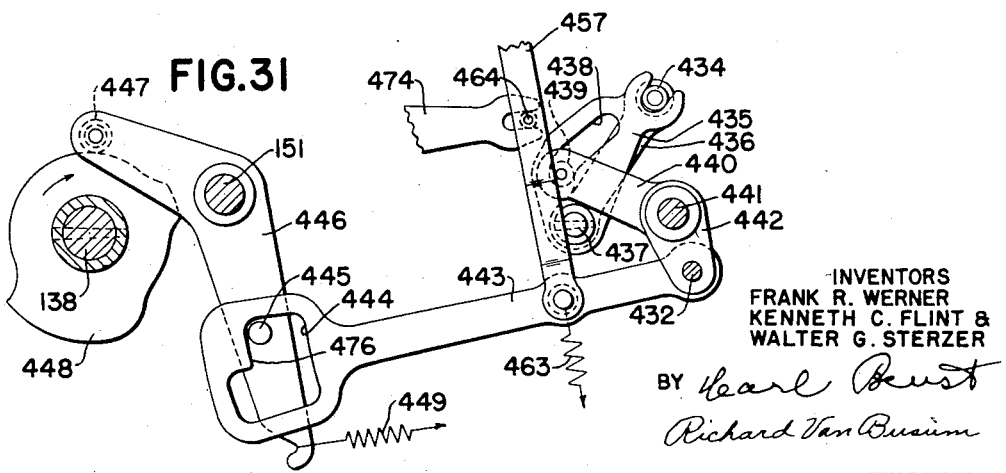
Fig. 31 is a detail view of the mechanism for controlling the engaging and disengaging movement of the totalizer assembly in adding operations.

When the total control lever 117 is in Register position, as shown in Fig. 24, the segment 471 is positioned accordingly by the cranks 468 and 469 and the shaft 393 and causes the control slot 472, in cooperation with the stud 473, to position the pitmans 443 and 450 in adding position, as shown in Figs. 30 and 31, so that the selected set of totalizer wheels 296 or 297 (Fig. 36) will be engaged and disengaged with and from the corresponding primary differential members in add timing. It will be noticed that in adding operations a shifting extension 476 (Fig. 31) in the opening 444 in the pitman 443 is opposite the stud 445, and that a clearance portion of the opening 451 in the pitman 450 is opposite the stud 452. In this case, operation of the add cam 448 and the lever 446, according to the time given in space 1, Fig. 51, will cause the stud 445, in cooperation with the extension 476, to shift the pitman 443 forwardly to rock the arm 440 clockwise, causing the stud 439, in cooperation with the slot 438, to rock the arm 435, the shaft 437, and the companion arm 436 counter-clockwise to shift the shaft 303 and the totalizer framework 300 (Figs. 31, 32, and 33) inwardly, to engage the selected set of totalizer wheels with the primary differential members in add timing. Inasmuch as a clearance portion of the opening 451 (Fig. 30) is opposite the stud 452, operation of the reset cam 455, and consequent rocking of the lever 453, will have no effect upon the pitman 450, and in this case the add cam 448 will control the engaging movement of the totalizer framework.

In the present machine, adding operations are performed when the total control lever 117 is in "Register" position and when one of the control keys 111, 113, or 114 (Figs. 1 and 12) is used to initiate machine operation. It will be recalled, by referring to Fig. 22, that the Tax key 111 and the Multiple-Item key 113 cause the item totalizer wheels 296 (Fig. 36) to be alined with the primary differential members and that the Single-Item key 114 causes the wheels 297 of the storage totalizer to be alined with the primary differential members for actuation thereby.

Figure 51:
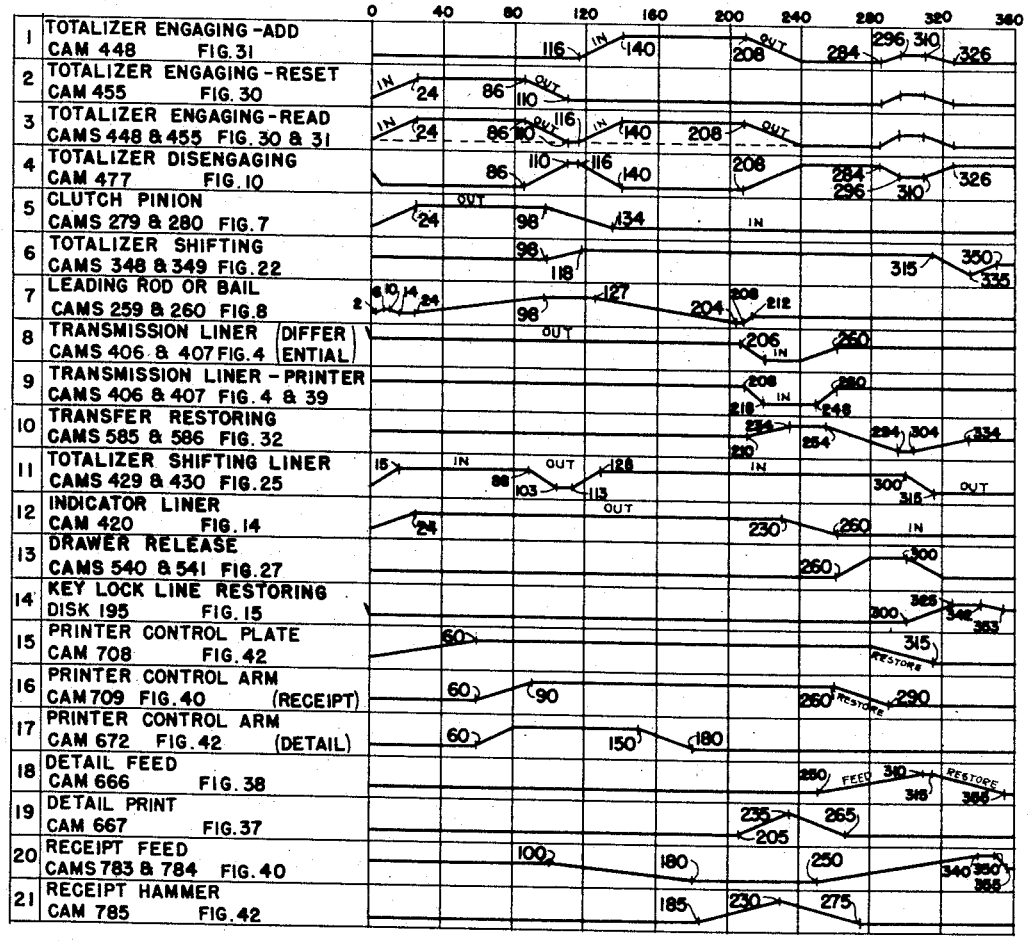
Fig. 51 is a chart depicting in graphic form the time of the movement of the various cams and mechanisms associated therewith, embodied in the machine chosen to illustrate this invention.

By referring to spaces 1, 2, and 4 of the time chart, Fig. 51, it will be noted that the add cam 448 and the reset cam 455 control only the engaging movement of the totalizer framework, and that the disengaging movement of said framework is controlled by a totalizer-disengaging cam 477 (Fig. 10) secured on the main cam shaft 138, the periphery of said cam coacting with a roller 478 carried by a cam lever 479 free on the shaft 151. The cam lever 479 is pivotally connected to the forward end of a link 480, having in its rear end a slot which engages the stud 432 carried by the crank 442. A spring 483 urges the lever 479 clockwise to normally maintain the roller 478 in yielding contact with the periphery of the cam 477.

By referring to Fig. 10 and space 4 of the time chart, Fig. 51, it will be seen that, when the machine is at rest, or in home position, the disengaging cam 477 maintains the totalizer framework 300 in disengaged position, and, immediately after the machine begins to operate, the cam 477 permits the spring 483 to shift the link 480 forwardly to free the crank 442 and the stud 441 for engaging movement under influence of the add and reset cams 448 and 455 (Figs. 30 and 31). This frees the totalizer framework for engaging movement in the beginning of reading and resetting operations, often referred to as sub-total and total operations, so that initial movement of the primary differential members will turn the selected set of totalizer wheels to zero, to position said primary members accordingly. After the wheels of the selected totalizer have thus been reversely rotated to zero position, a node 482 on the cam 477 (Fig. 10) shifts the link 480 rearwardly to rock the stud 441 and the arm 440 counter-clockwise to in turn rock the arm 435 clockwise to shift the totalizer framework rearwardly to disengage the selected set of totalizer wheels from the primary differential members. As the node 482 moves beyond the roller 478, the spring 483 returns the link 480 forwardly to free the crank 442, the shaft 441, and the arm 440 for engaging movement in add timing, under influence of the add cam 448, which causes the selected set of totalizer wheels to be engaged with the corresponding primary differential members prior to their return movement, which movement enters in said selected totalizer wheels the values standing on said wheels. After the primary differential members have completed their return movement from preset position to home position, a second node 484 on the cam 477, in cooperation with the roller 478, imparts disengaging movement to the totalizer framework to disengage the selected set of wheels from the primary differential members, and to retain said wheels thus disengaged at the end of machine operation.

By referring to Figs. 12, 24, 30, and 31, it will be noted that, when the total control lever 117 is in Register position, depression of the keys 111, 113, and 114 imparts no movement to the segment 460, and consequently the totalizer-engaging mechanism functions as explained above, to engage and disengage the selected set of totalizer wheels and the primary differential members in add timing.

Depression of the Sub-Total key 112 alines the wheels 296 of the item totalizer with the primary differential members, as explained earlier in connection with Fig. 22. Depression of the Sub-Total key 112 also causes its stud 164, in cooperation with the camming lug 461, to shift the segment 460 counter-clockwise, which, through the link 457, shifts pitmans 443 and 450 upwardly or clockwise against the action of the spring 463. Clearance in the slot 472 (Fig. 30) opposite the stud 473, when the total control lever 117 is in "Register" position, permits counter-clockwise movement of the lever 474 when the link 457 is shifted upwardly by depression of the keys 112 or 115. This moves the clearance portion in the upper end of the opening 451 beyond the stud 452 and moves a shifting extension 486 in said opening into the path of said stud, so that inward engaging movement of the totalizer framework, to engage the selected item totalizer wheels 296 with the primary differential members, will be controlled by the reset cam 455, according to the time given in space 2, Fig. 51.

Operation of the cam 455 causes the item totalizer wheels 296 to be engaged with the primary differential members 247 (Fig. 4) prior to their initial movement, which movement rotates said wheels in a reverse direction to zero, to position said primary differential members accordingly. After the primary differential members have completed their initial movement, the disengaging cam 477 (Fig. 10) functions to shift the totalizer frame work rearwardly to disengage the item totalizer wheels from the primary differential members, prior to their return movement to home position. Inasmuch as upward movement of the pitman 443, upon depression of the Sub-Total key 112, was not sufficient to move its engaging extension 476 (Fig. 31) out of the path of the stud 445, the add cam 448 causes the lever 446 to shift the pitman 443 forwardly in add timing to reengage the item totalizer wheels 296 with the primary differential members prior to their return movements to home position, which movement will rotate said wheels in an additive direction to reenter therein the amount previously cleared from said wheels, to effect what is termed in this art as a reading or sub-total operation, in which the amount on the totalizer is cleared therefrom to position the indicators and the printing wheels accordingly, to ascertain the amount standing on said totalizer, after which the amount is re-entered in the totalizer wheels, so that further computations may be carried on in connection therewith.

Figure 23:
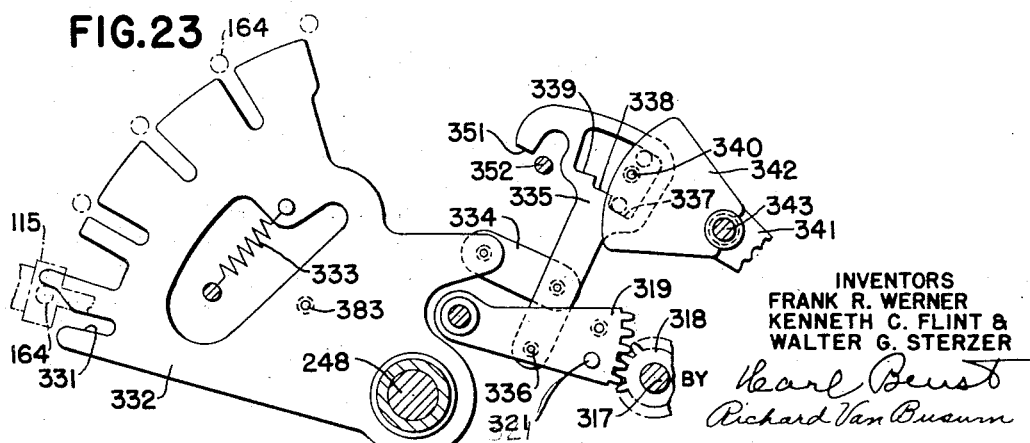
Fig. 23 is a detail view of the mechanism controlled by the Total Cash key for simultaneously selecting the item totalizer for a total or clearing operation and the storage totalizer for an adding operation.

Depression of the Total Cash key 115 to initiate a total cash operation, in cooperation with the mechanism shown in Figs. 22 and 23 and described earlier herein, causes the wheels 296 of the item totalizer to be alined with the primary differential members at the beginning of machine operation. Depression of the Total Cash key 115 (Fig. 30) also causes its stud 164, in cooperation with the lug 462, to shift the segment 460 to position the pitmans 443 and 450 exactly the same as the Sub-Total key 112. This causes the item totalizer wheels 296 to be engaged with the primary differential members prior to their initial movement, which movement reversely rotates said wheels to zero and positions said primary differential members accordingly. However, it will be recalled that, after said wheels 296 of the item totalizer have been zeroized, the mechanism shown in Figs. 22 and 23, functioning under control of the Total Cash key 115, shifts the item totalizer wheels 296 out of alinement with the primary differential members and simultaneously shifts the wheels 297 of the storage totalizer into alinement with said primary differential members. Subsequently, forward movement of the pitman 443 (Fig. 31) under influence of the add cam 448 causes said storage totalizer wheels 297 to be engaged with the primary differential members prior to their return movement, which movement rotates said wheels in an additive direction to enter therein the amount cleared from the wheels 296 of the item totalizer in the beginning of the total cash operation. It should, therefore, be understood that the above-described mechanism is capable of transferring a total from one set of totalizer wheels to another set of totalizer wheels, both of said sets of totalizer wheels being mounted on a common axle or line, and that this transferring of a total takes place in a single cycle of operation of the machine.

The shaft 393 (Figs. 24 and 26), which is operated by movement of the total control lever 117, has secured thereto a crank 487 with a stud 488, which engages a slot in a segment 489, free on the shaft 248. The periphery of the segment 489 has therein slots for receiving the studs 164 of the control keys 111 to 115 inclusive. When the total control lever 117 is in Register position, as shown in Fig. 24, the segment 489 is positioned as shown in Fig. 26, in which the slots are in alinement with the studs 164, so that any of the control keys may be depressed unless prevented from being depressed by some other means besides the segment 489.

Moving the total control lever 117 one step down from Register position to Read position rocks, through the crank 468, the shaft 393 a slight distance clockwise, which movement, through the crank 487 and the stud 488, rocks the segment 489 counter-clockwise to move obstructing surfaces of the periphery of said segment 489 opposite the studs 164 for all of the control keys with the exception of the Single-Item control key 114. It is, therefore, obvious that, when the total control lever is in Read position, the only control key that may be depressed is the Single-Item key 114, which selects the wheels 297 of the storage totalizer (Fig. 36) for engagement with the primary differential members. Clockwise movement of the shaft 393 and the crank 469 (Fig. 30), when the total control lever 117 is moved from Register position to Read position, causes said crank 469 to rock the segment 471 counter-clockwise a slight distance, which movement, through the camming slot 472, rocks the lever 474 also counter-clockwise, to lift the link 457 against the action of the spring 463, to move the pitmans 443 and 450 (Figs. 29 and 30) upwardly or clockwise one step to Read position, which is exactly the same position to which said pitmans are moved under influence of the segment 460 when either the Sub-Total key 112 or the Total Cash key 115 is depressed, as explained previously. With the total control lever 117 (Figs. 24 and 26) in Read position, depression of the Single Item key 114 causes the wheels 297 of the storage totalizer to be engaged and disengaged with and from the primary differential members 247 in read time, to indicate and print a sub-total of the amount standing thereon.

Moving the total control lever 117 (Fig. 24) another step downwardly to Reset position rocks the shaft 393 another step clockwise, and during this movement the crank 487 carries the segment 489 (Fig. 26) in unison therewith. However, the periphery of said segment still obstructs depression of any of the control keys with the exception of the Single-Item key 115, which, as previously explained, selects the wheels 297 of the storage totalizer for engagement with the primary differential members. Movement of the total control lever to Reset position carries, through the crank 469 (Fig. 30), the segment 471 an additional step counter-clockwise, causing the cam slot 472, in cooperation with the stud 473, to rock the lever 474 an additional increment in a counter-clockwise direction to lift the link 457 against the action of the spring 463 to in turn lift the pitmans 443 and 450 a second step upwardly to Reset position, in which the inward extension 486 of the opening 451 is still opposite the stud 452, and a clearance portion of the opening 444 is opposite the stud 445. Depression of the Single-Item key 114 to initiate machine operation causes the wheels 297 of the storage totalizer to be alined with the primary differential members 247 (Figs. 32 and 36) in the manner previously explained, and, during this machine operation, engaging and disengaging movement of the storage totalizer wheels and said primary differential members is controlled by the reset cam 455, and said cam functions according to the time given in space 2, Fig. 51, to control the engaging and disengaging movement of the storage totalizer wheels.

Operation of the cam 455 (Fig. 30 and space 2, Fig. 51), at the very beginning of machine operation, rocks the lever 453 clockwise, causing the stud 452, in cooperation with the extension 486, to shift the pitman 450 forwardly to rock the shaft 441 and the arm 440 clockwise, which movement, through the roller 439 in cooperation with the cam slot 438, rocks the arm 435 counter-clockwise to shift the totalizer framework inwardly to engage the wheels of the storage totalizer with the primary differential members 247 (Figs. 4 and 32) prior to their initial movement. Clockwise initial movement of the primary differential members 247 rotates the wheels of the storage totalizer in a reverse direction until said wheels arrive at zero, which is determined by the long teeth thereon coming into contact with the corresponding transfer trip pawls, in a manner to be explained later, to position said primary differential members according to the amounts standing on said storage totalizer wheels.

After the primary differential members have been positioned and the storage totalizer wheels zeroized, and prior to return movement of said primary differential members, the totalizer-disengaging cam 477 (Fig. 10) functions according to the time given in space 4, Fig. 51, to disengage the wheels 297 of the storage totalizer from the primary differenttial members, so that said wheels will remain in a zeroized condition. Inasmuch as a clearance portion of the opening 444 in the pitman 443 (Fig. 31) is opposite the stud 445, operation of the add cam 448 and the consequent clockwise movement of the lever 446 will have no effect upon the pitman 443, and, as a result, the wheels of the storage totalizer will remain disengaged from the primary differential members during their return movements from preset position to zero or home position. Therefore the wheels of said storage totalizer will remain in a zeroized condition.

*Reset counter*

By referring to Fig. 1, it will be recalled that the present machine is provided with a reset counter 119, the wheels of which are visible through an opening in the cabinet 108, said reset counter being actuated by the total control lever 117 when it is moved to Reset position.

Moving the total control lever 117 to Reset position causes a camming slot 490 (Fig. 24) therein, in cooperation with a stud 491 in an upward extension of a bell crank 492 free on the rod 163, to rock said bell crank clockwise. During its clockwise movement, a slot in a rearward extension of the bell crank 492, in cooperation with a stud 493 in an arm 494 free on the shaft 284 (Fig. 24), rocks said arm counter-clockwise. During its counter-clockwise movement, the slot in the forward end of the arm 494, in cooperation with a stud 495 in an extension of a yoke 496 pivotally mounted in a bracket which supports the wheels of the reset counter, rocks said yoke clockwise, causing a feed pawl 497 carried thereby, in cooperation with the teeth on corresponding ratchets 481, integral with the reset counter wheels, to advance the units reset counter wheel one step each time the total control lever is moved to reset position to keep an accurate count of reset operations. The pawl 497 has thereon the usual graduated teeth for coacting with the teeth of the corresponding ratchets 481 on each of the reset counter wheels, each of said ratchets being provided with a deep notch corresponding to its zero position, which permits said pawl 497 to advance the adjacent higher order wheel one increment whenever the lower order wheel passes through zero. This is the usual manner in which the wheels of step-by-step counters, such as the reset counter 119, are actuated. Retaining pawls (not shown) cooperate with the teeth of the ratchets 481 to prevent retrograde movement of the reset counter wheels. The inner walls of a slot formed by the forward extension of the arm 494 (Fig. 24) and a forwardly-extending finger 498 of said arm cooperate with the shaft 163 to limit movement of said arm in either its feeding direction or its take-up direction. Moving the total control lever 117 out of Reset position, through the bell crank 492 and the arm 494, imparts counter-clockwise take-up movement to the yoke 496 and the feed pawl 497.

Moving the Total Control lever 117 (Figs. 24 and 26) upwardly, or clockwise, to Lock Register position, through the crank 468, the shaft 393, and the crank 487, rocks the segment 489 clockwise to move obstructing portions of its periphery into the path of the studs 164 in the control keys 111 to 115, to lock said keys against depression.

As previously explained, the Total Control lever 117 (Figs. 24 and 27) has a plurality of equally-spaced retaining notches 465 therein, arranged to be yieldingly engaged by the stud 500 in the spring-urged arm 501 as the total control lever is moved from one position to another, to accurately locate and maintain said total control lever in any of its set positions. An inward extension of the arm 501 has a beak 504, which cooperates with an arcuate surface 505 on an upward extension of the arm 146, which, it will be recalled, is secured on the machine release shaft 147 and is rocked clockwise upon release of the machine for operation (Figs. 16 and 27). Clockwise movement of the arm 146 moves the surface 505 into the path of the beak 504 to obstruct movement of the arm 501 and thus lock the Total Control lever 117 in set position during machine operation. As the Total Control lever 117 is being moved from one position to another, the beak 504 moves into the path of the arm 146 and thereby obstructs releasing clockwise movement of said arm, when said Total Control lever is not properly located in one of its set positions or is being moved from one position to another, to prevent mal-operation of the machine.

*Interlock between total control lever and amount banks*

A locking mechanism is provided between the Total Control lever 117 (Fig. 24), the segment 460 (Fig. 30) and the amount banks, to prevent depression of any of the amount keys when said Total Control lever is in any position except Register position, and conversely to lock said Total Control lever in Register position upon the depression of an amount key.

The Total Control lever 117 (Fig. 24) has a slot 506 engaged by a stud 507 fast in the upper end of an arm 509 pivotally mounted on a stud 508 secured in the left machine frame. A downwardly-extending finger of the arm 509 coacts with a stud 510 in an arm 511 rotatably supported on the left end of the release shaft 147 and connected to a companion arm 512 (Fig. 30), rotatably supported on the right end of the shaft 147, by parallel rods 513, to which said arms 511 and 512 are secured in fixed relationship to each other. Also free on the shaft 147 and secured to the rods 513 are a series of arms 514, one for each amount bank, the upper ends of which arms are arranged to cooperate with downward extensions 515 on the corresponding control plates 221, there being a control plate 221 for each amount bank, as explained previously in connection with the amount bank shown in Fig. 4. A spring 516 urges the arms 511, 512, and 514 clockwise, to cause the stud 510 (Fig. 24), in cooperation with the arm 509, to maintain the stud 507 in yielding contact with the forward edge of the slot 506.

When the total control lever 117 is in Register position, as shown in Figs. 1 and 24, an undercut portion of the slot 506 is opposite the stud 507 and permits the spring 516 (Fig. 30) to maintain the parts in the position shown here, in which the upper ends of the arms 514 are maintained clockwise out of the path of the extensions 515 and consequently do not interfere with the depression of the amount keys 110. Moving the Total Control lever 117 out of Register position causes the slot 506 (Fig. 24), in cooperation with the stud 507, to rock the arm 509 clockwise, which in turn rocks the arms 511, 512, and 514 counter-clockwise to move the upper ends of said arms 514 beneath the extensions 515 to obstruct depression of the amount keys 110.

Depression of one of the amount keys 110 (Figs. 4 and 30) causes the stud 214 therein, in cooperation with the camming lug on the corresponding control plate 221, to shift said plate downwardly to move the extension 515 into the path of the upper end of the corresponding arm 514 to obstruct counter-clockwise movement of said arm. This secures the arm 509 against clockwise movement and causes the stud 507, in cooperation with the notch in the slot 506, to in turn secure the Total Control lever 117 in Register position.

Depression of either the Sub-Total key 112 (Figs. 1 and 30) or the Total Cash key 115, by means of its stud 164, in cooperation with the corresponding camming lug 461 or 462, rocks the segment 460 downwardly, in the manner previously explained, causing an extension 517 on its forward end, in cooperation with a stud 518 in the arm 512, to move the upper ends of said arms 514 into the paths of the corresponding extensions 515, to lock the amount keys against depression, when either of said control keys 112 or 115 is depressed. Likewise, depression of an amount key shifts the corresponding plate 221 (Figs. 4 and 30) down to move the extension 515 into the path of the upper end of the corresponding arm 514, to obstruct clockwise movement of said arm and the arm 512, which, through the stud 518, obstructs downward or counter-clockwise movement of the segment 460, to prevent depression of either of the control keys 112 or 115.

Moving the Total Control lever 117 out of Register position rocks the arms 511, 512, and 514 and the rods 513 counter-clockwise (Fig. 24) to move the rearward rod 513 into the path of a shoulder on the arms 288 (Fig. 9) for each amount bank. This obstructs clockwise movement of the arms 288 and thereby retains the zero stop bars 286 in ineffective positions, so that the differential mechanisms are free to be positioned on the control on the selected set of totalizer wheels as said wheels are being reversely rotated to zero in reading and resetting operations.

Likewise, the rearward rod 513 is rocked into the path of the arms 288 upon depression of the Sub-Total key 112 and the Total Cash key 115, by the mechanism shown in Fig. 30 and described earlier, to retain the zero stop bars 286 in ineffective positions to free the differential mechanism for positioning under control of the wheels of the selected totalizer in sub-total and total cash operations.

*Drawer release and control mechanism*

By referring to Fig. 1, it will be recalled that the present machine is provided with a cash drawer 106, which slides in and out of the drawer base or cabinet 105, said drawer being arranged to open automatically at the end of certain operations under control of the control keys 111 to 115 inclusive. Manual means (not shown, but of the usual design) is also provided for opening the drawer 106, said manual means being accessible through a door (not shown) on the right-hand side of the machine case 108. The door is provided with a lock; therefore, only authorized persons having a key to said lock may have access to the manual drawer-opening means.

The back panel of the drawer 106 (Figs. 1 and 29) has secured thereto a catch plate 520, having an upward extension normally engaged by a latch 521 free on a shaft 522 journaled in a back frame (not shown) for the cabinet or base portion 105 of the machine. An upward extension of the latch 521 cooperates with a stud 523 in a crank 524 secured on the shaft 522. A spring 525 urges the latch 521 counterclockwise to normally maintain said latch in engagement with the plate 520 and in yielding contact with the stud 523. An upwardly-extending finger 526 of the latch 521 is arranged to coact with the manual drawer-opening means, explained above, which means, in cooperation with said finger, rocks the latch 521 clockwise, against the action of the spring 525, to disengage said latch from the upward extension of the plate 520, to free the drawer 106 to the action of spring-actuated opening means (not shown), which immediately opens said drawer and causes a warning bell to ring to signal the opening of the cash drawer.

Also secured on the shaft 522 (Fig. 28) is a finger 527 maintained in yielding contact with a stud 528 in an arm 529, free on a stud 530 secured in the machine base, by the spring 525 (Fig. 29), which, through the latch 521 and the crank 524, urges the shaft 522 and the finger 527 counter-clockwise. The arm 529 is pivotally connected by a link 531 to the rear arm of a bell crank 532 (Fig. 27) free on a stud 533 secured in the left frame 101. Pivotally connected to an upward arm of the bell crank 532 is the rear end of a pitman 534, having an L-shaped slot 535 in an enlarged forward end thereof, which coacts with a stud 536 carried by a lever 537 free on the shaft 151. The lever 537 carries rollers 538 and 539, which cooperate with the peripheries of companion plate cams 540 and 541 secured on the main cam shaft 138, which cams function according to the time given in space 13, Fig. 51, to rock the lever 537 counter-clockwise near the end of machine operation, and back to normal position just at the end of machine operation. The pitman 534 (Fig. 27) is pivotally connected by a link 542 to a rearward extension of a lever 543 free on a stud 544 in the left frame 101. The lever 543 carries a stud 545, which extends within and cooperates with a camming slot 546 in a segment 547 rotatably supported on one of the disks 264 (see also Fig. 4) and having internal gear teeth which mesh with one of the pinions 266. The pinion 266 is in turn connected by one of the square shafts 267 to a companion pinion 266 (Fig. 12), which in turn meshes with internal teeth in the transmission segment 365 (Figs. 6 and 12), which, as previously explained, is positioned by the primary differential member 362 for the control keys 111 to 115 inclusive. The control slot 546 has two circumferential portions of different radial dimensions, the larger of which coacts with the stud 545 when the segment 547 is positioned under control of the Single-Item and Total Cash keys 114 and 115 (see also Fig. 1), to cause the pitman 534 to be positioned in relation to the stud 536, as shown in Fig. 27, so that said stud engages the narrow vertical branch of the slot 535. Operation of the cams 540 and 541, according to the time given in space 13, Fig. 51, and the consequent rocking of the lever 537, as explained before, cause said pitman 534 to be shifted rearwardly near the end of machine operation.

Rearward movement of the pitman 534 (Figs. 27, 28, and 29) rocks the bell crank 532 clockwise, which, through the link 531, rocks the arm 529 counter-clockwise, said arm, through the stud 528, rocking the finger 527, the shaft 522, and the latch 521 clockwise, against the action of the spring 525, to disengage said latch from the catch plate 520 to release the drawer 106 to the action of the spring-operated means, which immediately opens said drawer. Continued operation of the cams 540 and 541 permits the spring 525 to restore the latch 521 and associated parts counter-clockwise (Fig. 29) to normal position, where said latch is in position to by-pass and engage the catch plate 520 when the drawer 106 is manually closed, to retain said drawer in closed position against the action of its spring-operated opening means.

Depression of any one of the control keys 111, 112, or 113 (Figs. 1 and 12) causes the segment 547 (Fig. 27) to be positioned so that the smaller circumferential portion of the slot 546 coacts with the stud 545 to rock the lever 543 counter-clockwise from the position shown here. This movement, through the link 542, lifts the pitman 534 clockwise, to move the horizontal branch of the L-shaped slot 535 opposite the stud 536. Operation of the lever 537, with the pitman thus positioned, causes the stud 536 to operate idly back and forth in the horizontal branch of the slot 535 without shifting the pitman 534, and consequently, when the control keys 111, 112, or 113 are used, the drawer 106 remains closed during operation of the machine.

Counter-clockwise movement of the lever 543 (Fig. 27), when the segment 547 is positioned under control of the keys 111, 112, or 113, causes a link 552, which pivotally connects said lever to an arm 548 free on a stud 549 in the left frame 101, to rock said arm 548 counter-clockwise. Counter-clockwise movement of the arm 548 moves a stud 550, carried thereby, into the path of an inwardly-extending nose 551 on the arm 501, to obstruct clockwise movement of said arm 501 and thus secure the Total Control lever 117 against movement when any one of said control keys 111, 112, or 113 is used to initiate machine operation. When either one of the control keys 114 or 115 is used to initiate machine operation, the arm 548 (Fig. 27) is positioned as shown here, in which position the stud 550 is beneath and out of the path of the nose 551 and therefore does not interfere with the positioning of the Total Control lever 117.

Tens transfer mechanism

The two sets of totalizer wheels are provided with a common transfer mechanism which coacts with the selected set of totalizer wheels to transfer tens digits from lower to higher denominations. Inasmuch as the tens transfer mechanism is substantially duplicated for each denominational order, it will be described in connection with the denominational order shown in Fig. 4, which will be used as representative of all the orders.

Each of the two sets of totalizer wheels 296 or 297 for the denominational order shown here has a long tooth which coacts with a tripping bail 553 (Fig. 33) on a tripping yoke 554 free on a rod 555 supported in the shiftable totalizer framework 300. A rearwardly-extending finger 556 of the yoke 554 underlies and coacts with a curved ear 557 bent outwardly from a transfer trip arm 558 rotatably supported on the shaft 303 journaled in the framework 300. A spring 560 urges the arm 558 counter-clockwise, and said arm in turn urges the yoke 554 clockwise to normally maintain the finger 556 in yielding contact with a rod 561 supported in the framework 300, said rod serving to locate the yoke 553 in proper relation to the long teeth of the corresponding totalizer wheels 296 and 297. A shoulder on the trip arm 558 coacts with a similar shoulder 562 (Fig. 33) on a transfer slide 563 shiftably supported in the framework 300 by means of a rod 564, in turn supported in said framework 300, and by means of an outwardly-extending finger 565 of said slide, the upper surface of which coacts with a transfer restoring rod 566 supported for angular shifting movement in the totalizer frame 300 by means of alined slots in the end plates 301 and 302 (Fig. 36) of said framework. The slide 563 (Fig. 33) carries a stud 567, which rotatably supports a transfer pawl 568, having a tooth 569, which coacts with the teeth of the adjacent higher order wheel 296 or 297 of the selected totalizer. A spring 570 urges the pawl 568 clockwise to normally maintain a stud 571, carried thereby, in yielding engagement with the finger 565. Opposite ends of the restoring rod 566 (Figs. 32 and 36) are engaged by slots in the upper ends of companion arms 572 and 573, secured in proper spaced relationship to each other on a shaft 574, journaled in the frames 304 and 305. Also secured on the shaft 574 is an arm 575, carrying a roller 576, which engages a cam slot 577 in a plate cam 578 secured on a shaft 579 journaled in the frames 304 and 305. Also secured on the shaft 579 is a crank 580 pivotally connected by a link 581 to a downward extension of a lever 582 free on the shaft 151 and carrying rollers 583 and 584, which coact, respectively, with the peripheries of companion plate cams 585 and 586, secured on the main cam shaft 138.

Operation of the cams 585 and 586 causes the transfer restoring rod 566 to be shifted back and forth, according to the time given in space 10, Fig. 51. At the end of machine operation and during the greater portion of an operation of the machine, the restoring rod 566 is retained in the position shown in Figs. 32 and 33, where it serves to limit movement of the tripped transfer pawls until after the selected set of totalizer wheels has been disengaged from the primary differential members and is free for transferring movement.

In adding operations, functioning of the cam 448 (Fig. 31 and space 1, Fig. 51) causes the totalizer frame 300 (Figs. 32 and 33) to be shifted inwardly, after the primary differential members 247 have been positioned under influence of the depressed amount keys, to engage the selected set of totalizer wheels 296 or 297 with said primary differential members. This engaging movement of the frame 300 moves the transfer slide 563 inwardly in unison therewith, to the position shown in dot-and-dash lines in Fig. 33, in which the bottom of the slot formed by the finger 565 has a slight amount of clearance from the restoring rod 566. As previously explained, clockwise return movement of the primary differential member 247 rotates the selected totalizer wheel 296 or 297 in an additive or clockwise direction, and, if said wheel passes through zero while being rotated in this direction, the long tooth thereon engages the bail 553 and rocks the yoke 554 counter-clockwise, which movement, through the extension 556, in cooperation with the ear 557, rocks the tripping arm 558 clockwise, against the action of the spring 560, to disengage the shoulder on said arm from the shoulder 562 on the slide 563. This frees the slide 563 and the transfer pawl 568 to the action of the spring 570, which immediately carries said parts outwardly or toward the left, as viewed here, until said slide 563 contacts the restoring rod 566. This slight movement is not enough to effect a transfer movement of the pawl 568 but is sufficient to move the shoulder 562 on the slide 563 beyond and out of the path of the corresponding shoulder on the arm 558, so that said arm 558 will not interfere with subsequent complete transfer movement of said slide 563 in an outward direction.

After the totalizer wheel 296 or 297 has been actuated by the primary differential member 247, the frame 300 is rocked outwardly to disengage said wheel from said primary differential member, and during this disengaging movement the transfer restoring rod 566 receives its first movement, which shifts said rod forwardly or toward the left, as viewed in Figs. 32 and 33, to permit the spring 570 to impart further outward or left-hand movement to the transfer pawl 568 and the slide 563 to cause the tooth 569 of said pawl to engage the teeth of the adjacent higher order wheel 296 or 297 and advance said wheel one step in an additive direction to transfer the tens digit from the adjacent lower order wheel, which, it will be recalled, was rotated through zero during actuation by the primary differential member 247.

After the tens transfer has been effected, the rod 566 receives its second movement (compare spaces 1 and 10, Fig. 51), which movement shifts said rod full distance to the rear or toward the right, as viewed here, and during this movement said rod carries the slide 563 and the transfer pawl 568 in unison therewith, against the tension of the spring 570. During this restoring or right-hand movement of the slide 563, the shoulder 562 thereon bypasses the shoulder on the tripping arm 558, whereupon the spring 560 returns said shoulder into the path of the shoulder 562, to retain the slide 563 and the transfer pawl 568 in restored or untripped positions, as shown here. Just prior to the end of machine operation, the transfer restoring rod 566 is returned forwardly or toward the left to its neutral position, as shown here, in which position it remains at the end of machine operation and during the initial part of the succeeding machine operation, as explained above.

In sub-total and total taking operations, often referred to as read and reset operations, the wheels 296 or 297 of the selected totalizer are engaged with the corresponding primary differential members 247 prior to their initial movement, which initial movement rotates said wheels in a reverse or counter-clockwise direction (Fig. 33) until the long teeth on said wheels contact the lower edge of the bail 553 of the yoke 554 to position said wheels at zero and to position the primary differential members 247 in accordance therewith. During the time that the selected totalizer wheels are being reversely rotated, it is necessary that the teeth 569 of the transfer pawls 568 be retained out of the path of the teeth of said totalizer wheels, so that said wheels are free to be returned to zero. This is effected by a downward projection 588 (Figs. 33 and 35) on each of the transfer pawls 568, which coacts with a corresponding slot 589 in a bar 590 supported by right and left arms 591 and 592, in turn journaled no axially-alined trunnion studs 593 in the frames 304 and 305 (Fig. 36). The arm 591 has pivotally connected thereto the rear end of a link 594, the forward end of which has a slot which engages a stud 595 (Fig. 35) in the downward extension of the lever 453. A spring 596 forms a flexible connection between the lever 453 and the link 594 and, in cooperation with the slot in said link, permits limiting of the movement of the arms 591 and 592 and the bar 590, by means of downwardly-extending fingers 597 on said arms 591 and 592 coming into contact with the shaft 437, without interfering with the full clockwise movement of said lever 453.

Initial movement of the lever 453 by the cam 455 (Figs. 30 and 35 and space 2, Fig. 51), through the link 594, rocks the arms 591 and 592 and the bar 590 clockwise in unison therewith to move the slot 589 into the path of the projections 588 of the transfer pawls 568 (Fig. 33). This clockwise movement of the bar 590 occurs right at the beginning of machine operation, prior to engaging movement in a forward direction, or toward the left, of the totalizer frame 300, which movement causes the projections 588 to engage the forward edge of the slot 589 and rock the pawls 568 counter-clockwise to move their teeth 569 out of the path of the teeth of the corresponding wheels 296 or 297 to insure that said transfer pawls do not interfere with counter-clockwise zeroizing movement of said wheels.

Counter-clockwise return movement of the lever 453 (Figs. 33 and 35) rocks the bar 590 counter-clockwise to move the slots 589 out of coacting relationship with the projections 588, at the same time that the totalizer framework 300 is being shifted rearwardly to disengage the selected set of totalizer wheels from the primary differential members. In resetting operations, the selected set of totalizer wheels 296 or 297 remain disengaged from the primary differential members 247 and therefore remain in a cleared or zeroized condition. However, in reading operations, the selected totalizer wheels are re-engaged with the primary differential members 247 prior to their counter-clockwise return movements, which movements rotate said totalizer wheels in an additive direction to their original positions, to reenter therein the amount which was temporarily taken therefrom.

An aligning bar 598, supported between the end plates 301 and 302 (Figs. 33, 34, and 36) of the totalizer frame 300, is shaped along its upper edge to coact with the teeth of the wheels 296 and 297 of the two totalizers, to retain said wheels in alinement when they are being shifted laterally into and out of alinement with the primary differential members. The bar 598 has slots 599 opposite each of the primary differential members 247, to provide clearance for the selected set of totalizer wheels, so that they are free to be rotated by said primary members.

A retaining pawl 600 (Figs. 33 and 34) is provided for each denominational order and coacts with the teeth of the selected set of totalizer wheels to retain said wheels against displacement when they are in alinement with the slots 599 in the bar 598 and prior to their engagement with the teeth of the primary differential members 247. The pawls 600 are rotatably supported by the rod 555, and each pawl is provided with a spring 601, which urges said pawl clockwise to maintain a rearwardly-extending finger 602 thereof in yielding engagement with a rod 603 extending through clearance slots in the framework 300 and supported by right and left arms 604 and 605, in turn rotatably mounted on a rod 606 supported in the framework 300.

When the totalizer framework 300 is in disengaged position, as shown here, the springs 601 yieldingly maintain the pawls 600 in yielding engagement with the teeth of the corresponding set of totalizer wheels 296 or 297 which are alined with the primary differential members 247. During engaging movement in a forward direction, or toward the left, as viewed here, of the totalizer framework 300, the pawls 600 remain in engagement with the teeth of the selected set of totalizer wheels until after said wheels are meshed with the corresponding primary differential members 247, after which upwardly-extending fingers 607 of the arms 604 and 605 engage a stationary rod 608 supported in the frames 304 and 305, and continued engaging movement of said frame 300 causes said arms and the rod 603 to be rocked clockwise. Clockwise movement of the rod 603, in cooperation with the fingers 602, rocks the pawls 600 counter-clockwise to disengage said pawls from the teeth of the corresponding wheels of the selected totalizer to free said wheels for actuation by the primary differential members. Disengaging movement to the rear, or toward the right, of the totalizer frame 300 (Figs. 33 and 34) withdraws the fingers 607 from the rod 608 and permits the springs 601 to again engage the pawls 600 with the teeth of the corresponding totalizer wheels, as said wheels are being disengaged from the primary differential members, to prevent displacement of said wheels after they are fully disengaged from said primary differential members.

*Detail strip and receipt printing and feeding mechanism*

As previously explained, the present machine is provided with a detail strip 123 (Figs. 1 and 19), upon which a record of certain items and totals is recorded, with an itemized or multiple-item receipt 610 (Figs. 1 and 20), which is issued during Total Cash operations, and with a single-item receipt 609 (Fig. 21), which is issued during single-item operations and upon which the results of these operations are recorded, said receipts being presented to the customer as a record of the articles purchased, whereas the detail strip is retained in the machine, and the portion thereof upon which records have been made, during a certain business period, may be removed whenever required by the proprietor or other person in charge, who has access to the detail strip mechanism.

Directing attention to Figs. 1, 2, and 6, the printer framework comprises a detail strip back frame 611, which is secured to the right frame 100 by various studs and screws; a detail front frame 612, which is secured in fixed relationship to the back frame 611 by various studs, rods, and screws; a type wheel front frame 613, which is secured to the frame 102; a type wheel auxiliary frame 614, secured to the frame 613, and a receipt front frame 615, which is secured to the upper portion of the frame 102 by various rods, studs, and screws.

The transmission segments 263 (Fig. 4) are operatively connected, by means of the pinions 266 and the corresponding square shafts 267, to corresponding segments 616 (Fig. 2), having internal teeth teeth which ride on the peripheries of corresponding disks 621, secured on the shaft 265, to rotatably mount said segments 616. The transmission segments 616 have therein teeth which cooperate with teeth in gears integral with corresponding amount type wheels 617 for printing records on the detail strip 123. The teeth of said segments 616 are also arranged to mesh with the teeth of gears integral with the corresponding amount type wheels 619 for printing records on the issuing receipts 125 and 609 (Figs. 20 and 21). The detail type wheels 617 are rotatably mounted on a shaft 618 journaled in the frames 102 and 613, and the receipt type wheels 619 are rotatably mounted on a stud 620 secured in the auxiliary frame 614, the outer end of said stud being supported by the frame 613. Also free on the shaft 618 is a series of consecutive number type wheels 624 (Fig. 39) for printing a consecutive number upon the detail strip. The manner in which the consecutive number wheels 624 are advanced one step during certain machine operations will be explained later.

The machine is also provided with date type wheels 625 (Fig. 2) for printing the date upon the receipt 125, said wheels being rotatably mounted on a stud 626 supported between the frames 613 and 614. The month, tens of days, and units of days type wheels 625 are settable, respectively, by means of setting knobs 627, 628, and 629, having tenons which are rotatably supported in the disk 621, said tenons having secured thereon small pinions, similar to the pinions 266 (Fig. 4), which mesh with the internal teeth of transmission gears 630 rotatably supported on the corresponding disks 621. The transmission gears 630, through corresponding pinions and square shafts, drive corresponding transmission gears 631, the external teeth of which mesh with and drive the corresponding date type wheels 625, so that said type wheels may be set manually under control of the setting knobs 627, 628, and 629. Also mounted on the stud 626 (Figs. 2 and 39), with the date wheels 625, is a series of consecutive number type wheels 623, which are actuated, by the same mechanism that actuates the wheels 624, for printing a consecutive number upon the issuing receipt 125.

In addition to the amount wheels and the consecutive number wheels, the shaft 618 (Fig. 2) for the detail strip 123 supports a type wheel (not shown) positioned under control of the total control lever 117 (Fig. 24) for printing a symbol on the detail strip indicative of the type of operation being performed, and a type wheel (not shown), positioned under control of the control keys 111 to 115 inclusive (Fig. 12), for printing a character upon the detail strip corresponding to said control keys. Likewise, the type wheel stud 620 (Fig. 2) for the receipt type wheels carries a type wheel which is positioned under influence of the control keys 111 to 115, for printing characters upon the receipt 125 corresponding to said control keys.

The external teeth of the gears 630 (Fig. 2), for positioning the date type wheels, are yieldingly engaged by the tooth of a spring-pulled retaining pawl 632 free on a stud 633 supported between the frames 102 and 613, said pawl acting to retain the gears 630 and the corresponding date type wheels 625 in set position. In addition to the differential aliner 395, shown in Fig. 4 and explained earlier herein, which cooperates with the teeth of the transmission segments 263, to aline said segments and their corresponding indicators and differential mechanisms, the amount, consecutive number, and date wheels are further alined in printing position by means of an aliner 636 (Figs. 39 and 40), which engages the teeth of the corresponding transmission gears 616 and 631 (Fig. 2) for said type wheels. The aliner 636 is in the shape of a yoke, the arms of which are freely supported on the stud 633, the left arm of said yoke having secured thereto a crank 637 carrying a stud 638 engaged by a slot in the forward end of a link 639, the rear end of which has a similar slot which engages a stud 640 in an inking ribbon drive segment 641 secured on the right-hand end of the shaft 397.

The mechanism shown in Fig. 4, including the cams 406 and 407, oscillates the shaft 397 first counterclockwise and then back to normal position near the end of machine operation, according to the time given in space 8 of the time chart, Fig. 51. Counterclockwise movement of the shaft 397 (Figs. 39 and 40) and the segment 641, through the link 639 and a spring 642, tensioned between the stud 640 and a stud in the link 639, rocks the aliner 636 also counterclockwise into engagement with the teeth of the transmission gears 616 and 631 (Fig. 2) to aline said gears and their corresponding type wheels in set positions during operation of the printing mechanism to insure neat and accurate printing of the record upon the record material. Clockwise return movement of the segment 641 rocks the aliner 636 also clockwise to disengage said aliner from the teeth of the transmission gears. The slots in the link 639 and the spring 642 form a yieldable connection between the segment 641 and the aliner 636 to compensate for the excess movement of said segment 641, which also operates the ribbon-feeding mechanism, as will be explained later.

The supply of detail material 123 (Figs. 1 and 2) is in the form of a supply roll 643, having a wooden core with a boring which fits over a supply roll sleeve 644 free on a stud 645 in the frame 611, said sleeve 644 having diametrically-opposed teeth which are forced into the core of the supply roll as it is placed on said sleeve to secure said supply roll on said sleeve. The web of the detail strip 123 is unwound from the supply roll 643 and is guided between a detail impression hammer 646 and the detail type wheels 617 and 624 (see also Fig. 39) by a sleeve 647 free on a hammer support stud 648 and studs 649 secured in the frame 611, and thence onto the core of a receiving roll 651 rotatably supported on a stud 652 secured in the frame 100. A coiled spring (not shown), which frictionally engages the sleeve 644 and the stud 645, forms a take-up device which maintains the web of detail material taut, so that it will feed properly and not rub against the faces of the type wheels or the inking ribbon. The prongs of a bifurcated turning device (not shown) engage diametrically-opposed slots in the receiving roll 651, serve to attach the web of the detail strip to said receiving roll, and also serve as a means for turning said roll when it is desired to feed the web of the detail strip 123 manually.

Integral with the receiving roll 651 (Figs. 2 and 38) is a disk 654, which provides a backing for the inside surface of the detail receiving roll, and a feed ratchet 655, having, on its periphery, comparatively fine teeth which are engaged by three spring-pulled retaining pawls 656 pivotally mounted on studs secured in the frame 100, and by three spring-pulled feeding pawls 657 mounted on a rockable plate 658 free on the stud 652. The plate 658 carries a stud 659, which engages a slot in a crank 660 secured to one face of a hub free on the main cam shaft 138, said hub having secured on its other face a crank 661 pivotally connected by a link 662 to a lever 663 free on a stud 664 secured in the frame 100. The lever 663 carries a roller 665, which cooperates with the periphery of a plate cam 666 secured in fixed relationship to a hammer-operating cam 667 (Figs. 37 and 43) and a clutch plate 668, said parts being free on a stud 669 secured in the right frame 100. Pivotally mounted on the plate 668 is a clutch dog 670 (Fig. 42) urged counter-clockwise by a spring 675 to normally maintain its tooth in the path of an operating shoulder on a driving member 671 integral with a hammer control cam 672 and a gear 673; said parts being free on the stud 669. The gear 673 meshes with and is driven by a similar gear 674, secured on the right-hand end of the main cam shaft 138 (see also Fig. 2).

Under normal conditions, when the detail mechanism is enabled, clockwise rotation of the main cam shaft 138 and the gear 674 (Figs. 42 and 43) drives the gear 673, the member 671, and, through the dog 670, the plate 668 and the cams 667 and 666 counter-clockwise in unison therewith and to the same extent, as the gears 673 and 674 are identical in pitch and size. Counter-clockwise movement of the cam 666 (Fig. 38), through the roller 665, rocks the lever 663 against the action of a spring 676, tensioned between the plate 658 and a stationary stud, whereby said lever, through the link 662, the crank 661, and the crank 660, rocks said plate also counter-clockwise in a feeding direction, causing the pawls 657, in cooperation with the ratchet 655, to rotate the detail receiving roll 651, to feed or advance the detail strip 123 (Fig. 2) in relation to the detail type wheels and hammer 646, and according to the time given in space 18, Fig. 51. Continued rotation of the cam 666 permits the spring 676 to return the plate 658 clockwise or in a take-up direction, until the stud 659, carried thereby, comes into contact with a control surface on a compensating cam 677, which controls the take-up movement of said plate 658 in order to maintain uniform spacing of the printed records on the detail strip 123, as the diameter of the detail paper wound onto the receiving roll 651 increases. The cam 677 is connected in fixed relationship to a feeler arm 678 by a hub free on a stud 679 secured in the frame 100. A spring 680 (Figs. 2 and 38) urges the cam 677 and the arm 678 clockwise to normally maintain a bent-over curved sensing portion of said arm 678 in yielding contact with the periphery of the receiving roll 651, to sense the diameter of the detail material wound on said roll. As the diameter of the receiving roll increases, the feeler arm 678 and the cam 677 are steadily advanced counter-clockwise against the action of the spring 680, whereupon the camming surface on said cam 677, in cooperation with the stud 659, gradually reduces the take-up movement of the plate 658, to maintain uniform spacing of the records printed on said detail material 123.

*Detail strip printing hammer*

The detail printing hammer 646 (Figs. 2 and 37) is in the form of a yoke, the parallel side arms of which are rotatably supported on the stud 648. The arms of the hammer yoke 646 support a stud 683, which carries an adjustable cone 684, the periphery of which cooperates with a cam 685 secured in fixed relationship to an operating arm 686 by a bushing free on a stud 687 secured in the frame 611. A link 681 pivotally connects the arm 686 to a cam lever 688 free on the stud 664 and carrying a roller 689, which cooperates with the periphery of the hammer-operating cam 667. A spring 690 urges the hammer 646 counter-clockwise to normally maintain the cone 684 in yielding contact with the cam 685, and a spring 691 urges the arm 686 clockwise to normally maintain a hook, formed on its inner end, in yielding engagement with the stud 683 and to normally maintain the roller 689 in yielding contact with the periphery of the cam 667. The arm 686, in cooperation with the stud 683, forms a latch which prevents accidental movement of the hammer 646 in a printing direction when the machine is at rest, and thereby prevents accidental smudging of the record material.

The lever 688 (Fig. 37) carries a stud 692, which cooperates with a restoring cam 693 integral with a sleeve 694 free on a stud 695 secured in the right frame 100 (Fig. 2). Also integral with the sleeve 694 (Fig. 42) is a pinion 696, which meshes with the gear 673 and is driven thereby two clockwise revolutions each machine operation. During machine operation, the cam 693 makes approximately one and one half revolutions prior to counter-clockwise printing movement of the lever 688 and consequently does not interfere with such movement, as the node of said cam 693 is out of the path of the stud 692 at the time printing movement is imparted to said lever 688. Near the end of machine operation, the node of the cam 693 coacts with the stud 692 to insure that the lever 688 and connected parts, including the arm 686, are restored fully to their clockwise or normal positions and maintained thus restored when the machine is at rest.

Operation of the hammer cam 667 (Fig. 37) according to the time given in space 19 of the chart, Fig. 51, rocks the lever 688 and, through the link 681, the arm 686 and the cam 685 first counter-clockwise, causing said cam, in cooperation with the cone 684, to rock the hammer 646 clockwise, against the action of the spring 690. Clockwise movement of the hammer 646 causes its platen to first contact the web of the detail material 123 and carry said web and an inking ribbon 697 into contact with the detail type wheels 617 to print records on said detail material. Continued rotation of the cam 667 permits the spring 690 and 691 to restore the hammer 646, the arm 686, and connected parts to normal or home positions, as shown here, in which position the hook-shaped inner end of the arm 686 latches over the stud 683 and, in cooperation with the spring 691 and the cam 693, retains the hammer 646 against accidental movement in a printing direction, to prevent accidental smudging of the detail material 123.

The mechanisms shown in Figs. 37 and 38 and described above, for printing records on the detail material and for feeding said material, are similar in many respects to the corresponding mechanism fully disclosed in the copending application for Letters Patent of the United States of Frank R. Werner et al., Serial No. 255,870, filed November 10, 1951, to which reference may be had if a more detailed description of this mechanism is required.

The sleeve 694 (Figs. 2 and 42) has, on its outer face, clutch cuts 698, which are engageable by the corresponding lugs on an operating handle (not shown) for operating the machine manually when this is made necessary by a failure of the electrical power supply or because of some other unusual occurrence.

The operations of the detail printing hammer and the detail feeding mechanisms are controlled by a mutilated control disk 700 (Fig. 42), which is positionable under control of the control keys 111 to 115 inclusive. The mutilated periphery of the disk 700 is sensed by a lever which in turn control the effectiveness of the clutch dog 670, to render the detail printing and feeding mechanisms inoperative or operative, as the case may be, depending upon the effective control key.

The control disk 700 is rotatably mounted on a stud 701 secured in the frame 100, said stud being in axial alinement with the differential shaft 248 (Fig. 12). The disk 700 (Fig. 42) has secured thereto an upwardly-extending leg 702, having a surface 703 arranged to sense for and engage the stud 164 in the depressed control key 111 to 115. The disk 700 has a slot engaged by a stud 704 in the upper end of a lever 705 free on a stud 706 in the frame 100. A spring 707 urges the lever 705 clockwise to normally maintain a roller 699, carried thereby, in yielding engagement with the periphery of a plate cam 708 secured in fixed relationship to a companion plate cam 709 and a gear 710, said parts being rotatably supported on a stud 711, secured in the frame 100. The gear 710 meshes with the gear 674 and is driven thereby one counter-clockwise revolution each machine operation (Fig. 42).

Operation of the cam 708 according to the time given in space 15, Fig. 51, permits the spring 707 to rock the lever 705 clockwise, said lever in turn rocking the disk 700 and the leg 702 counter-clockwise, to cause the surface 703 on said leg to sense for the stud 164 in the depressed control key 111 to 115. Contact of the surface 703 with the stud 164 in the depressed control key positions the disk 700 accordingly, after which the cam 672, operating according to the time given in space 17, Fig. 51, and in cooperation with a roller 712 carried by a lever 713 free on a stud 714 in the frame 100, permits said lever 713 to move counter-clockwise in a sensing direction, under influence of a spring 715, to cause a bent-over ear 716 on its inner end to sense the periphery of the control disk 700.

The Sub-Total key 112 and the Multiple-Item key 113 position the disk 700 so that an undercut or low portion 718 of its periphery is opposite the ear 716, and, as a result, the lever 713 is free to move counter-clockwise under influence of the spring 715, to move another bent-over ear 717, near its center, into the path of a shoulder 719 formed on the clutch dog 670. Counter-clockwise rotation of the plate 668 and the cams 666 and 667 (Figs. 42 and 43), as explained before, causes the shoulder 719 to engage the ear 717 and disengage the tooth on the dog 670 from the operating shoulder on the member 671, to disable the detail hammer operating and feeding mechanisms when either the Sub-Total key 112 or the Multiple-Item key 113 is used to initiate machine operation.

All the other control keys position the disk 700 so that the high portion of its periphery is opposite the ear 716; consequently, counter-clockwise movement of the lever 713 is obstructed, and the ear 717 is retained out of the path of the shoulder 719 on the dog 670. As a result, said dog remains effective to connect the cams 666 and 667 to their operating member 671, to cause the detail impression and feeding mechanisms to function, as explained before, to print a record of the operation upon the detail strip. A retaining arm 720 (Figs. 37, 42, and 43), free on a stud 721 in the frame 100, carries a roller 722, which cooperates with the periphery of the hammer-operating cam 667, said arm 720 being urged counter-clockwise by a spring 723, to normally maintain a prominent surface thereon in contact with a stop stud 724 in the frame 100, which stop stud normally maintains the roller 722 clear of the low or dwell portion of said cam 667. At approximately the same time the shoulder 719 on the dog 670 engages the ear 717 on the lever 713, the node of the cam 667 engages the roller 722 and rocks the arm 720 clockwise against the action of the spring 723. This assists said lever 713 in disengaging the dog 670 from the shoulder on the member 671 and retains the cams 666 and 667 against any tendency to creep out of disengaged position during the remainder of machine operation. The operation of the arm 720 also insures that the shoulder 719 on the dog 670 will not move beyond the ear 717, so that said ear is free to move into the path of said shoulder in the succeeding machine operation, if necessary. If, in the succeeding machine operation, the lever 713 (Fig. 42) is restrained against counter-clockwise movement, the shoulder on the member 671 is free to engage the tooth of the dog 670 and carry said dog, the plate 668, and the cams 666 and 667 in unison therewith to render the detail printing and feeding mechanisms operative.

Inking ribbon mechanism

The endless inking ribbon 697 (Figs. 2 and 50) is supported on a framework comprising a main plate 727, which is removably attached to the machine by means of bushings 728 carried thereby, in cooperation with guide studs 729, secured in the frame 100, and by means of various guide pins 730 carried thereby, the ends of which engage corresponding holes in the machine framework to aline and retain said framework in proper position on the machine, and also to form guiding members over which the ribbon 697 is guided between the receipt type wheels, the detail type wheels, and their corresponding hammer mechanisms. The plate 727 supports a shield 731 for shielding the inking ribbon 697 from the web of the detail strip 123, and a shield 732 for shielding said inking ribbon from the web of the receipt material 125, said shield 732 also forming a guide for the receipt material 125 (Fig. 2).

The endless inking ribbon 697 (Fig. 50) is guided around the periphery of a feeding and inking roller 733, composed of suitable material, such as hard felt, said roller mounted on a stud in the plate 727. A pressure roller 734, formed of the same material as the inking roller 733, is supported between the side arms of a yoke 735 free on a stud 736 secured in the plate 727, said yoke being spring-urged to normally maintain said pressure roller 734 in firm, yielding contact with the feed roller 733, to insure that the ribbon 697 feeds properly. The web of the inking ribbon 697 is maintained taut, so that it will feed properly and not buckle or drag, by means of a tension roller 737 supported between the side arms of a yoke 738 in turn rotatably supported by the stud 736, between the arms of the yoke 735. In the present adaptation, weight of the roller 737 and gravity are sufficient to maintain the inking ribbon 697 taut; however, a light spring may be provided for the yoke 738, if necessary.

Ink is supplied to the ribbon 697 to maintain it in properly-inked condition at all times, so that distinct impressions will be made upon the record material, by means of a transfer roller 739, supported between the side arms of a yoke 740, in turn rotatably supported on the stud 736, between the arms of the yoke 738, said roller being normally maintained in yielding contact with the periphery of the feed roller 733 by a torsion spring. The periphery of the inking roller 739 is yieldingly engaged by the upper end of a wick 741, composed of suitable material, such as hard felt, which extends within an ink reservoir 742 secured to the plate 727. The wick 741 is provided with a comparatively light, compressible spring, which maintains said wick in yielding contact with the inking roller 739. The inking reservoir 742 is composed of suitable material—in this case plastic—and is provided with a supply opening which is accessible by the removal of a screw cap 743, for the replenishing of the ink supply within said reservoir.

The feed roller 733 (Figs. 2, 40, and 50) has, on its inner ends, diametrically-opposed notches which are arranged to engage corresponding projecting lugs on a disk 744 free on a stud 745 in the frame 100, when the ribbon support plate 727 is properly mounted on the machine. Integral with the disk 744 is a feed ratchet 746, the teeth of which cooperate with a spring-urged feed pawl 747 mounted on a plate 748 rotatably supported on the stud 745 and having, on its upper edge, gear teeth which mesh with corresponding gear teeth on the segment 641 (Fig. 40). The segment 641 oscillates first counter-clockwise and then back to normal position, as previously explained (Fig. 4 and space 8, Fig. 51), to impart feeding movement to the plate 748 and the pawl 747. A spring-pulled retaining pawl 749 coacts with the teeth of the ratchet 746 to prevent retrograde movement thereof during take-up movement of the plate 748 and the feed pawl 747.

At times, it may be desirable to interrupt the flow of ink being transferred by the roller 739 (Fig. 50) to the feed roller 733, and this may be accomplished by means of an On-and-Off lever 750, rotatably mounted on the stud which supports the feed roller 733 and having a bent-over finger piece which extends through an opening in the plate 727 for the convenient manipulation of said On-and-Off lever 750. The lever 750 carries a stud 725, which coacts with a camming surface on the outer arm of the yoke 740. Moving the lever 750 cams the yoke 738 and the roller 739 clockwise out of contact with the feed roller 733, to terminate the transfer of ink thereto.

Receipt material feeding mechanism

The receipt material 125 (Fig. 2) is in the form of a large supply roll 751 having a wooden core, which fits over a supply roll sleeve 752 free on a stud carried by a supply roll support plate 753, shown here in dot-anddash lines, which plate is secured to the main frame 100 by several studs and screws, so that said plate 753 and the receipt supply roll 751 may be readily removed from the machine, when access is required to the mechanism behind said plate. The sleeve 752 has diametrically-opposed teeth formed in its periphery, which are forced into the wooden core of the supply roll 751 as said supply roll is mounted thereon, so that said parts will rotate in unison and so that the supply roll will be yieldingly retained on said sleeve. The sleeve 752 for the receipt supply roll 751, like the sleeve 644 (Fig. 2) for the detail supply roll 643, is provided with a spring take-up device (not shown), which assists in maintaining the web of the receipt material taut, so that it will feed properly and will not interfere with closely-related parts or rub against the inking ribbon 697.

The web of the receipt material 125 is unwound from the supply roll 751 and threaded through an open guide slot formed by a properly-bent bracket 754 secured to the ribbon frame plate 727 (Figs. 2 and 50), thence over the ribbon shield 732, thence between feeding rollers 755 and coacting pressure rollers 756, and the end of said web 125 is finally directed through the opening 126 (Fig. 1), the edge of which is provided with a tearing blade for separating the finished receipts (Figs. 20 and 21) from the web.

There are two of the receipt feed rollers 755 (Figs. 2 and 46), which are spaced apart approximately the width of the receipt material, and likewise there are two of the pressure rollers 756 coacting with the two feed rollers, the two feed rollers and the two pressure rollers being in fixed or integral pairs. Also integral with the feed rollers 755 is a gear 758, said rollers and said gear being free on a stud 757 extending between the frame 102 and the frame 615 (Fig. 2). The teeth of the gear 758 mesh with the teeth of a drive gear 759, having integral therewith a retaining ratchet 760 and a fine-toothed feed ratchet 761, said parts being free on a stud 762 extending between the frames 102 and 615. The teeth of the feed ratchet 761 (Fig. 45) are engaged by the teeth of two feed pawls 763 rotatably mounted on a disk 764 free on the stud 762, and by the teeth of two retaining pawls 765 pivoted on studs secured in the frame 102. The feed pawls 763 and the retaining pawls 765 are spring-urged into yielding engagement with the teeth of the ratchet 761.

Figure 44:
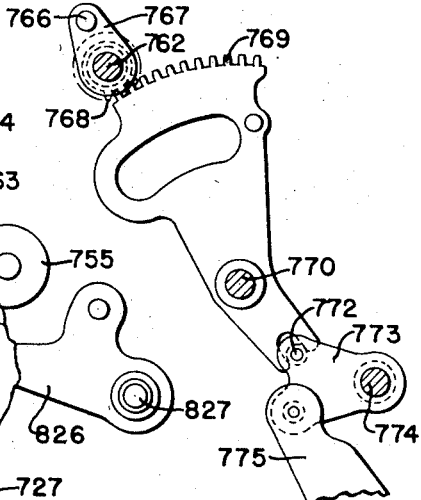
Fig. 44 is a detail view of a part of the receipt feeding mechanism.

The disk 764 (Figs. 44 and 45) has a notch engaged by a stud 766 in a crank 767 secured to a gear 768 free on the stud 762. The gear 768 meshes with teeth in the upper periphery of a segment 769 (Figs. 40 and 44) free on a stud 770 secured on the inner surface of the frame 102. A downward extension of the segment 769 is slotted to receive a stud 772 in a crank 773 free on a stud 774 secured in the frame 102. The upper end of a pitman 775 is pivotally connected to the crank 773, while the lower end of said pitman has therein an opening 776 with several operating surfaces or steps, which cooperate with a roller 777 free on a stud 778 carried by a cam lever 779 pivotally supported by a stud 780 in the frame 100. The lever 779 carries rollers 781 and 782, which cooperate, respectively, with the peripheries of companion plate cams 783 and 784, which, together with a receipt hammer operating cam 785 (Fig. 42) and a gear 786, form a cluster or assembled unit, which is rotatably supported on a stud 787 secured in the frame 100. The gear 786 meshes with the gear 710 and is driven one clockwise revolution thereby each machine operation.

The pitman 775 (Figs. 2, 40, and 42) is pivotally connected by a link 790 to a stud 726 in a control lever 791 free on the stud 706, and said lever is urged counterclockwise by a spring 793 to normally maintain a roller 792, carried thereby, in yielding contact with the periphery of the plate cam 709, which functions according to the time given in space 16, Fig. 51, to rock said lever 791 first counter-clockwise and then back to normal position during machine operation. The lever 791 has, on its upper end, a bent-over ear 794, which cooperates with the periphery of the control disk 700 (Fig. 42), which disk is positioned under influence of the control keys 111 to 115, as explained before. The ear 794 also cooperates with the periphery of a control segment 795 (Fig. 40) free on the stud 701 and having, on an arcuate upper surface thereof, teeth which mesh with a gear 796 secured to a companion gear 797 free on a consecutive number reset shaft 798 journaled between the frames 102 and 613 (Fig. 2). The gear 797 meshes with external teeth on a transmission gear 799 having internal teeth which bear on the periphery of a corresponding disk 800, supported by the shaft 265. The internal teeth of the gear 799 mesh with an idler pinion 266, which in turn meshes with a corresponding pinion 266 on a corresponding one of the square shafts 267.

The square shaft 267 for the gear 799 (Figs. 24 and 40) is operatively connected by two pinions 266 to the transmission segment 263 for the total control lever 117, the external teeth of said segment 263 meshing with upper teeth in a segment 801 free on the shaft 262 and having lower teeth which mesh with corresponding teeth cut in an arcuate upper surface of the total control lever 117. It should be evident, from the preceding description, that the total control lever 117 is operatively connected to the control segment 795 (Figs. 24 and 40) and that the movement of said control lever 117 in turn moves said segment 795 in unison therewith, and in relation thereto, to position a control slot 802 in said segment 795 in relation to the ear 794. When the total control lever 117 is in Register position, as shown here, the slot 802 is alined with the ear 794, so that operation of the lever 791 under influence of the cam 709 is not interfered with, and said lever is free to control the operation and positioning of the pitman 775, as will be explained presently. Moving the total control lever 117 away from Register position moves the slot 802 out of alinement with the ear 794 and moves an arcuate solid portion of said segment into the path of said ear to obstruct movement of the lever 791, under influence of the cam 709, and consequently the pitman 775 is retained in its extreme counter-clockwise or right-hand position (Fig. 40), in which position a clearance portion of the opening 776 is in alinement with the roller 777, and consequently no feeding movement is imparted to the receipt-feeding mechanism.

Figure 50:
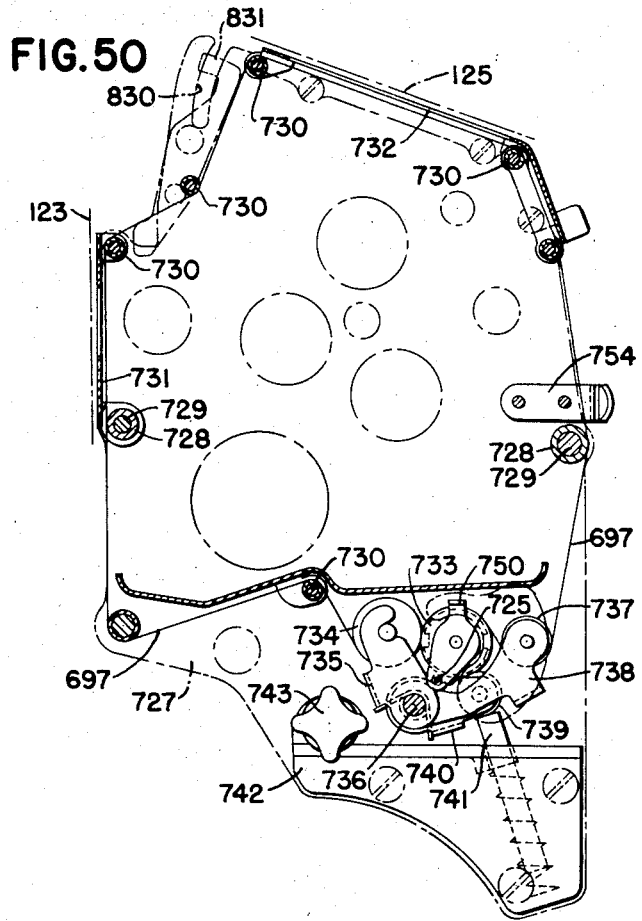
Fig. 50 is a right side elevation showing the framework for supporting the inking ribbon and the re-inking mechanism therefor, for the receipt and the detail strip.

Means under control of an On-and-Off knob 803 (Figs. 2 and 48) is provided for rendering the receipt-feeding mechanism operative or inoperative, as required. The On-and-Off knob 803 is secured on the outer end of the shaft 618, where it is accessible for manipulation through an opening in the ribbon support plate 727 (Fig. 50). Secured on the inner end of the shaft 618 is a crank 804 (Figs. 40 and 48), having pivotally connected thereto the upper end of a link 805, the lower end of which is pivotally connected to a blocking arm 806. When the knob 803 is in "On" position, as shown here, the arm 806 is out of the path of the ear 794 on the lever 791 and consequently does not interfere with operating movement of said lever. Moving the knob 803 from "On" position to "Off" position, through the shaft 618, the crank 804, and the link 805, shifts the blocking arm 806 downwardly into the path of the ear 794, to obstruct operating movement of the lever 791, and, as a result, the pitman 775 is retained in ineffective position, where no feeding movement is imparted thereto by the cam lever 779. A spring-actuated retaining pawl (not shown) cooperates with a retaining projection (not shown) on the crank 804 (Fig. 48) to retain said shaft and connected parts in either of their two positions.

Means is provided for locking the On-and-Off knob 803 in either of its two positions, when the total control lever 117 (Fig. 24) is in either Register or Lock Register position.

The link 805 (Figs. 40 and 48) carries a stud 807 arranged to be engaged by either of two locking notches in an upwardly-extending arm 808 of a yoke 809 free on the shaft 798, said notches corresponding to the "On" and "Off" positions of said link and the knob 803. The arm 808 of the yoke carries a stud 810 engaged by a slot in a plate 811 (Fig. 40) pivoted on a stud 812 in the frame 100. The plate 811 carries a roller 813, which engages a camming slot 814 in the segment 795, which, as previously explained, is positioned under control of the total control lever 117 (Fig. 24).

When the total control lever 117 is in either Register or Lock Register position, an outer branch of the slot 814 engages the roller 813, as shown in Fig. 40, to cause one of the locking notches in the arm 808 (Fig. 48) to engage the stud 807 and lock the On-and-Off knob 803 and connected parts in either "On" or "Off" position, depending upon which position the knob is in at the time. Moving the total control lever 117 to any position except Register and Lock Register causes the inner branches of the slot 814, in cooperation with the roller 813, to rock the plate 811 clockwise, which, through the stud 810, rocks the yoke 809 counter-clockwise to disengage the notches in the arm 808 from the stud 807, to free the On-and-Off knob 803 for movement from one position to another. Integral with the crank 804 (Fig. 48) is a printing member 898, which is moved to printing position when the knob 803 is in "Off" position, to print a series of dashes 899 on the detail strip 123 (Fig. 19) in operations in which no receipt is issued.

Using either the Tax key 111 or the Multiple-Item key 113 (Fig. 42) to initiate a machine operation causes the disk 700 to be positioned so that intermediate surfaces thereon are positioned opposite the ear 794 on the lever 791. Operation of the cam 709 (Figs. 40 and 42) permits counter-clockwise movement of the lever 791, under influence of the spring 793, until the ear 794 contacts one of the intermediate surfaces 788 or 789. This, through the link 790, positions the pitman 775 so that an operating surface 836 in the opening 776 is in the operating range of the roller 777. Clockwise positioning movement of the pitman 775 likewise disengages a step 815 on its back surface from a stud 816 in a plate 817 pivotally mounted by means of a stud 818 carried thereby, in cooperation with a corresponding bushing in the frame 100 (Fig. 2). As the lower end of the pitman 775 moves clockwise, or forwardly, a spring 819 carries the plate 817 clockwise in unison therewith until a stop surface 820, formed in an opening in said plate, contacts a stud 821 fast in the frame 100, to disengage the stud 816 from the step 815, and to simultaneously bring said stud into alinement with a stop surface or step 822, formed on the pitman 775, adjacent the step 815. Operation of the lever 779 by the cams 783 and 784, according to the time given in space 20 (Fig. 51), causes the rollers 777 to engage the surface 836 and carry the pitman 775 upwardly a slight distance until such upward movement is terminated by the stud 816 contacting the step 822 (Fig. 40).

This minimum upward movement of the pitman 775, through the crank 773, rocks the segment 769 a slight distance counter-clockwise, which movement, through the gear 768 (Figs. 44, 45, and 46), revolves the disk 764 clockwise or in a take-up direction, during which time the feed pawls 763 ratchet over the teeth of the ratchet 761. Clockwise return movement of the lever 779 causes the roller 777 to engage the bottom surface of the opening 776 and restore the pitman 775 downwardly, which movement causes the disk 764 to be rotated in a counter-clockwise or feeding direction to advance the ratchet 761, the gears 759 and 758 (Fig. 46), and the feed rolls rolls 755 in a feeding direction to line-space the receipt material 125 (Fig. 23) for the proper printing of tax or multiple items thereon. Downward restoring movement of the pitman 775 causes the stud 816 (Fig. 40) to again engage the step 815 on the rear edge of said pitman, in preparation for the next multiple-item operation.

Figure 46:
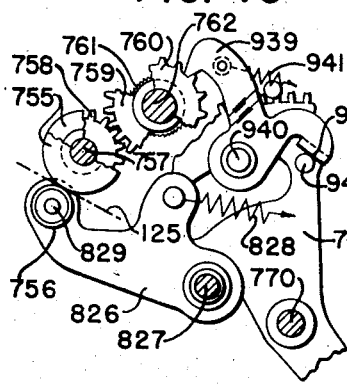
Fig. 46 is a detail view illustrating the feed rolls and coacting pressure rolls for advancing the receipt material.
Figure 45:
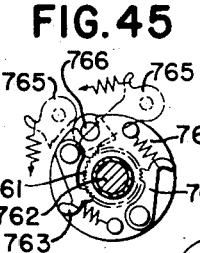
Fig. 45 is a detail view of the ratchet and coacting pawls for feeding or advancing the receipt material.

Each series of tax operations of multiple-item operations, under influence of the control keys 111 or 113, or both, is followed by a Total Cash operation, under influence of the Total Cash control key 115, during which operation the item totalizer is cleared and the total amount therein is simultaneously transferred to the storage totalizer. The Total Cash key 115 (Fig. 42) positions the lever 702 and the control disk 700 so that a low surface 823 of its periphery is opposite the ear 794. This permits full counter-clockwise movement of the lever 791 under influence of the cam 709 and the spring 793 (see also Fig. 40). Full counter-clockwise movement of the lever 791, through the link 790, shifts the pitman 775 full distance forwardly or clockwise to move an operating surface 824, in the rear end of the opening 776, above the roller 777, and to move the surface 822 out of the path of the stud 816. After the pitman 775 has thus been positioned in relation to the roller 777, operation of the lever 779 under influence of the cams 783 and 784, and according to the time given in space 20, Fig. 51, causes said pitman 775 to be shifted full distance upwardly or in a take-up direction to impart maximum take-up movement to the segment 769 (Fig. 44) the disk 764, and the feed pawls 763 (Figs. 45 and 46). Clockwise return movement of the lever 779 (Fig. 40) restores the pitman 775 downwardly, which movement, through the segment 769 (Fig. 44), rotates the disk 764, the feed pawls 763, the ratchet 761, and the feed rolls 755 (Fig. 46) in a feeding direction, to advance the receipt material 125 (Fig. 2) full distance in Total Cash operations, which is necessary to provide room for printing of the total of the multiple items, the consecutive number, the date, and the data on the electro on said receipt material, as will be explained presently in connection with the receipt hammer mechanism.

Depression of the Single-Item key 114 (Figs. 1, 12, and 42), to initiate a single-item operation, causes the disk 700 to be so positioned that the low surface 823 is opposite the ear 794, and consequently the lever 791 is free to move full distance counter-clockwise to position the pitman 775 (Fig. 40) in exactly the same manner as explained above in connection with Total Cash operations, to cause full or long feeding movement to be imparted to the receipt material 125, for the printing of all the required data thereon.

Depression of the Sub-Total key 112 (Figs. 1, 12, and 42) causes the disk 700 to be positioned so that a high portion 825 of its periphery is opposite the ear 794, and, consequently, counter-clockwise movement of the lever 791 is obstructed, and the lower end of the pitman 775 is retained in the position shown in Fig. 40, in which the widest portion of the opening 776 is in alinement with the roller 777. With the opening 776 thus positioned in relation to the roller 777, operation of the lever 779 imparts no movement to the pitman 775, and consequently the receipt material 125 will not be fed. In sub-total operations, as will be explained later, the receipt hammer mechanism is rendered inoperative, and consequently no impression is made upon the receipt material. This is why it is unnecessary to feed said material.

Figure 47:
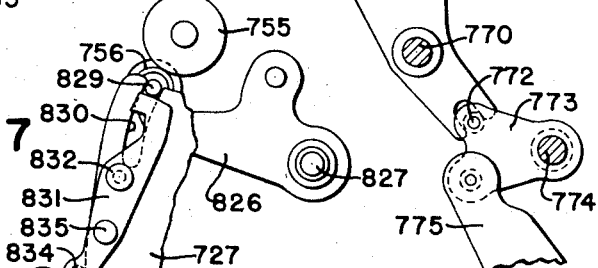
Fig. 47 is a detail view of the mechanism for latching the receipt pressure rolls in ineffective position.

By referring to Figs. 2 and 46, it will be recalled that the pressure rollers 756 maintain the receipt material 125 in yielding contact with the feed rollers 755 to effect the feeding of said receipt material. The pressure rollers 756 are turnably mounted on a spindle 829 secured in an arm 826 free on a stud 827 in the frame 102, and a spring 828 urges said arm 826 and said pressure rollers 756 clockwise to normally maintain said rollers in yielding contact with the feed rollers 755. A latching mechanism is provided for latching the pressure rollers 756 in an open position, against the action of the spring 828, whenever this is desirable or necessary, one such occasion being when the receipt material 125 is being threaded in the machine. The outer end of the spindle 829 is undercut to ride freely in an arcuate slot 830 (Figs 47 and 50) in an upward extension of the ribbon support plate 727, and coacting with said outer end of the spindle is a latch 831, pivoted on a stud 832 secured in said plate 727. A spring 833, tensioned between a stud 834, fast in the lower end of the latch 831, and a stationary stud in the plate 727, urges said latch 831 counter-clockwise to normally maintain said stud 834 in yielding contact with a stop surface formed on said plate 727. The latch 831 is provided with a finger piece 835 for moving said latch clockwise against the tension of the spring 833 until a latching hook formed on its upper end is out of the path of the spindle 829, whereupon said spindle and the arm 826 may be moved down or counter-clockwise to disengage the pressure rollers 756 from the feed rollers 755, after which said latch 831 may be released to permit the spring 833 to return its hook-shaped upper end over said spindle 829, to secure said spindle and the pressure rollers 756 in disengaged position, against the action of the spring 828. When the pressure rollers 756 are in effective position, as shown in Figs. 46 and 47, the arcuate upper end of the latch 831 moves beneath the spindle 829 to prevent accidental or unintentional movement of said pressure rollers to ineffective position, and consequent release of the receipt material 125 to the action of the automatic take-up device, which would instantly rewind said receipt material.

The receipt feed rolls 755 (Figs. 2 and 46) are secured against feeding movement when the machine is at rest by means of a pawl 939, which engages the teeth of the ratchet 760, as shown here, said pawl being pivotally mounted on a stud 940 secured in the frame 102. A spring 941 urges the pawl clockwise to normally maintain a bent-over ear 942 thereon in yielding engagement with a stud 943 in the segment 769. When the segment 769 is in normal or home position, as shown here, the stud 943 maintains the pawl 939 in engagement with the teeth of the ratchet 760, against the tension of the spring 941, to secure said ratchet and, through the gear 759, the feed rolls 755 against feeding movement when the machine is at rest. It will be noted, by referring to Fig. 45, that the retaining pawls 765, in cooperation with the teeth of the ratchet 761, retain the feed rolls 755 against retrograde movement at all times. Counter-clockwise initial movement of the segment 769, to rotate the disk 764 and the feed pawls 763 in a take-up direction, withdraws the stud 943 (Fig. 46) from the ear 942 and frees the pawl 939 to the action of the spring 941, which immediately disengages said pawl from the teeth of the ratchet 760, to free said ratchet and connected parts for feeding movement. As the segment 769 nears the end of its return movement in a clockwise direction, the stud 943 engages the ears 942 to rock the pawl 939 into engagement with the teeth of the ratchet 760 to secure said ratchet and the feed rolls 755 against feeding movement when the machine is at rest.

It will be recalled, by referring to Fig. 2, that the sleeve 752, which supports the receipt supply roll 751, is provided with a spring take-up mechanism, similar to that disclosed in the co-pending application Serial No. 255,870, which tends to rotate said supply roll in a take-up direction or a direction contrary to the feeding movement of said supply roll to retain the web of the receipt material 125 taut at all times, and to provide a safeguard against tampering with the receipt material through the receipt opening 126 (Fig. 1) in the cabinet 108. Any attempt at tampering with the receipt material, for example, by prying the tension rollers 756 out of engagement with the feed rollers 755, will immediately free the web of the receipt material 125 and the supply roll 751 (Figs. 2 and 46) to the action of the take-up spring in the sleeve 752. The take-up spring immediately rewinds the receipt material within the machine to a point where it may not again be threaded between said feed and tension rollers, without the opening of the closure on the right-hand side of the cabinet, which gives access to the receipt-feeding mechanism, said closure being normally locked and the keys thereto being usually possessed by some person in authority.

*Receipt hammer mechanism*

The receipt amount type wheel 619 (Figs. 2 and 49) cooperates with a platen 838 of a receipt hammer in the form of a yoke 839, the side arms of which are pivotally supported on the stud 774. A spring 840 urges the hammer 839 upwardly or clockwise to normally maintain an adjustable cone 841, carried thereby, in yielding engagement with the surface of a hammer-operating cam 842 free on a stud 843 secured in the frame 102. Integral with the cam 842 is an arm 844 carrying a stud 845 engaged by a slot in one arm of a yoke 846 free on the stud 774, the other arm of said yoke 846 carrying a stud 847 pivotally supporting the upper end of a pitman 848, said pitman having a slot 849 (Fig. 42), which engages a stud 850 in the rear end of a link 851, the forward end of which is pivotally mounted on the stud 726 in the lever 791. The link 851 has a slot 852 engaged by a stationary stud 853 in the frame 100, for guiding said link as it is moved back and forth by the lever 791. The lower end of the pitman 848 has an opening 854, through which extends a roller 855 carried by a lever 856 free on the stud 780 and urged counter-clockwise by a spring 857 to normally maintain a roller 858, carried thereby, in yielding contact with the periphery of the hammer-operating cam 785, which operates according to the time given in space 21, Fig. 51, to rock said lever 856 first clockwise and then back to normal position.

In addition to the amount, date, and consecutive number type wheels, the machine is provided with an electro 859 (Figs. 2 and 48) for printing data of an informative or other nature upon the receipts. The electro 859 is located between the amount type wheels 619 and the date wheel 625 and is supported by the frames 613 and 614. Cooperating with the electro 859, the date wheel 625, and the consecutive number wheels 623 for the receipt 125 (Figs. 39 and 48) is a platen 860 of a printing hammer 861, pivotally supported on a stud 862 extending between the parallel side arms of a yoke 863 free on the stud 762. A spring 864 urges the yoke 863 counter-clockwise to normally maintain a roller 865, carried by the stud 862, in yielding contact with the operating surface of a cam 866 free on the stud 843 and connected by a bail to a companion arm 867. The arm 867 carries a stud 868, which engages a slot in the upper end of an arm 869 free on the stud 774 and fixed to a companion arm 870, to which is pivotally connected the upper end of an operating pitman 871.

The pitman 871 (Fig. 42) has a slot 872, similar to the slot 849 in the pitman 848, which slot 872 cooperates with the stud 850 in the link 851. The lower end of the pitman 871 has an opening 873, through which extends the roller 855, which roller also cooperates with the corresponding opening 854 in the pitman 848 for operating the amount printing hammer 839. A spring 874 (Fig. 48) maintains the hammer 861 for the electro and the date and consecutive number type wheels in substantial alinement therewith and forms a flexible connection which permits said hammer to adjust itself during operation, to properly impress the receipt material against said electro and type wheels.

Use of either the Tax key 111 or the Multiple-Item key 113 (Fig. 42) to control machine operation causes the disk 700 to be so positioned that the intermediate surfaces 788 or 789 thereon are opposite the ear 794 of the lever 791. Consequently, during tax and multiple-item operations, counter-clockwise movement of the lever 791 is controlled by the surfaces 788 or 789, causing said lever, through the link 851, to position the pitmans 871 and 848 in their intermediate position, in which position a surface 875, formed in the opening 854 in the pitman 848, is beneath the roller 855 in the lever 856. Operation of the lever 856 by the cam 785, according to the time given in space 21, Fig. 51, causes said lever, in cooperation with the surface 875, to shift the pitman 848 downwardly, against the action of a spring 876 (Fig. 42), which normally maintains said pitman in its upward position, to cause said pitman to rock the yoke 846 (Fig. 49) counter-clockwise. Counter-clockwise movement of the yoke 846, through the stud 845, rocks the arm 844 and the cam 842 clockwise, causing said cam, in cooperation with the cone 841, to rock the hammer 839 downwardly or counter-clockwise against the action of the spring 840, to cause said hammer to carry the receipt material 125 (Fig. 2) and the inking ribbon 697 into contact with the amount type wheels 619, to print the values set up on said amount wheels on said receipt material. In operations controlled by the keys 111 and 113, it will be noted, a clearance portion of the opening 873 in the pitman 871 (Fig. 42) is in alinement with the roller 855, and consequently no movement will be imparted to said pitman and the corresponding date and electro hammer 861 (Figs. 2 and 48) in such operations.

As previously explained, following all multiple-item and tax operations, a total cash operation is performed under control of the Total Cash key 115 (Figs. 1 and 12) to print a total of the tax and other data upon the receipt. Depression of the Total Cash key 115 (Fig. 42) causes the disk 700 to be positioned, as explained before, to bring its low surface 823 opposite the ear 794 and thus permits full counter-clockwise movement of the lever 791 under control of its cam. Full counter-clockwise movement of the lever 791, through the link 851 and the stud 850, shifts the pitmans 848 and 871 full distance forwardly or clockwise, to move an operating surface 877, formed in the opening 873 of the pitman 871, beneath the roller 855 in the lever 856. Therefore, in Total Cash operations, the lever 856 will shift both the pitmans 848 and 871 first downwardly in unison, against the action of their respective springs 876 and 878, to impart printing movement to their corresponding hammers 839 and 861.

Downward movement of the pitman 871 (Figs. 42 and 48) rocks the arms 870 and 869 counter-clockwise, causing said arm 869, in cooperation with the stud 868, to rock the arm 867 and the cam 866 clockwise. This causes the cam 866, in cooperation with the roller 865, to move the hammer 861 downwardly or clockwise, against the action of the spring 864, to cause said hammer to carry the receipt material and the inking ribbon into yielding engagement with the electro 859 and the date and consecutive number type wheels 625 and 623, to print the corresponding data upon said receipt material. Counter-clockwise return movement of the lever 856 restores the pitmans 848 and 871 upwardly to their normal positions, as shown here, which also permits the corresponding printing hammers to be restored to ineffective or non-printing position.

Single-Item operations, performed under control of the Single-Item key 114 (Figs. 1 and 42), cause the disk 700 to be so positioned that the low surface 823 is opposite the ear 794, and consequently, in such operations, both of the pitmans 848 and 871 will be operated by the lever 856, as explained in connection with the Total Cash key 115, to cause both the hammers 839 and 861 to operate, to print the data corresponding thereto on the receipt material 125.

Sub-total operations, which are controlled by the depression of the Sub-Total key 112, cause the disk 700 to be so positioned that the high surface 825 is opposite the ear 794 (Fig. 42), and, consequently, counter-clockwise movement of the lever 791 is obstructed, and the pitmans 848 and 871 are retained in their rearward or counter-clockwise positions, as shown here, so that clearance portions of the openings 854 and 873 therein are in alinement with the roller 855, and, as a result, operation of the lever 856 will impart no movement to said pitmans; consequently, in sub-total operations, the hammers for the receipt material will remain inoperative.

Figure 48:
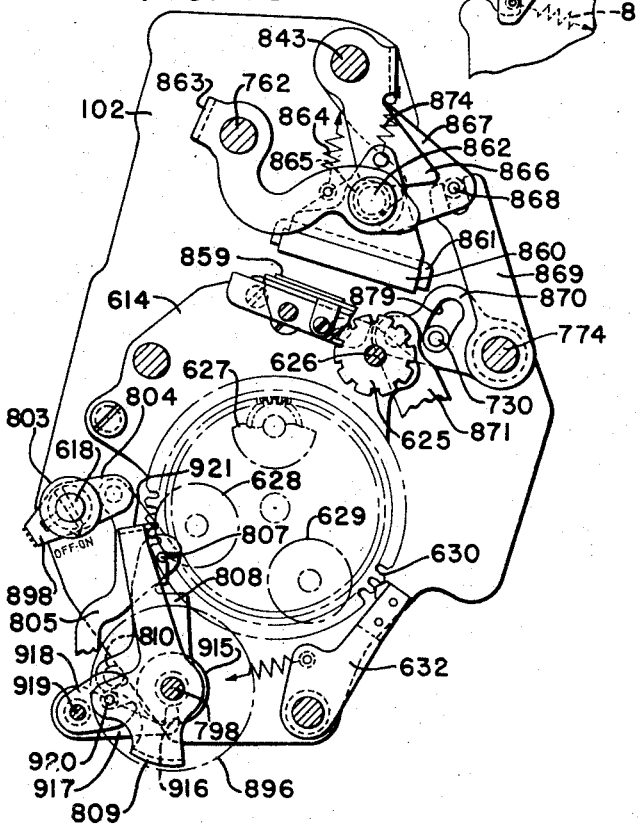
Fig. 48 is a right side elevation showing in particular the electro and date printing mechanisms for the receipt.
Figure 49:
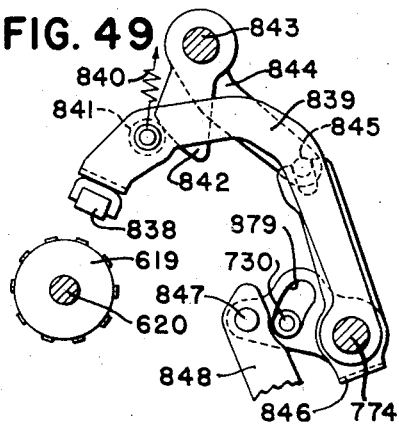
Fig. 49 is a detail view of the impression hammer for printing amounts on the receipt material.

By referring to Figs. 42, 48, and 49, it will be seen that the forward arm of the yoke 846 and the arm 870 each has a similar arcuate slot 879 therein, which provides clearance for the bushing which receives one of the pins 730 for the ribbon spool support plate 727 (Fig. 50).

Many of the structural details of the receipt feeding and printing mechanism described above are similar in certain respects to the corresponding mechanism fully disclosed in the co-pending application for Letters Patent of the United States Serial No. 306,762, filed August 28, 1952, by Frank R. Werner et al., inventors, which issued into Patent No. 2,710,576, June 14, 1955, to which reference may be had for a further description of the feeding and printing mechanisms.

Consecutive number operating mechanism

There are four consecutive number type wheels 624 (Figs. 2 and 39) for printing a consecutive number upon the detail strip 123, and four similar wheels 623 for printing an identical consecutive number upon the receipt 125. The two sets of consecutive number wheels are driven in unison by the same operating mechanism and are likewise reset in unison by means of a manually-operable consecutive number reset knob 896, which is secured to the outer end of the shaft 798.

Each of the four consecutive number wheels 624 (Fig. 39) for the detail strip has integral therewith a gear 881, which gears mesh with corresponding transmission gears 897, the internal teeth of which bear on disks supported by the shaft 265. The gears 897 also mesh with four corresponding gears 882, integral with corresponding feed ratchets 883, free on the shaft 798. The ratchets 883 are straddled by the side arms of a yoke 884, which arms are free to rotate on the shaft 798, said arms supporting a shaft 885, upon which is rotatably mounted a feed pawl 886, having thereon graduated feeding teeth for cooperating with the teeth of the four ratchets 883. An extension of one arm of the yoke 884 carries a stud 887 engaged by a slot in the upper end of an arm 888 (Figs. 39 and 40) adjustably secured to an operating plate 889 free on a stud 890 fast in the frame 100.

The plate 889 has a slot 891 engaged by a roller 892 mounted on an arm 893 pivoted on a stud 894 secured in the frame 100. A spring 895 urges the arm 893 counterclockwise to normally maintain the roller 892 in yielding engagement with the bottom of the slot 891. The arm 893 (Figs. 40 and 41) carries a stud 900, to which is pivotally connected the upper end of an operating pitman 901, having, in its enlarged lower end, an opening 902, through which extends an operating stud 903 in an arm 904 pivoted on a stud 905 in the frame 100. The arm 904 is slotted at its forward end to receive an undercut portion of the stud 778 in the lever 779, which, it will be recalled, is operated by the cams 783 and 784, according to the time given in space 20, Fig. 51. The pitman 901 (Figs. 40 and 42) carries a stud 906, which engages a slot 907 in an upward extension of a slide 908 shiftably supported by means of horizontal slots therein, in cooperation with a stud 909, secured in the frame 100, and by means of a stud 910 secured in the upper end of an arm 911 integral with the lever 705. The arm 911 and the lever 705 operate in unison under influence of the cam 708, and to the extent permitted by the disk 700 and the leg 702, which, as explained previously, are positioned by the control keys 111 to 115 inclusive. A spring 912 (Fig. 42), tensioned between the stud 910 and the slide 908, forms a connection which can yield, if necessary, when the parts are being restored to normal position.

When either the Tax key 111 (Figs. 1, 12, 40, and 41), the Sub-Total key 112, or the Multiple-Item key 113 is used to control and initiate machine operation, the disk 700, the lever 705, the arm 911, and the slide 908 position the pitman 901 so that the longest portion of the opening 902 in its lower end is in alinement with the stud 903, and consequently, operation of the arm 904 and the lever 779 will cause said stud 903 to operate idly in the large portion of the opening 902, without imparting any movement to the pitman 901 and connected mechanism. It is therefore evident that, in tax, sub-total, and multiple-item operations, the consecutive number mechanism will not operate, and, as a result, the consecutive number wheels will not be advanced.

Using either the Single-Item key 114 (Figs. 41 and 42) or the Total Cash key 115 to initiate and control machine operation causes the disk 700 and the slide 908 to position the pitman 901 so that the narrow forward branch of the opening 902 is in engagement with the stud 903. Operation of the lever 779 (Fig. 40 and space 20, Fig. 51) and the arm 904 causes the stud 903 to lift the pitman 901, to rock the arm 893 clockwise, against the tension of the spring 895. Clockwise movement of the arm 893 causes the roller 892, in cooperation with the slot 891, to rock the plate 889 and the arm 888 clockwise. Clockwise movement of the arm 888, through the stud 887 (Fig. 39), rocks the yoke 884 and the pawl 886 counter-clockwise, or in a take-up direction, the equivalent of one tooth space of the ratchet 883. Counter-clockwise return movement of the arm 893, when the pitman 901 is carried downwardly by the arm 904 and the lever 779, returns the plate 889 and the arm 888 counterclockwise, which movement rocks the yoke 884 and the feed pawl 886 clockwise to advance the units consecutive number type wheels 624 and 623 one step, or the equivalent of one digit, to count "one" for each of the operations of the machine controlled by the Single-Item key 114 and the Total Cash key 115. It will be noted, by referring to Fig. 39, that the ratchets 883 are provided with the usual notches in the zero position, which permit the graduated teeth of the feed pawl 886 to engage the ratchet of the adjacent higher order wheel when the lower order wheel passes through zero, to transfer tens digits from lower to higher denominations, in the usual and well-known manner.

An extension of the yoke 884 (not shown) carries a series of gears and corresponding ratchets, similar to the gears and ratchets 882 and 883, which have coacting therewith a feed pawl similar to the pawl 886, said gears in turn being connected by idler gears (not shown) to their corresponding transmission gears 913 (Fig. 39). The gears 913 in turn mesh with the corresponding consecutive number wheels 623 for the receipt, said parts operating in unison with the corresponding parts for the consecutive number wheels 624 to advance the wheels 623 in exactly the same manner as explained above.

Each of the ratchets 883 for the consecutive number type wheels is provided with a reset pawl 914, which is spring-urged into engagement with a reset groove cut in the reset shaft 798. Rotation of the reset wheel 896 (Figs. 2, 39, and 48) and the reset shaft 798 causes the groove therein to engage the pawls 914 and carry the ratchets 883 in unison therewith to provide manual means for resetting the consecutive number type wheels to zero whenever desirable. The ratchets for the consecutive number wheels 623 are also provided with pawls similar to the pawls 914, for coacting with the groove in the reset shaft 798, for resetting said wheels 623 in unison with the wheels 624.

Means is provided for securing the reset shaft 798 in zero position when the total control slide 117 (Figs. 1, 24, and 48) is in either Register or Lock Register position. Secured on the consecutive number reset shaft 798 is a disk 915 having a notch 916 therein corresponding to the zero position of said reset shaft and the consecutive number type wheels, said notch arranged to be engaged by the tooth of a stop pawl 917 integral with a crank 918 free on a stud 919 secured in the frame 613 (Fig. 2). The crank 918 has a slot engaged by a stud 920 in the right-hand arm of the yoke 809, which yoke, it will be recalled, is rocked counter-clockwise through the stud 810, in cooperation with the plate 811 (Fig. 40) and the segment 795, each time the total control lever 117 is moved away from either Register or Lock Register position, to unlock the receipt On-and-Off knob 803, for operation in the manner explained previously. Counter-clockwise movement of the yoke 809, through the stud 920, rocks the crank 918 and the pawl 917 clockwise to disengage said pawl from the notch 916 to free the disk 915, the shaft 798, and the reset knob 896 for operation, so that the consecutive number type wheels may be reset to zero. It is also obvious that it would be impossible to return the total control lever 117 to either Register or Lock Register position until the notch 916 is properly located in zero position and the consecutive number type wheels properly turned to zero position, so that said notch will be in position to be engaged by the tooth of the pawl 917. The upper end of the right-hand arm of the yoke 809 (Fig. 48) has a bent-over alining tooth 921, which cooperates with the teeth in the date-setting gears 630, said aliner being engaged with said gears, to secure them against rotation, and likewise to secure the date-setting knobs 627, 628, and 629 against manipulation when the total control lever is in either Register or Lock Register position. Movement of the total control lever 117 away from either Register or Lock Register position rocks the aliner 921 out of engagement with the teeth of the gears 630, so that the type wheels may be adjusted.

From the foregoing description it should be understood that the operation of the date setting knobs 627, 628, and 629 (Figs. 2 and 48), the receipt On-and-Off knob 803, and the consecutive number reset knob 896 is controlled by the total control lever 117 (Figs. 1 and 23) and that these knobs are locked against manipulation when said total control lever is in either Register or Lock Register position and are unlocked for manipulation when said total control lever is in either Read or Reset position.

*Auxiliary advancing mechanism for detail strip*

In the present machine, the upper edge of the opening 124 (Figs. 1 and 2) in the cabinet 108 does not extend upwardly far enough to expose the last few entries on the detail strip 123 to view, and auxiliary means are provided for advancing said detail strip manually, whenever desirable, so that the last entries thereon may be observed through said opening.

The take-up device 653 (Fig. 2) for the detail strip 123, which, as previously explained, assists in keeping the web of said detail strip taut, comprises a roller 923 mounted on a plate 924, pivoted on a stud 925 in the frame 611, and a companion roller 926, mounted on a stud extending between said plate 924 and a companion front plate 927. This assembly of parts is urged clockwise by a spring 928, to normally maintain the rear edge of the plate 924 in yielding contact with a stop stud 929 secured in the frame 611. The front plate 927 has a shoulder 930 arranged to cooperate with a stud 931 (Figs. 2 and 3) carried by a plate 932 secured to the inner end of a tenon 933 of a detail-strip-advancing knob 934, said tenon journaled in a bushing in the cabinet 108, in axial alinement with the stud 925. The knob 934 carries a stud 935, which extends through a slot 936 in the cabinet 108, said slot being concentric with the tenon 933. A spring 937 (Fig. 3) urges the plate 932 and the knob 934 clockwise, to normally maintain the stud 935 in yielding contact with the downward end of the slot 936, as shown here, and to normally maintain the stud 931 in alinement with the shoulder 930.

When it is desired to advance the detail strip 123 temporarily so that the last entries thereon are visible through the opening 124 (Fig. 1) in the cabinet 108, the knob 934 is turned counter-clockwise and carries the plate 932 in unison therewith, against the tension of the spring 937. Counter-clockwise movement of the plate 932 and the stud 931 causes said stud, in cooperation with the shoulder 930, to carry the assembly comprising the plates 924 and 927 and the rollers 923 and 926 counter-clockwise in unison therewith against the tension of the spring 928. Inasmuch as the web of the detail strip 123 is threaded between the rollers 923 and 926, and inasmuch as the detail receiving roll 650 is retained against retrograde movement, counter-clockwise movement of said rollers unwinds or advances the upper portion of the detail strip 123 sufficiently to bring the last entries thereon into view in the opening 124 (Fig. 1). The extent of auxiliary advancing movement of the detail strip 123, under influence of the knob 934, is controlled by the stud 935, in cooperation with the slot 936. After an auxiliary advancing operation, the knob 934 is restored clockwise to normal position, as shown in Fig. 3, by the spring 937, and the rollers 923 and 926 are restored to normal positions, as shown in Fig. 2, by the spring 928. When the rollers 923 and 926 are restored to normal position, as explained above, the spring take-up device in the sleeve 644 for the supply roll 643 operates to rewind the web of the detail strip 123 back onto said supply roll, and thus restore the last entries on said detail strip 123 into proper relationship with the detail type wheels, so that succeeding entries will be properly spaced therefrom.

OPERATION

It is believed that sufficient knowledge of the operation of the machine chosen to illustrate the present invention will have been obtained from a perusal of the preceding description, in conjunction with the drawings. Nevertheless, a brief statement of operation, using as a basis the fragment of detail strip shown in Fig. 19 and the receipts shown in Figs. 20 and 21, may prove helpful and will now be given.

The machine chosen to illustrate the present invention is primarily an itemizing cash register, and one of several typical examples of use of such a machine is in the check-out line of a self-serve food market or similar business.

The receipt 609, shown in Fig. 21, provides a typical example of a single-item transaction in which the customer purchases one item, the value of which is $5.50. The customer presents this item to the cashier at the check-out counter, and, after making sure that the total control lever 117 is in Register position, the value of the item—$5.50— is set up on the amount keys 110. Depression of the amount keys locks the total control lever against movement, after which the cashier depresses the Single-Item key 114 to initiate a single-item transaction, during which the amount—$5.50—is entered in the storage totalizer and is printed upon the receipt 609. Simultaneously, the amount of the transaction—$5.50— and the consecutive number —998—are printed on the detail strip 123.

The data appearing at the top of the receipt 609—viz., "The John Doe Co.," the consecutive number "998," and the date, "May –7"—were printed during a preceding operation, as will be explained presently. Also, in single-item transactions, the electro, consecutive number, and date-printing mechanism function to print the word "Thanks," the data "The John Doe Co.," the consecutive number, and the date upon the web of the receipt material. The finished receipt 609 is severed from the web 125 between the word "Thanks" and the other electro data— namely, "The John Doe Co."—and, as a result, said word "Thanks" appears near the bottom of the receipt 609, while the other data, "The John Doe Co.," the consecutive number "999," and the date, "May –7," forms the heading for the multiple-item receipt 610 (Fig. 20), which was issued in a subsequent operation.

In other words, the information at the top of the receipt 609 (Fig. 21), "The John Doe Co.," the consecutive number 998, and the date, "May –7," were printed in the preceding machine operation, and the corresponding consecutive number 998 on the detail strip 123 (Fig. 19) was printed in the present operation. However, the agreement of the consecutive number on the receipt with the consecutive number on the detail strip is obtained by permanently advancing the consecutive number wheels for the receipt one digit, so that, at the time the consecutive number "998" is being printed on the detail strip 123, the consecutive number "999" for the succeeding receipt will be printed upon the receipt material. In other words, when the consecutive number wheels are reset, the three consecutive number wheels for the detail strip 123 will stand at zero, and the consecutive number wheels for the receipt will stand at "one," and, as both sets of consecutive number wheels are advanced simultaneously, the consecutive number wheels for printing on the receipt will always be one digit in advance of the consecutive number wheels for printing on the detail strip.

In multiple-item transactions, the receipt 610, such as that shown in Fig. 20, is issued, and in such transactions the customer presents the several items purchased to the cashier at the check-out counter, and the price of each item is entered on the amount keys 110; then, in a series of multiple-item operations, these prices are simultaneously printed upon the receipt material and entered in the item totalizer. For example, the value of the first item, 50 cents, is entered on the amount keys 110 (Fig. 1), after which the Multiple-Item key 113 is depressed, and, during operation of the machine, the value of this item, 50 cents, is printed upon the receipt material 125, and said receipt material is line-spaced or short-fed in the manner explained for multiple-item operations in connection with Fig. 42. It will be recalled that the Multiple-Item key 113 selects the item totalizer wheels 296 for actuation, and consequently the value of the item, 50 cents, is simultaneously entered in said item totalizer wheels. The value of the second item, $1.00, is set up on the amount keys 110, after which the Multiple-Item key 113 is again depressed to initiate a multiple-item operation, in which the value of the item is printed upon the receipt material and simultaneously added into the item totalizer, and so on.

It will be recalled that during multiple-item operations, which are a part of a complete multiple-item transaction, the hammer and feeding mechanism for the detail strip 123 are rendered inoperative, and consequently such items are not entered upon the detail strip. However, there is one exception to this in the present arrangement, and that is tax items, which are always printed upon the detail strip 123. It will be noted that, in connection with the present multiple-item transaction, there is a tax item of 12 cents, and the amount of this item is set up on the amount keys 110, after which the Tax key 111 is depressed to initiate a tax operation, which is similar in every respect to a multiple-item operation, with the exception that the detail hammer and feeding mechanisms are rendered operative, and the amount of the tax, 12 cents, is printed upon the detail strip 123 at the same time it is printed upon the receipt material, and said tax is simultaneously entered in the wheels of the item totalizer.

After all the items have been entered in the item totalizer and simultaneously printed upon the receipt material, the multiple-item transaction is completed by performing a total cash operation, which is initiated by depression of the Total cash key 115 (Figs. 1 and 12), which, through the mechanism shown in Figs. 22 and 23, causes the item totalizer to be zeroized and the total amount therein, $3.12, transferred to the storage totalizer, and said total is simultaneously printed near the bottom of the receipt 610. During the total cash operation, the receipt electro and date printing mechanisms function to print the electro data, the consecutive number, and the date upon the receipt material, in the manner explained in connection with the single-item receipt shown in Fig. 21. Concurrently with the printing of the total of the amounts, $3.12, at the bottom of the receipt, this amount and the consecutive number "999" are also printed upon the detail strip 123.

By referring to Fig . 20, it will be noted that the items of a mulitple-item transaction are identified by a dash printed immediately to the right thereof. Tax items are identified by the word "Tax" printed immediately to the right thereof, and total cash and single-item entries are identified by a star printed immediately to the right thereof. Similar identification characters are printed to the right of the various entries on the detail strip 123 (Fig. 19).

If at any time during a multiple-item transaction the operator wishes to ascertain the total amount of the items listed or entered, this may be accomplished by initiating an item sub-total operation by depression of the Sub-Total key 112, and during this operation the item totalizer is sub-totalized and the amount therein set up on the indicators 120; however, the amount of the sub-total is not printed, either upon the receipt or upon the detail strip.

In connection with single-item transactions, in which receipts such as that shown in Fig. 21 are issued, it is well to remember that the Single-Item transaction key 114 does not select the item totalizer for actuation but selects only the storage totalizer for actuation.

If at any time during the course of a business period the proprietor or other person in charge, having a key to the lock 118 (Fig. 1) for the total control lever 117, wishes to ascertain the amount standing in the storage totalizer, this may be accomplished by unlocking the lock 118, moving the total control lever 117 from Register position one step downwardly, to Read 1 position, and initiating machine operation by depressing the Single-Item key 114, which selects the wheels of the storage totalizer for actuation. During operation of the machine, the wheels of the storage totalizer are read or sub-totalized, and the amount therein, in this case $245.25, and the consecutive number, "1000," are printed upon the detail strip 123 (Fig. 19), and, at the same time, the character X is printed immediately to the left of the consecutive number to identify this as a read operation.

If it is desired to reset or totalize the storage totalizer at the end of a business period, for example, the proprietor or other person in charge may accomplish this by moving the total control lever 117 (Fig. 1) to Reset position and initiating a reset operation by depressing the Single-Item key 114. During the reset operation, the wheels of the storage totalizer are reset to zero, and the amount standing thereon, $245.25, and the consecutive number, "1001," are printed upon the detail strip 123 (Fig. 19), and an identifying character Z is printed immediately to the left of the consecutive number to identify this as a reset operation. In read and reset operations such as those explained above, the hammer and feeding mechanisms for the receipt material are rendered inoperative, and consequently no entries are made upon the receipt material and no receipts are issued in such operations.

By referring to Figs. 40 and 42, it will be recalled that the Single-Item key 114 and also the Total Cash key 115 cause the consecutive number advancing mechanism to be rendered operative, and consequently, in read and reset operations, when said Single-Item key 114 is used to select the wheels of the storage totalizer for actuation, the consecutive number wheels will be advanced for each such operation and print a corresponding consecutive number to the left of the amounts of the sub-total or total, as shown in Fig. 19.

Usually, after the proprietor has reset the storage totalizer to zero at the end of a business period, the total control lever 117 (Fig. 1) is moved to Lock Register position, and locked in this position by removal of the key from the lock 118. This locks the machine mechanism against tampering or unauthorized operation, prior to the beginning of another business period.

While the forms of mechanisms herein shown and described are admirably adapted to fulfill the objects primarily stated, it is to be understood that it is not intended to confine the invention to the forms or embodiments disclosed herein, for it is susceptible of embodiment in various other forms, all coming within the scope and spirit of the invention.

What is claimed is:

1. In a machine of the class described, the combination of a shiftable totalizer support; a plurality of totalizers on the support; differential actuators for the totalizers; means to shift the support to aline the totalizers with the actuators; depressible control keys; means including an element actuated directly by depression of the control keys to operate the shifting means to selectively aline the totalizers with the actuators; automatic means to operate the shifting means; and means including a second element operated directly by depression of one of said control keys to control the operation of the shifting means by the automatic operating means to cause the totalizer corresponding to the depressed control key to be alined with the actuators.

2. In a machine of the class described having power means to operate the machine, the combination of a shiftable totalizer support; a plurality of totalizers on the support; differential actuators for the totalizers; means to shift the support to aline the different totalizers with the actuators; depressible control keys; means including an element moved directly by depression of the control keys to operate the shifting means to selectively aline the totalizers with the actuators; regularly excursioned means actuated by the power means to operate the shifting means; and means moved directly by depression of one of the control keys to connect the shifting means to the regularly excursioned means to cause the totalizer corresponding to the depressed control key to be alined with the actuators.

3. In a machine of the class described, the combination of a shiftable totalizer support; a plurality of totalizers on the support; differential actuators for the totalizers; means to shift the support to aline the different totalizers with the actuators; means to operate the shifting means; a positionable member operatively connected to the shifting means and constructed and arranged to coact with the operating means to operate said shifting means; a plurality of depressible control keys; an element connected to the member; and means including a projection on each of the control keys and a camming surface on the element for each projection, whereby the act of depressing a control key directly moves the element to cause said element to simultaneously position the member in relation to the operating means to cause the totalizer corresponding to the depressed control key to be alined with the actuators.

4. In a machine of the class described, the combination of a shiftable totalizer support; a plurality of totalizers on the support; differential actuators for the totalizers; means to shift the support to aline the various totalizers with the actuators; means to operate the shifting means; a depressible control key corresponding to each totalizer; a positionable member connected to the shifting means and having an operating surface thereon for each key and its corresponding totalizer, said surfaces arranged to coact with the operating means; an element connected to the member and operated directly by depression of any control key to position the control surface corresponding to said depressed key in coacting relationship with the operating means to cause the support to be shifted the proper extent to aline the totalizer corresponding to the depressed control key with the actuators; and another operating surface on the member coacting with the operating means regardless of the positioning of said member by the control keys to aline a particular totalizer with the actuators.

5. In a machine of the character described, the combination of a shiftable totalizer support; a plurality of sets of totalizers on the support; differential actuators for the totalizers; means to shift the support to aline the various totalizers with the actuators; a plurality of depressible control keys corresponding to the different sets of totalizers; means moved directly by any one of the control keys when it is depressed to operate the shifting means to aline the corresponding totalizer with the actuators; automatic operating means for the shifting means; a member connected to the shifting means; operating surfaces on the member corresponding to the different sets of totalizers, and constructed and arranged to coact with the automatic operating means to aline the corresponding totalizers with the actuators; means connected to the member and moved directly by any one of the control keys when it is depressed to position the operating surface corresponding to said depressed control key in coacting relationship with the automatic operating means; and another operating surface on the member constructed and arranged to coact with the automatic operating means regardless of the positioning of said member under influence of one of the depressed control keys, to aline a particular totalizer with the actuators near the end of machine operation in preparation for the succeeding operation.

6. In a machine of the class described, constructed and arranged to perform add and reset operations, the combination of a shiftable framework; a totalizer mounted in the framework; differential actuators for the totalizer; means to shift the framework in two directions to engage and disengage the totalizer and the actuators; means to operate the shifting means in engaging direction in add operations; means to operate the shifting means in engaging direction in reset operations; means coacting with the shifting means to operate said shifting means in a disengaging direction in add and reset operations; a first member connected to the shifting means and having an operating surface movable into and out of coacting relationship with the add operating means; a second member connected to the shifting means and to the first member and having an operating surface movable into and out of coacting relationship with the reset operating means; depressible control keys to initiate machine operation and to control the add and reset functions of the totalizer; and means connected to the members and moved directly by any one of the control keys when said control key is depressed to position the corresponding operating surfaces in proper relationship to their respective operating means, to cause the shifting means to be operated in proper timing in an engaging direction to engage the totalizer and the actuators in accordance with the type of operation being performed.

7. In a machine of the class described, constructed and arranged to perform transfer total operations, in which a total is transferred from one totalizer to another during a single cycle of operation of the machine, the combition of a movable framework; a shiftable support mounted in the movable framework; two totalizers mounted on the shiftable support; differential actuators operable in an initial direction and a return direction to actuate the totalizers; means to shift the support to aline either totalizer with the actuator; means including a depressible control element to initiate and control transfer total operations; means connected to the shifting means and moved directly by the control element when it is depressed to shift the support to aline one totalizer with the actuators; means moved directly by the control element when it is depressed to in turn move the framework to engage the one totalizer with the actuators, whereupon initial operation of said actuators zeroizes or clears said one totalizer and positions the actuators according to the amount cleared from said totalizer; automatic means effective after the one totalizer has been zeroized to operate the shifting means to shift the support to aline the other totalizer with the actuators; and means moved directly by the control element when it is depressed to in turn move the framework to engage said other totalizer with the actuators, so that return movement of said actuators will enter the amount cleared from the one totalizer in said other totalizer, to effect the transfer of a total from said one totalizer to said other totalizer.

8. In a machine of the class described, the combination of a shiftable totalizer support; two totalizers mounted on the shiftable support; differential actuators for the totalizers; means to shift the support to aline each of the totalizers with the actuators; a depressible control key; means connected to the shifting means and moved directly by the control key when it is depressed to instantly shift the support to aline one of the totalizers with the actuators for actuation thereby; automatic means effective after the one totalizer has been actuated for operating the shifting means; means including a selectively positionable member connected to the shifting means and coacting with the automatic operating means to transmit the movement of said automatic operating means to the shifting means to shift the support; and means connected to the member and moved directly by the control element when it is depressed to immediately position said member in proper relationship to the automatic operating means to cause the other totalizer to be alined with the actuators for actuation thereby, after the one totalizer has been actuated.

9. In a machine of the character described, capable of operations in which a total is transferred from one totalizer to another during a single cycle of machine operation, the combination of a framework movable in two directions; a shiftable support mounted in the framework; two totalizers mounted on the shiftable support; differential actuators operable in initial and return directions for actuating the totalizers; means to shift the support to aline either totalizer with the actuators; means including a depressible total control element effective when depressed to initiate and control a transfer total operation; means connected to the shifting means and operable by the control element to shift the support to aline one totalizer with the actuators; means moved directly by the control element when it is depressed to move the framework in one direction to engage the one totalizer with the actuators prior to their initial movement, which movement zeroizes or clears said one totalizer and positions the actuators according to the amount cleared therefrom; means operable after the one totalizer has been zeroized to move the framework in another direction to disengage said one totalizer from the actuators; automatic means effective after the one totalizer has been zeroized for operating the shifting means; means including a member connected to the shifting means and positionable in relation to the automatic operating means to transmit the movement of said automatic operating means to the shifting means to shift the support; means connected to the member and moved directly by the control element when it is depressed for positioning said member in proper relation to the automatic operating means so that the other totalizer will be alined with the actuators; and means controlled directly by the control element when depressed to move the framework in said one direction to engage the other totalizer with the actuators prior to their return movement, which movement enters the amount cleared from the one totalizer therein to effect a transfer total operation, said disengaging means constructed and arranged to again move the framework in said another direction to disengage said other totalizer from the actuators near the end of machine operation.

References Cited in the file of this patent

UNITED STATES PATENTS

| | | |
|---|---|---|
| 2,259,581 | Patzelt | Oct. 21, 1941 |
| 2,369,252 | Robertson et al. | Feb. 13, 1945 |
| 2,376,481 | Gubelmann | May 22, 1945 |
| 2,386,364 | Spurlino | Oct. 9, 1945 |
| 2,457,050 | Lambert | Dec. 21, 1948 |
| 2,503,865 | Christian | Apr. 11, 1950 |